(12) United States Patent
Sakhnini et al.

(10) Patent No.: US 11,601,983 B2
(45) Date of Patent: Mar. 7, 2023

(54) PER-SAMPLE REPETITION OF A RANDOM ACCESS PREAMBLE

(71) Applicant: QUALCOMM Incorporated, San Diego, CA (US)

(72) Inventors: Iyab Issam Sakhnini, San Diego, CA (US); Tao Luo, San Diego, CA (US); Junyi Li, Franklin Park, NJ (US); Jun Ma, San Diego, CA (US); Peter Gaal, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 17/191,531

(22) Filed: Mar. 3, 2021

(65) Prior Publication Data

US 2022/0287098 A1 Sep. 8, 2022

(51) Int. Cl.
*H04W 74/08* (2009.01)
*H04J 1/02* (2006.01)
*H04L 27/26* (2006.01)

(52) U.S. Cl.
CPC ........... *H04W 74/0833* (2013.01); *H04J 1/02* (2013.01); *H04L 27/2605* (2013.01); *H04L 27/2628* (2013.01)

(58) Field of Classification Search
None
See application file for complete search history.

(56) References Cited

U.S. PATENT DOCUMENTS

| | | | | |
|---|---|---|---|---|
| 6,618,452 | B1* | 9/2003 | Huber | H04L 27/266 375/364 |
| 7,693,129 | B1* | 4/2010 | Kishore | H04L 27/2657 370/350 |
| 8,995,409 | B2* | 3/2015 | Um | H04L 27/2605 370/336 |
| 10,499,434 | B2* | 12/2019 | Ramamurthi | H04W 72/0406 |
| 11,096,218 | B2* | 8/2021 | Qian | H04L 5/0091 |

(Continued)

FOREIGN PATENT DOCUMENTS

WO WO-2007126793 A2 11/2007

OTHER PUBLICATIONS

International Search Report and Written Opinion—PCT/US2022/016293—ISA/EPO—Jul. 14, 2022.

(Continued)

*Primary Examiner* — Faiyazkhan Ghafoerkhan
(74) *Attorney, Agent, or Firm* — Arun Swain; Holland & Hart LLP

(57) ABSTRACT

Methods, systems, and devices for wireless communications are described. For example, a user equipment (UE) may transmit a random access preamble to a base station as part of a random access procedure between the UE and the base station. To generate the random access preamble, the UE may repeat each time domain sample of a base sequence on a per-sample basis to obtain a repeated sequence that includes multiple repetitions of each time domain sample of the base sequence, with repetitions of the same sample being consecutive within the repeated sequence. The UE may perform such sample-wise repetition before adding a cyclic prefix (CP) to the repeated sequence or after adding a base CP to the base sequence.

30 Claims, 22 Drawing Sheets

(56) References Cited

U.S. PATENT DOCUMENTS

| | | | | |
|---|---|---|---|---|
| 2008/0095254 | A1* | 4/2008 | Muharemovic | H04L 27/2613 375/260 |
| 2009/0040918 | A1* | 2/2009 | Jiang | H04B 1/59 370/210 |
| 2009/0310691 | A1* | 12/2009 | Park | H04L 27/266 375/260 |
| 2011/0103499 | A1* | 5/2011 | Cheng | H04W 56/0045 455/517 |
| 2011/0129021 | A1* | 6/2011 | Shalev | H04J 13/0062 375/259 |
| 2012/0250655 | A1* | 10/2012 | Noh | H04L 27/2636 370/330 |
| 2012/0250656 | A1* | 10/2012 | Noh | H04L 5/0023 370/330 |
| 2013/0163572 | A1* | 6/2013 | Um | H04L 5/0091 370/336 |
| 2013/0242869 | A1* | 9/2013 | Shalev | H04J 13/14 370/328 |
| 2015/0043513 | A1* | 2/2015 | Noh | H04L 27/2636 370/329 |
| 2015/0139165 | A1* | 5/2015 | Noh | H04L 27/2605 370/329 |
| 2015/0263877 | A1* | 9/2015 | Chang | H04L 27/2692 370/350 |
| 2016/0100386 | A1* | 4/2016 | Noh | H04L 27/2636 370/329 |
| 2016/0135151 | A1* | 5/2016 | Noh | H04L 5/0053 370/329 |
| 2017/0006639 | A1* | 1/2017 | Shimizu | H04W 74/0833 |
| 2017/0094686 | A1* | 3/2017 | Ramamurthi | H04W 74/0833 |
| 2017/0134132 | A1* | 5/2017 | Noh | H04L 27/2613 |
| 2017/0238344 | A1* | 8/2017 | McGowan | H04L 5/0007 370/329 |
| 2017/0251493 | A1* | 8/2017 | Zhang | H04L 27/2628 |
| 2017/0257238 | A1* | 9/2017 | Qian | H04L 27/26025 |
| 2017/0373890 | A1* | 12/2017 | Fertonani | H04L 27/26 |
| 2018/0013581 | A1* | 1/2018 | Fertonani | H04L 69/04 |
| 2018/0013597 | A1* | 1/2018 | Barbieri | H04W 72/0413 |
| 2018/0034669 | A1* | 2/2018 | Barbieri | H04L 27/0002 |
| 2018/0198587 | A1* | 7/2018 | Noh | H04W 72/042 |
| 2018/0367200 | A1* | 12/2018 | Wiberg | H04W 16/28 |
| 2019/0007246 | A1* | 1/2019 | Fertonani | H04L 1/0006 |
| 2019/0159263 | A1* | 5/2019 | McGowan | H04L 5/0007 |
| 2019/0215877 | A1* | 7/2019 | Qian | H04L 27/2666 |
| 2019/0387550 | A1* | 12/2019 | Pan | H04W 74/0833 |
| 2020/0068616 | A1* | 2/2020 | Qian | H04W 74/002 |
| 2020/0252972 | A1* | 8/2020 | Rico Alvarino | H04L 5/0053 |
| 2021/0243820 | A1* | 8/2021 | Qian | H04W 74/0858 |
| 2022/0287098 | A1* | 9/2022 | Sakhnini | H04J 1/02 |

OTHER PUBLICATIONS

NTT Docomo, Inc: "Discussion and Evaluation on NR PRACH Design", 3GPP TSG RAN WG1 Meeting #88bis, R1-1705711_Discussion and Evaluation On NR PRACH Design_Final, 3GPP, Mobile Competence Centre, 650, Route Des Lucioles, F-06921 Sophia-Antipolis Cedex, vol. RAN WG1, No. Spokane, USA, Apr. 3, 2017-Apr. 7, 2017, Apr. 2, 2017, XP051243826, pp. 1-16, URL:http://www.3gpp.org/ftp/Meetings_3GPP_SYNC/RAN1/Docs/.

* cited by examiner

PER-SAMPLE REPETITION OF A RANDOM ACCESS PREAMBLE

FIELD OF TECHNOLOGY

The following relates to wireless communications, including per-sample repetition of a random access preamble.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-s-OFDM). A wireless multiple-access communications system may include one or more base stations or one or more network access nodes, each simultaneously supporting communication for multiple communication devices, which may be otherwise known as user equipment (UE).

In some cases, a UE may attempt to establish a connection with a base station using a random access procedure. As part of the random access procedure, the UE may transmit a random access preamble to the base station.

SUMMARY

The described techniques relate to improved methods, systems, devices, and apparatuses that support per-sample repetition of a random access preamble. Generally, the described techniques provide for generation and transmission of a random access preamble featuring repetition such that repetitions of a same time sample are consecutive within the random access preamble, which may be referred to as per-sample, sample-wise, or sample-by-sample repetition. For example, a user equipment (UE) may generate a sequence of time domain samples for a random access preamble, which may be considered a base sequence. The UE may repeat each sample of the base sequence some quantity of times to obtain a repeated sequence, where repetitions of a same time sample from the base sequence are consecutive within the repeated sequence. In some examples, after the repeating is performed on the base sequence, the UE may add a cyclic prefix (CP) to the repeated sequence, where the CP may include some additional quantity of time domain samples. Alternatively, in some other examples, the UE may add a CP—which may be considered a base CP—to the base sequence, and the UE may then repeat each sample of both the base sequence and the base CP some quantity of times in a sample-wise fashion to obtain the repeated sequence and a repeated CP. Whether the CP is added to the base sequence before or after per-sample repetition is performed, a length of the CP may effectively be increased increasing the length of the base sequence for the random access preamble, which may support a relatively greater area of cell coverage while maintaining or mitigating various complexities or errors associated with relatively longer base sequences, among other benefits that may be appreciated by one of ordinary skill in the art.

A method for wireless communication at a UE is described. The method may include generating, for a random access preamble, a sequence including a first quantity of samples in a time domain, repeating each sample included in the first quantity of samples to obtain, for the random access preamble, a second sequence including a second quantity of samples in the time domain that is greater than the first quantity of samples, where repetitions of a same sample are consecutive within the second sequence, and transmitting the random access preamble to a base station via signaling that is based on the second sequence.

An apparatus for wireless communication at a UE is described. The apparatus may include a processor, memory coupled with the processor, and instructions stored in the memory. The instructions may be executable by the processor to cause the apparatus to generating, for a random access preamble, a sequence include a first quantity of samples in a time domain, repeat each sample included in the first quantity of samples to obtain, for the random access preamble, a second sequence including a second quantity of samples in the time domain that is greater than the first quantity of samples, where repetitions of a same sample are consecutive within the second sequence, and transmit the random access preamble to a base station via signaling that is based on the second sequence.

Another apparatus for wireless communication at a UE is described. The apparatus may include means for generating, for a random access preamble, a sequence including a first quantity of samples in a time domain, means for repeating each sample included in the first quantity of samples to obtain, for the random access preamble, a second sequence including a second quantity of samples in the time domain that is greater than the first quantity of samples, where repetitions of a same sample are consecutive within the second sequence, and means for transmitting the random access preamble to a base station via signaling that is based on the second sequence.

A non-transitory computer-readable medium storing code for wireless communication at a UE is described. The code may include instructions executable by a processor to generating, for a random access preamble, a sequence include a first quantity of samples in a time domain, repeat each sample included in the first quantity of samples to obtain, for the random access preamble, a second sequence including a second quantity of samples in the time domain that is greater than the first quantity of samples, where repetitions of a same sample are consecutive within the second sequence, and transmit the random access preamble to a base station via signaling that is based on the second sequence.

Some examples of the method, apparatuses, and non-transitory computer-readable medium described herein may further include operations, features, means, or instructions for adding, prior to the repeating of each sample included in the first quantity of samples, a CP to the sequence, where the CP includes a third quantity of samples in the time domain and repeating each sample included in the third quantity of samples to obtain, for the random access preamble, a second CP including a fourth quantity of samples in the time domain that may be greater than the third quantity of samples, where repetitions of a same sample may be consecutive within the second CP.

Some examples of the method, apparatuses, and non-transitory computer-readable medium described herein may further include operations, features, means, or instructions for selecting, after the repeating of each sample included in the first quantity of samples, a third quantity of samples from the second sequence to obtain, for the random access preamble, a CP including the third quantity of samples and adding the CP to the second sequence.

In some examples of the method, apparatuses, and non-transitory computer-readable medium described herein, the third quantity of samples selected from the second sequence may be based on a product of a quantity of times that each sample included in the first quantity of samples may be repeated and a base length of the CP.

In some examples of the method, apparatuses, and non-transitory computer-readable medium described herein, the transmitting of the random access preamble to the base station includes transmitting the random access preamble via an orthogonal frequency-division multiplexing (OFDM) waveform and the method, apparatuses, and non-transitory computer-readable medium may include further operations, features, means, or instructions for performing a discrete Fourier transform (DFT) on the sequence including the first quantity of samples to obtain an output of the DFT and performing an inverse fast Fourier transform (IFFT) on the output of the DFT to obtain an output of the IFFT, where the repeating of each sample included in the first quantity of samples includes.

In some examples of the method, apparatuses, and non-transitory computer-readable medium described herein, the first quantity of samples in the time domain includes a series of time domain samples of a single carrier signal and the signaling via which the random access preamble may be transmitted includes a single carrier waveform that may be based on the single carrier signal.

Some examples of the method, apparatuses, and non-transitory computer-readable medium described herein may further include operations, features, means, or instructions for receiving, from the base station, a configuration of a guard period spanning a time duration and adding the guard period to an end of the second sequence, where the signaling via which the random access preamble may be transmitted may be based on the adding of the guard period to the end of the second sequence.

Some examples of the method, apparatuses, and non-transitory computer-readable medium described herein may further include operations, features, means, or instructions for receiving, from the base station, a configuration of a guard band spanning a quantity of subcarriers, where the quantity of subcarriers may be based on a quantity of times that each sample included in the first quantity of samples may be repeated and refraining from transmitting within the guard band during the transmitting of the random access preamble, where the transmitting of the random access preamble may be based on the refraining from transmitting within the guard band.

Some examples of the method, apparatuses, and non-transitory computer-readable medium described herein may further include operations, features, means, or instructions for receiving a configuration of one or more time gaps for separating at least some samples included in the second quantity of samples in the time domain and adding the one or more time gaps between the at least some samples included in the second quantity of samples, where the signaling via which the random access preamble may be transmitted may be based on the one or more time gaps.

Some examples of the method, apparatuses, and non-transitory computer-readable medium described herein may further include operations, features, means, or instructions for applying an orthogonal cover code (OCC) to the second sequence and a CP for the random access preamble, where the transmitting of the random access preamble may be based on the applying of the OCC to the second sequence and the CP.

Some examples of the method, apparatuses, and non-transitory computer-readable medium described herein may further include operations, features, means, or instructions for applying an OCC to the second sequence to obtain an encoded second sequence and adding a CP for the random access preamble to the encoded second sequence, where the transmitting of the random access preamble may be based on the encoded second sequence and the CP.

Some examples of the method, apparatuses, and non-transitory computer-readable medium described herein may further include operations, features, means, or instructions for applying a quantity of cyclic shifts to the second sequence including the second quantity of samples, the quantity of cyclic shifts based on a quantity of times that each sample included in the first quantity of samples may be repeated to obtain the second sequence, where the transmitting of the random access preamble may be based on the applying of the quantity of cyclic shifts to the second sequence.

Some examples of the method, apparatuses, and non-transitory computer-readable medium described herein may further include operations, features, means, or instructions for receiving, from the base station, a configuration of the first quantity of samples of the sequence, a configuration of a quantity of times that each sample included in the first quantity of samples may be repeated to obtain the second sequence, a configuration of a base length of a CP for the random access preamble, or any combination thereof.

A method for wireless communication at a base station is described. The method may include receiving a random access preamble from a UE via signaling that is based on a sequence that includes a second quantity of samples in a time domain, where each sample included in a first quantity of samples in the time domain is repeated within the sequence, and where repetitions of a same sample are consecutive within the sequence, generating a set of sequences based on selecting sets of non-consecutive samples from the second quantity of samples in the sequence according to a sample interval, the sample interval equal to a quantity of times that each sample included in the first quantity of samples is repeated within the sequence, and detecting the random access preamble based on a combination of two or more sequences included in the set of sequences.

An apparatus for wireless communication at a base station is described. The apparatus may include a processor, memory coupled with the processor, and instructions stored in the memory. The instructions may be executable by the processor to cause the apparatus to receive a random access preamble from a UE via signaling that is based on a sequence that includes a second quantity of samples in a time domain, where each sample included in a first quantity of samples in the time domain is repeated within the sequence, and where repetitions of a same sample are consecutive within the sequence, generate a set of sequences based on selecting sets of non-consecutive samples from the second quantity of samples in the sequence according to a sample interval, the sample interval equal to a quantity of times that each sample included in the first quantity of samples is repeated within the sequence, and detect the random access preamble based on a combination of two or more sequences included in the set of sequences.

Another apparatus for wireless communication at a base station is described. The apparatus may include means for receiving a random access preamble from a UE via signaling that is based on a sequence that includes a second quantity of samples in a time domain, where each sample included in a first quantity of samples in the time domain is repeated within the sequence, and where repetitions of a same sample are consecutive within the sequence, means for generating a set of sequences based on selecting sets of non-consecutive samples from the second quantity of samples in the sequence according to a sample interval, the sample interval equal to a quantity of times that each sample included in the first quantity of samples is repeated within the sequence, and means for detecting the random access preamble based on a combination of two or more sequences included in the set of sequences.

A non-transitory computer-readable medium storing code for wireless communication at a base station is described. The code may include instructions executable by a processor to receive a random access preamble from a UE via signaling that is based on a sequence that includes a second quantity of samples in a time domain, where each sample included in a first quantity of samples in the time domain is repeated within the sequence, and where repetitions of a same sample are consecutive within the sequence, generate a set of sequences based on selecting sets of non-consecutive samples from the second quantity of samples in the sequence according to a sample interval, the sample interval equal to a quantity of times that each sample included in the first quantity of samples is repeated within the sequence, and detect the random access preamble based on a combination of two or more sequences included in the set of sequences.

In some examples of the method, apparatuses, and non-transitory computer-readable medium described herein, each sequence of the set of sequences includes the first quantity of samples in the time domain.

In some examples of the method, apparatuses, and non-transitory computer-readable medium described herein, the receiving of the random access preamble may include operations, features, means, or instructions for receiving a CP sequence that includes a fourth quantity of samples in the time domain, where each sample included in a third quantity of samples in the time domain may be repeated the quantity of times within the CP sequence, and where repetitions of a same sample may be consecutive within the CP sequence.

Some examples of the method, apparatuses, and non-transitory computer-readable medium described herein may further include operations, features, means, or instructions for generating a set of CPs based on selecting sets of non-consecutive samples from the fourth quantity of samples in the CP sequence according to the sample interval, where the detecting of the random access preamble may be based on a combination of two or more CPs included in the set of CPs.

Some examples of the method, apparatuses, and non-transitory computer-readable medium described herein may further include operations, features, means, or instructions for transmitting, to the UE, a configuration of a guard period spanning a time duration, where the receiving of the random access preamble may be based on the guard period.

Some examples of the method, apparatuses, and non-transitory computer-readable medium described herein may further include operations, features, means, or instructions for transmitting, to the UE, a configuration of a guard band spanning a quantity of subcarriers, the quantity of subcarriers based on the quantity of times that each sample included in the first quantity of samples may be repeated within the sequence, where the receiving of the random access preamble may be based on the guard band.

Some examples of the method, apparatuses, and non-transitory computer-readable medium described herein may further include operations, features, means, or instructions for transmitting, to the UE, a configuration of one or more time gaps for separating at least some samples included in the second quantity of samples in the time domain and switching a receive beam of the base station during each of the one or more time gaps, where the receiving of the random access preamble may be based on the switching of the receive beam of the base station during each of the one or more time gaps.

In some examples of the method, apparatuses, and non-transitory computer-readable medium described herein, the generating of the set of sequences may include operations, features, means, or instructions for performing a DFT on each of the sets of non-consecutive samples that may be selected from the second quantity of samples to obtain a set of outputs of the DFT and performing an inverse discrete Fourier transform (IDFT) on each of the set of outputs of the DFT to obtain the set of sequences.

In some examples of the method, apparatuses, and non-transitory computer-readable medium described herein, the detecting of the random access preamble based on the combination of the two or more sequences included in the set of sequences may include operations, features, means, or instructions for combining sets of corresponding samples included in the two or more sequences to obtain a combination sequence and performing a signature detection procedure on the combination sequence to detect the random access preamble.

In some examples of the method, apparatuses, and non-transitory computer-readable medium described herein, the combining of the sets of corresponding samples includes coherent combining and the method, apparatuses, and non-transitory computer-readable medium may include further operations, features, means, or instructions for testing one or more hypotheses on the combination sequence, each of the one or more hypotheses corresponding to a respective OCC and detecting an OCC of the random access preamble based on the testing of the one or more hypotheses.

Some examples of the method, apparatuses, and non-transitory computer-readable medium described herein may further include operations, features, means, or instructions for transmitting, to the UE, a configuration of a quantity of cyclic shifts to apply to the sequence that includes the second quantity of samples, the quantity of cyclic shifts based on the quantity of times that each sample included in the first quantity of samples may be repeated within the sequence, where the receiving of the random access preamble may be based on the quantity of cyclic shifts.

Some examples of the method, apparatuses, and non-transitory computer-readable medium described herein may further include operations, features, means, or instructions for transmitting, to the UE, a configuration of the first quantity of samples, a configuration of the quantity of times that each sample included in the first quantity of samples may be repeated within the sequence, a configuration of a base length of a CP for the random access preamble, or any combination thereof.

In some examples of the method, apparatuses, and non-transitory computer-readable medium described herein, the combination of the two or more sequences included in the set of sequences may be based on coherent combining or non-coherent combining.

DETAILED DESCRIPTION

Figure 1:
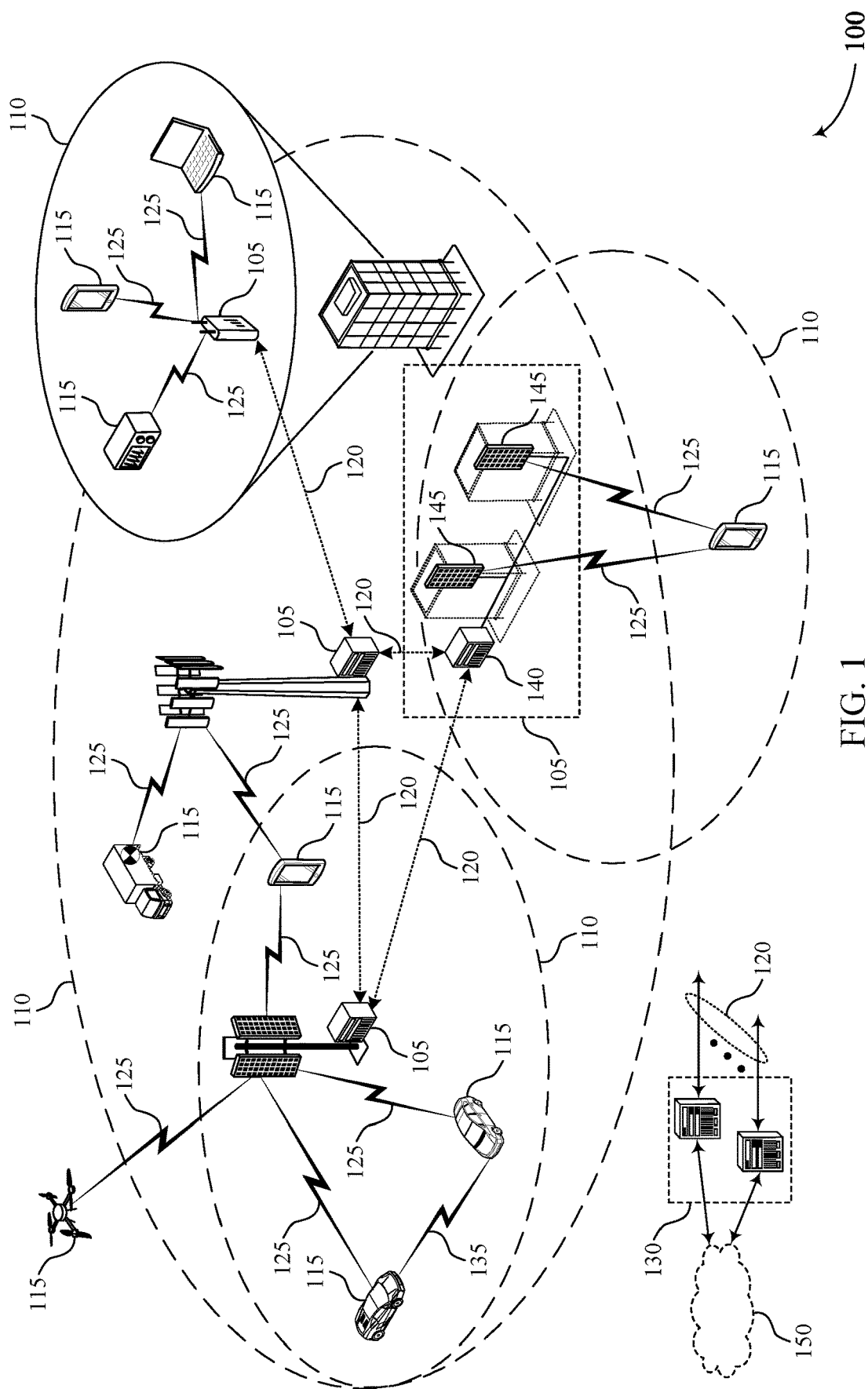
FIGS. 1 and 2 illustrate examples of wireless communications systems that support per-sample repetition of a random access preamble in accordance with aspects of the present disclosure.

In some wireless communications systems, a user equipment (UE) may attempt to establish a connection, such as a radio resource control (RRC) connection, with a base station using a random access procedure. As part of the random access procedure, the UE may transmit a random access preamble (e.g., a physical random access channel (PRACH) preamble) to the base station, which may include a cyclic prefix (CP) portion and a preamble sequence portion. In some aspects, the UE may receive a configuration of a random access preamble format (e.g., a PRACH format) and may transmit the random access preamble in accordance with the configured random access preamble format. In some cases, the random access preamble format may support sequence repetition on a symbol-by-symbol basis.

A design of the random access preamble may influence various aspects relating to cell coverage or communications within the cell served by the base station and, in some cases, may improve or satisfy a first aspect while adversely impacting a second aspect. For example, the UE may be configured to transmit the random access preamble using a relatively higher subcarrier spacing (SCS) to satisfy a timing resolution constraint, but such a relatively higher SCS may result in relatively shorter symbol and CP lengths, which may reduce the cell coverage of the base station. As another example, the UE may be configured with a relatively longer sequence length and a relatively lower SCS to satisfy the timing resolution constraint while also maintaining a relatively larger cell coverage (as CP length may increase with sequence length), but such a relatively longer sequence length may increase an occupied bandwidth of the random access preamble (which may result in relatively larger frequency estimation errors). Further, such a relatively shorter SCS may result in a relatively longer channel occupancy time (and, accordingly, increased channel blocking). As such, the interdependency between the design parameters of the random access preamble and cell coverage or communication metrics may result in relatively lower cell coverage, relatively larger channel blocking, or various design or implementation complexities, among other considerations that may be appreciated by one of ordinary skill in the art.

In accordance with aspects of the present disclosure, a UE may generate a random access preamble such that a constraint or target associated with cell coverage, occupied bandwidth, or channel blocking may be satisfied without adversely impacting a constraint or target associated with any other of the cell coverage, occupied bandwidth, or channel blocking. For example, a UE may repeat each time domain sample of a random access preamble a quantity of times (e.g., N times) on a per-sample basis such that repeated samples are consecutive in time. In other words, each time domain sample may be repeated in a manner that places repetitions of a same sample consecutively within the random access preamble as transmitted by the UE. In some examples, the UE may perform per-sample repetition after adding a base CP to a base sequence for the random access preamble, such that the repetition obtains a repeated CP and a repeated sequence for the random access preamble. In some other examples, the UE may perform per-sample repetition on a base sequence for the random access preamble, thereby obtaining a repeated sequence for the random access preamble, and the UE may then add a CP to the repeated sequence (e.g., the CP may be obtained by selecting time domain samples from the repeated sequence, such as from an end of the repeated sequence, and thus the CP may reflect the per-sample repetition previously performed to obtain the repeated sequence).

Particular aspects of the subject matter described in this disclosure may be implemented to realize one or more of the following potential advantages. For instance, sample-by-sample repetition for the random access preamble may effectively increase the length of the CP of the random access preamble (as samples of the CP are also repeated) without increasing the length of the base sequence, which may support larger cell coverage without increasing the occupied bandwidth of the random access preamble. Further, and based on implementing a CP featuring repetition on a per-sample basis, the UE may employ a relatively larger SCS (to achieve or satisfy a timing resolution constraint or target) while still maintaining a CP length that supports a sufficiently large cell coverage. Further, as a result of such sample-by-sample repetition for the random access preamble, samples of the random access preamble may cover fewer cyclic shifts, which may result in a greater quantity of available cyclic shifts that the UE can use for transmitting the random access preamble. As such, a random access preamble as described herein may feature greater multiplexing capability, which may result in increased system capacity, greater spectral efficiency, and higher data rates, among other benefits.

Aspects of the disclosure are initially described in the context of wireless communications systems. Additionally, aspects of the disclosure are illustrated by and described with reference to sequence generation procedures, a beam refinement procedure, example random access preambles, various combining procedures, and a process flow. Aspects of the disclosure are further illustrated by and described with reference to apparatus diagrams, system diagrams, and flowcharts that relate to per-sample repetition of a random access preamble.

FIG. 1 illustrates an example of a wireless communications system 100 that supports per-sample repetition of a random access preamble in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission expected) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a quantity of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-s-OFDM)). In a system employing MCM techniques, a resource element may include one symbol period (e.g., a duration of one modulation symbol) and one subcarrier, where the symbol period and subcarrier spacing are inversely related. The quantity of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the quantity of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a quantity of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission expected communications. The UEs 115 may be designed to support ultra-reliable, low-latency, or other functions (e.g., mission expected functions). Ultra-reliable communications may include private communication or group communication and may be supported by one or more mission-based services such as mission critical push-to-talk (MCPTT), mission critical video (MCVideo), or mission critical data (MCData). Support for mission-based functions may include prioritization of services, and mission-based services may be used for public safety or general commercial applications. The terms ultra-reliable, low-latency, mission-based, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured quantity of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may attempt to establish a connection, such as an RRC connection, with a base station 105 using a random access procedure. Such a random access procedure may include or be an example of a four-step random access procedure (which may be equivalently referred to as a Type-1 random access procedure) or a two-step random access procedure (which may be equivalently referred to as a Type-2 random access procedure). As part of a random access procedure, the UE 115 may transmit a random access preamble to the base station 105. In some aspects, the UE 115 may transmit the random access preamble to initiate the random access procedure (to indicate to the base station 105 that the UE 115 is trying to establish a connection with the base station 105) and to obtain uplink timing synchronization with the base station 105.

The random access preamble may include two components or parts, including a CP part and a sequence part. The UE 115 may generate the sequence and map the sequence to resources over which the UE 115 transmits the sequence to the base station 105 in accordance with a type of waveform that the UE 115 uses to transmit the random access preamble, as described in more detail herein, including with reference to FIGS. 3 and 4. The UE 115 may receive, from the base station 105, a configuration of a random access preamble according to which the UE 115 may transmit the random access preamble to the base station 105 and, in some examples, the random access preamble may support repetition of at least a portion of the random access preamble.

In some implementations, the UE 115 may repeat each sample of a base sequence (the generated sequence) a quantity of times (such as N times) to obtain a second sequence reflecting per-sample repetition of the base sequence. For example, the second sequence may include N repetitions of each sample included in the base sequence and the UE 115 may perform the repetition such that repetitions of a same sample are consecutive in time. The second sequence may correspond to the sequence part of the random access preamble. The UE 115 may perform the repetition before or after adding the CP to the sequence, and in either approach the CP may similarly feature per-sample repetition such that repetitions of a same sample of the CP are consecutive in time. Upon generating the random access preamble that is repeated on a sample-by-sample basis, the UE 115 may transmit the random access preamble to the base station 105.

Figure 2:
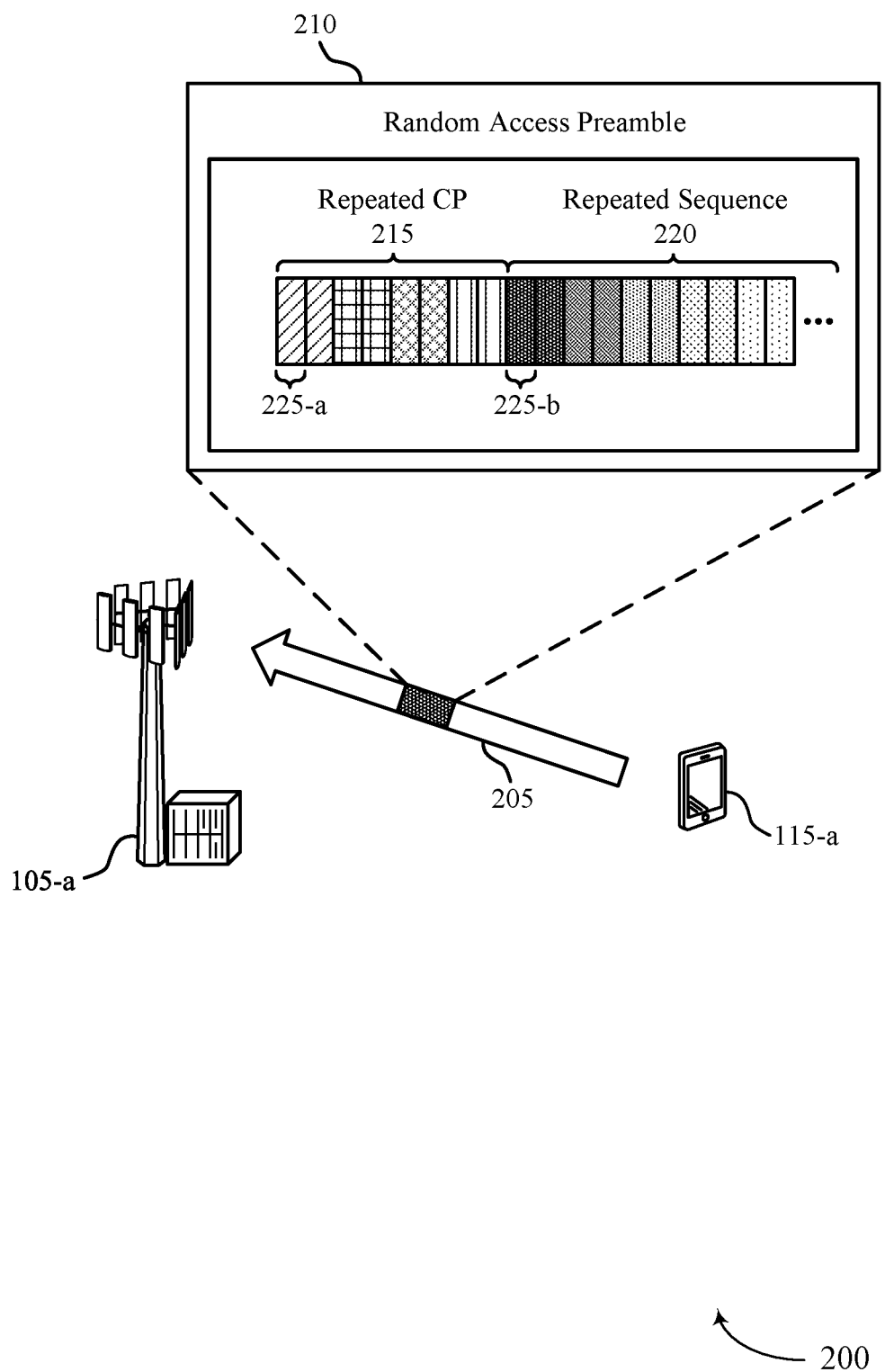

FIG. 2 illustrates an example of a wireless communications system 200 that supports per-sample repetition of a random access preamble in accordance with aspects of the present disclosure. The wireless communications system 200 may implement or be implemented to realize aspects of the wireless communications system 100. For example, the wireless communications system 200 may illustrate communication between a UE 115-*a* and a base station 105-*a*, which may be examples of corresponding devices described herein, including with reference to FIG. 1. In some examples, the UE 115-*a* may generate a random access preamble 210 including a repeated CP 215 and a repeated sequence 220 such that each sample 225 of the repeated CP 215 and the repeated sequence 220 is consecutively repeated a quantity of times (such as N times).

In some cases, the UE 115 may receive a configuration or an indication of a random access preamble format (e.g., a PRACH format, for a PRACH preamble) and may transmit a random access preamble according to the configured or indicated random access preamble format. In some aspects, different random access preamble formats may support or be otherwise associated with different cell sizes and coverage constraints. For example, a first random access preamble format may include a relatively larger CP than a second random access preamble format and, accordingly, the first random access preamble format may support a relatively larger cell coverage than the second random access preamble format. For further example, a first random access preamble format may include a relatively greater quantity of repetitions of a sequence than a second random access preamble format and, accordingly, the first random access preamble format may support more reliable detection of a random access preamble.

Further, in some cases, random access preamble formats may vary depending on the radio frequency band used for communication between the UE 115-*a* and the base station 105-*a*. For example, the UE 115-*a* and the base station 105-*a* may support a first set of random access preamble formats for a first radio frequency band, such as an FR1 radio frequency band (which may be associated with a numerology $\mu \in \{0,1\}$) and may support a second set of random access preamble formats for a second radio frequency band, such as an FR2 radio frequency band (which may be associated with a numerology $\mu \in \{2,3\}$). For the FR2 radio frequency band, including numerology $\mu \in \{2,3\}$, the supported random access preamble formats may be as shown in Table 1.

TABLE 1 random access preamble Formats for FR2, $\mu \in \{2, 3\}$

| Format | $L_{RA}$ | # OFDM Symbols | $N_u$ | $N_{CP}^{RA}$ | # Guard Samples |
|---|---|---|---|---|---|
| A1 | 139 | 2 | $2 \cdot 2048_K \cdot 2^{-u}$ | $288_K \cdot 2^{-u}$ | 0 |
| A2 | 139 | 4 | $4 \cdot 2048_K \cdot 2^{-u}$ | $576_K \cdot 2^{-u}$ | 0 |
| A3 | 139 | 6 | $6 \cdot 2048_K \cdot 2^{-u}$ | $864_K \cdot 2^{-u}$ | 0 |
| B1 | 139 | 2 | $2 \cdot 2048_K \cdot 2^{-u}$ | $216_K \cdot 2^{-u}$ | $72_K \cdot 2^{-u}$ |
| B2 | 139 | 4 | $4 \cdot 2048_K \cdot 2^{-u}$ | $360_K \cdot 2^{-u}$ | $216_K \cdot 2^{-u}$ |
| B3 | 139 | 6 | $6 \cdot 2048_K \cdot 2^{-u}$ | $504_K \cdot 2^{-u}$ | $360_K \cdot 2^{-u}$ |
| B4 | 139 | 12 | $12 \cdot 2048_K \cdot 2^{-u}$ | $936_K \cdot 2^{-u}$ | $792_K \cdot 2^{-u}$ |
| C0 | 139 | 2 | $1 \cdot 2048_K \cdot 2^{-u}$ | $1240_K \cdot 2^{-u}$ | $1092_K \cdot 2^{-u}$ |
| C2 | 139 | 6 | $4 \cdot 2048_K \cdot 2^{-u}$ | $2048_K \cdot 2^{-u}$ | $2912_K \cdot 2^{-u}$ |

As shown in Table 1, the UE 115-*a* and the base station 105-*a* may support different random access preamble formats if communicating over the FR2 radio frequency band and each random access preamble format may include a Zadoff-Chu sequence length $L_{RA}$ of 139. The various random access preamble formats may span different quantities of OFDM symbols and, in some cases, may support some level of repetition to increase the likelihood for successful detection of the random access preamble at the base station. For example, $N_u$ may refer to or be understood as a quantity of symbol repetitions of the sequence multiplied by a constant (such as $2048_K \cdot 2^{-u}$). In some aspects, each symbol of a random access preamble that carries a Zadoff-Chu sequence may include the 139-length sequence in the frequency domain such that the 139-length Zadoff-Chu sequence is conveyed over each symbol. Further, $N_{CP}^{RA}$ may refer to or be understood as a length of a CP. random access preamble formats A1, A2, and A3 may be absent of any quantity of guard samples (may include zero guard samples) while random access preamble formats B1, B2, B3, B4, C0, and C2 may include some quantity of guard samples as shown by Table 1.

From Table 1, a random access preamble formatted according to the random access preamble format A1 may include a CP, span two OFDM symbols, and include two repetitions of a Zadoff-Chu sequence on a per-symbol basis. A random access preamble formatted according to the random access preamble format A2 may include a CP, span four OFDM symbols, and include four repetitions of a Zadoff-Chu sequence on a per-symbol basis. A random access preamble formatted according to the random access preamble format A3 may include a CP, span six OFDM symbols, and include six repetitions of a Zadoff-Chu sequence on a per-symbol basis.

A random access preamble formatted according to the random access preamble format B1 may include a CP, span two OFDM symbols, include two repetitions of a Zadoff-Chu sequence, and include a guard period at the end of the second OFDM symbol. A random access preamble formatted according to the random access preamble format B2 may include a CP, span four OFDM symbols, include four repetitions of a Zadoff-Chu sequence on a per-symbol basis, and include a guard period at the end of the fourth OFDM symbol. A random access preamble formatted according to the random access preamble format B3 may include a CP, span six OFDM symbols, include six repetitions of a Zadoff-Chu sequence on a per-symbol basis, and include a guard period at the end of the sixth OFDM symbol. A random access preamble formatted according to the random access preamble format B4 may include a CP, span twelve OFDM symbols, include twelve repetitions of a Zadoff-Chu sequence on a per-symbol basis, and include a guard period at the end of the twelfth OFDM symbol. A random access preamble formatted according to the random access preamble format C0 may include a CP, span two OFDM symbols, include a single Zadoff-Chu sequence, and include a guard period at the end of the second OFDM symbol. A random access preamble formatted according to the random access preamble format C2 may include a CP, span six OFDM symbols, include four repetitions of a Zadoff-Chu sequence on a per-symbol basis, and include a guard period at the end of the sixth OFDM symbol.

In some cases, the format of a random access preamble may influence various aspects of system performance for the wireless communications system 200. For example, a supported cell size may influence or set limits on a length of a CP, a guard period, and a symbol length such that signaling from UEs 115 at different locations within the cell served by the base station 105-a arrives at the base station 105-a within the CP. In other words, if the UE 115-a and the base station 105-a communicate a random access preamble using a relatively larger SCS, the symbol length and, likewise, the CP length may be relatively shorter, which may result in a smaller coverage area of the base station 105-a because a (relatively remote, distant, or cell edge) second UE 115 may be unable to transmit signaling to the base station 105-a that arrives within the relatively shorter CP (due to a round trip delay (RTD) associated with the second UE 115). Further, a relatively smaller SCS may be associated with a relatively greater energy for a given bandwidth than a relatively larger SCS (which may be based on the relative differences in symbol lengths), which also may contribute to the relatively smaller SCS providing greater coverage than the relatively larger SCS.

Additionally or alternatively, a random access preamble may be subject to a timing resolution constraint at a random access preamble detector of the base station 105-a. In some aspects, such a timing resolution constraint at the random access preamble detector of the base station 105-a may support a sufficiently fine or accurate timing resolution for a timing advance (TA) command that the UE 115-a and the base station 105-a may use for uplink transmissions (such as uplink transmissions after the UE 115-a successfully connects with the base station 105-a). In some examples, such a timing resolution constraint may influence or set limits on the SCS and a sequence length of the sequence. For example, timing resolution may be calculated as or be a function of symbol time (which may be equivalent to 1/SCS) divided by sequence length and the timing resolution may be constrained such that it is less than a CP of uplink data.

As such, a relatively larger SCS may result in a relatively smaller (more accurate) timing resolution and, on the other hand, a relatively shorter SCS may result in a relatively larger (less accurate) timing resolution. Various SCSs and corresponding timing resolutions are shown in Table 2. As shown in Table 2, as SCS increases, an occupied bandwidth increases and the timing resolution decreases (e.g., becomes more accurate).

TABLE 2

SCS and Timing Resolution

| SCS (kHz) | $L_{RA}$ | BW (MHz) | Timing Resolution (ns) |
|---|---|---|---|
| 15 | 139 | 2.1 | 479.6 |
| 30 | 139 | 4.2 | 239.8 |
| 60 | 139 | 8.3 | 119.9 |
| 120 | 139 | 16.7 | 60.0 |
| 960 | 139 | 133.4 | 7.5 |
| 1920 | 139 | 266.9 | 3.75 |
| 3840 | 139 | 533.8 | 1.87 |

Further, a relatively larger SCS may reduce the duration of transmitted symbols in the time domain and, accordingly, reduce a time duration during which the UE 115-a is transmitting the random access preamble. On the other hand, a relatively smaller SCS may increase the duration of transmitted symbols in the time domain and, accordingly, increase a time duration during which the UE 115-a is transmitting the random access preamble. As such, the UE 115-a may reduce for how much time the UE 115-a blocks other channels or other UEs 115 if the UE 115-a employs a relatively larger SCS. For example, based on transmitting the random access preamble over a shorter duration, the UE 115-a may likewise occupy a physical channel (e.g., a PRACH) for a shorter duration, potentially opening more resources for transmissions from other UEs 115. Further, the base station 105-a may configure a receive beam to receive the random access preamble from the UE 115-a for the duration that the UE 115-a transmits the random access preamble, which may inhibit an ability of the base station 105-a to receive signaling from other directions (e.g., from other UEs 115) for the duration of the random access preamble transmission from the UE 115-a.

As described in the context of the supported cell size, however, a relatively larger SCS (which the UE 115-a or the base station 105-a may set to satisfy a timing resolution constraint or to reduce channel blocking) may be associated with a relatively smaller CP, which may in turn be associated with smaller coverage of the cell served by the base station 105-a. For example, cell dimensioning may depend on a length or size of a CP and any relevant guard period of the random access preamble such that a relatively larger SCS may correspond to a relatively smaller CP and, thus, a relatively smaller cell coverage. Further, an increasing of or a supplementing to the length or size of the CP or the guard period to accommodate a relatively larger cell size may fail to meaningfully increase cell coverage (or may be impractical or otherwise prohibited) because of a periodic property of a Zadoff-Chu sequence.

For example, the CP or the guard period may be defined such that a length or size of the CP or the guard period does not exceed the symbol length. If the CP or the guard period do exceed the symbol length, for instance, the base station 105-a may be unable to differentiate between the TA of different UEs 115. In other words, if the CP 215 or the guard period exceeds the symbol length, the base station 105-a may be unable to differentiate timing t vs t+K/SCS, where t is the TA within a full symbol duration and k=0, 1, . . . , M. For example, the base station 105-a may receive random access preambles from three different UEs 115 and the base station 105-a may set a receiver window (such as a receiver DFT or FFT window) that is aligned with the symbols received from a first UE 115 located at the cell center. Accordingly, if a guard period in each of the three random access preambles exceeds a symbol length, the base station 105-*a* may find detection peaks for both a second UE 115 (located between the first UE 115 and a third UE 115) and a third UE 115 (located at the cell edge) but, in some cases, may be unable to differentiate a second random access preamble received from the second UE 115 from a third random access preamble received from the third 115. For example, if the base station 105-*a* sets its receiver window such that the receiver window includes a same portion of the second random access preamble and the third random access preamble (e.g., such that the receiver window includes a same portion of a CP and a sequence of each of the random access preambles), the base station 105-*a* may be unable to differentiate the second random access preamble from the third random access preamble.

Further, in some cases, the UE 115-*a* or the base station 105-*a* may maintain a relatively smaller SCS (to satisfy a cell coverage constraint) and may increase the length of the sequence to support a random access preamble associated with a robust timing resolution, increases the likelihood of the receiver or detector at the base station 105-*a* to successfully detect the random access preamble, and supports sufficient cell coverage. Depending on the SCS and the bandwidth, however, this approach may similarly result in adverse side effects on other aspects of communication between the UE 115-*a* and the base station 105-*a*. At some relatively higher radio frequency bands (such as approximately 100 GHz and above), for example, the base station 105-*a* may experience a relatively larger oscillator error. For instance, oscillator errors may become relatively larger for relatively higher carrier frequencies and, in some cases, may be larger in magnitude than the relatively smaller SCS used by the UE 115-*a* and the base station 105-*a*. As such, the base station 105-*a* may experience substantial frequency estimation errors, which may reduce the likelihood for the base station 105-*a* to successfully detect the random access preamble.

Additionally or alternatively, such a relatively smaller SCS may correspond to relatively longer symbol periods and may lead to relatively greater time blockage for other (larger SCS) channels. Further, using a non-unified or different SCS as compared to the SCS of data may increase UE complexity or base station complexity, or both. Additionally, longer sequences may occupy a greater bandwidth (consuming more resources) and the UE 115-*a* and the base station 105-*a* may employ larger DFT sizes to process such longer sequences, which also may increase UE complexity or base station complexity, or both.

Accordingly, although a random access preamble design may be tailored for a specific constraint or target (such as cell coverage, timing resolution, or likelihood of detectability, among other examples), the interdependency between the parameters associated with such a random access preamble design and other aspects associated with cell coverage or communication within the wireless communications system 200 may result in the development or prominence of one or more adverse or undesirable conditions or metrics (such as poor cell coverage, poor timing resolution, lower likelihood of channel detection, or larger channel blocking depending on the specific constraint or target for which the random access preamble is designed).

As such, in some implementations of the present disclosure, the UE 115-*a* and the base station 105-*a* may use random access preambles with repetition on a sample-by-sample basis to support relatively larger cell coverage sizes without increasing a length of the sequence. Such a random access preamble 210 may thus provide for greater cell coverage without causing the increase in bandwidth and oscillator error associated with relatively longer sequences and while allowing for flexible SCS configurations to satisfy any relevant timing resolution or channel blocking constraint or target.

For example, the UE 115-*a* may generate a random access preamble 210 based on repeating each transmitted time domain sample 225 a quantity of consecutive times (such as N consecutive times). As such, the random access preamble 210 (including both the CP part and the sequence part) may include a series of time domain samples 225 in which a same sample 225 is repeated N consecutive times before a next, different sample 225 is similarly repeated N consecutive times. For example, the random access preamble 210 may include a repeated CP 215 including consecutive repetitions of a sample 225-*a* and a repeated CP 220 including consecutive repetitions of a sample 225-*b*. As shown in FIG. 2, samples 225 having a same illustrative pattern may be understood as being repetitions of a same sample 225.

In some examples, the UE 115-*a* may perform the per-sample repetition after adding a CP to the sequence. In such examples, the UE 115-*a* may repeat each sample 225 of the CP and the sequence of the random access preamble 210 to generate the repeated CP 215 and the repeated sequence 220. In some other examples, the UE 115-*a* may perform the per-sample repetition prior to adding the CP to the sequence. In such examples, the UE 115-*a* may repeat each sample 225 of the sequence to generate the repeated sequence 220 and may obtain the repeated CP 215 based on selecting samples 225 from an end of the repeated sequence 220 (such that the samples 225 selected for the repeated CP 215 include samples 215 that are each repeated N consecutive times by virtue of selecting the samples 225 from the repeated sequence 220). Additional details relating to such per-sample repetition after adding the CP or before adding the CP are described in more detail herein, including with reference to FIGS. 3 and 4.

In some implementations, the UE 115-*a* may perform the sample-by-sample repetition for the random access preamble 210 in accordance with or based on a type of waveform that the UE 115-*a* uses to transmit the random access preamble 210. For example, the UE 115-*a* may employ an OFDM waveform or a single carrier waveform for transmitting the random access preamble 210 to the base station 105-*a* and may perform the repetition for the random access preamble 210 differently (e.g., in different steps or in a different relative order) depending on which of the OFDM waveform or the single carrier waveform is used. As described herein, such an OFDM waveform may include, be an example of, or otherwise refer to any OFDM-based waveform. For instance, an OFDM-based waveform may include a frequency domain OFDM waveform or a DFT-s-OFDM waveform.

In examples in which the UE 115-*a* uses a frequency domain OFDM waveform or a DFT-s-OFDM waveform, the UE 115-*a* may perform an IFFT to obtain the time domain samples 225 of the sequence for the random access preamble 210. Accordingly, in such examples, the UE 115-*a* may perform the repetition on the IFFT output samples 225 (e.g., the time domain samples 225 obtained as an output of the IFFT). Alternatively, in some other examples, the UE 115-*a* may use a single carrier waveform including a set of time domain samples 225 that are in series (e.g., the UE 115-*a* may initially generate a series of time domain samples 225 without performing an IFFT if using a single carrier waveform). Accordingly, in such examples, the UE 115-a may perform the repetition on the time domain samples 225 (without performing an IFFT). Such various implementations of the repetition depending on a type of the waveform that the UE 115-a uses is illustrated by and described in more detail with reference to FIGS. 3 and 4.

In some examples, the UE 115-a may add a guard period at the end of the repeated sequence 220 of the random access preamble 220. For example, the guard period may include a set of time domain resources (such as samples or symbols) that the UE 115-a may append to the random access preamble 220 after the repeated sequence 220. As such, the UE 115-a may refrain from transmitting for a duration of the guard period.

In some cases, the base station 105-a may schedule communication or allocate resources to one or more other UEs 115 such that one or more other channels (such as a data channel or a control channel) are frequency division multiplexed with the random access preamble 210. For example, the base station 105-a may schedule other communication over a same set of time domain resources used by the UE 115-a to transmit the random access preamble 210 and the simultaneous signaling may be frequency division multiplexed with each other. In some cases, the random access preamble 210 may experience some level of inter-carrier interference (ICI) from the other communication. As such, in some implementations, the base station 105-a may configure additional guard subcarriers (e.g., a greater quantity of guard subcarriers than the base station 105-a may have otherwise configured for a random access preamble featuring symbol-by-symbol repetition) that are added on either side of the random access preamble 210 in the frequency domain to mitigate the ICI from the other communication. In some examples, a quantity of the guard subcarriers that the base station 105-a may configure for the random access preamble 210 may be based on (e.g., may be a function of or otherwise correlate positively with) the quantity of times N that each sample of the random access preamble 210 is repeated. The UE 115-a (and potentially one or more other UEs 115 that receive the guard band configuration) may refrain from transmitting over the guard subcarriers based on receiving the configuration of the guard subcarriers from the base station 105-a.

Additionally or alternatively, the UE 115-a may insert one or more time gaps between various samples 225 of the random access preamble 210 to support a beam switching procedure at the base station 105-a. In some aspects, the UE 115-a may receive a configuration of the one or more time gaps from the base station 105-a and may insert the time gaps in accordance with the configuration received from the base station 105-a. Additional details relating to such a receive beam switching procedure at the base station while receiving the random access preamble 210 are described herein, including with reference to FIG. 5.

Further, the UE 115-a and the base station 105-a may support any other aspect of the generation or transmission of the random access preamble 210 based on configuration signaling from the base station 105-a. For example, the base station 105-a may additionally, or alternatively, transmit a configuration of a quantity of samples for the UE 115-a to include in a base sequence (e.g., a length of the sequence that the UE 115-a repeats to obtain the repeated sequence 220), a configuration of the quantity of times N that the UE 115-a is to repeat each sample 225 of the base sequence to obtain the repeated sequence 220, a configuration of a base length of the CP for the random access preamble 210 (e.g., a length of the CP that the UE 115-a repeats to obtain the repeated CP 215), or any combination thereof, among any other configuration of a parameter that may assist the UE 115-a in generating or transmitting the random access preamble 210.

In some implementations, the UE 115-a and the base station 105-a may support an application of an orthogonal cover code (OCC) on the random access preamble 210 to increase the multiplexing capability associated with the random access preamble 210. In some examples, such as in examples in which the UE 115-a adds the CP to the sequence prior to performing the repetition, the UE 115-a may apply an OCC to the repeated CP 215 and the repeated sequence 220 (e.g., the UE 115-a may apply the OCC to the full random access preamble 210). Alternatively, in some other examples, such as in examples in which the UE 115-a selects the repeated CP 215 from the repeated sequence 220 and adds the repeated CP 215 to the repeated sequence 220, the UE 115-a may apply the OCC to the repeated sequence 220 prior to selecting and adding the repeated CP 215 (e.g., the UE 115-a may apply the OCC specifically to the repeated sequence 220). Such various implementations for applying an OCC to the random access preamble 210 are illustrated by and described in more detail with reference to FIGS. 3 and 4.

Additionally or alternatively, the UE 115-a may apply a quantity of cyclic shifts to the random access preamble 210. In some cases, the quantity of cyclic shifts may be based on (e.g., limited by) a delay spread and a size of the cell served by the base station 105-a. In some implementations of the present disclosure, however, a same quantity of samples 225 of the random access preamble 210 that features sample-by-sample repetition may span or cover fewer cyclic shifts than the same quantity of samples 225 of a random access preamble that features symbol-by-symbol repetition. As such, for a given delay spread or cell size, the UE 115-a may use a greater quantity of cyclic shifts for transmitting the random access preamble 210 featuring sample-by-sample repetition than for transmitting a random access preamble featuring symbol-by-symbol repetition. Additional details relating to such an available quantity of cyclic shifts that the UE 115-a may use for transmitting the random access preamble 210 featuring sample-by-sample repetition are described herein, including with reference to FIG. 6.

The UE 115-a may transmit the random access preamble 210 including the repeated CP 215 and the repeated sequence 220 to the base station 105-a over a communication link 205 and, likewise, the base station 105-a may receive the random access preamble 210 from the UE 115-a and attempt to detect the random access preamble 210. In some examples, the base station 105-a may receive the random access preamble 210 including the repeated CP 215 and the repeated sequence 220 and may generate a set of sequences (with CPs) based on selecting sets of non-consecutive samples from the random access preamble 210 according to a sample interval.

For example, if the UE 115-a transmits the random access preamble 210 such that each sample 225 of the random access preamble 210 is consecutively repeated N times, the base station 105-a may generate N sequences based on selecting every $N^{th}$ sample 225 from the received random access preamble 210. In other words, a quantity of sequences generated at the receiver or detector of the base station 105-a and the sample interval may be based on (e.g., equal to) N. As illustrated in FIG. 2, N=2 (e.g., each sample 225 is repeated twice) and the base station 105-a may accordingly generate a set of two sequences based on selecting every second sample 225 from the random access preamble 210.

As such, the base station 105-a may obtain N versions of a same (or similar) base sequence (because the base station 105-a may avoid selecting any repeats of a same sample 225 based on selecting according to the sample interval) and may detect the random access preamble 210 based on a combination of the N versions of the same (or similar) base sequence. The base station 105-a may calculate or perform the combination of the N versions of the same (or similar) base sequence based on implementing a coherent combining procedure or implementing a non-coherent combining procedure. Additional details relating to example operations that the base station 105-a may perform to generate the set of N sequences (e.g., the N versions of the same (or similar) base sequence) and to detect the random access preamble 210 received from the UE 115-a are described herein, including with reference to FIGS. 7 and 8.

The UE 115-a, based on repeating each sample 225 of a generated sequence N times to obtain the random access preamble 210 (including the repeated CP 215 and the repeated sequence 220) in which repetitions of a same sample 225 are consecutive within the random access preamble 210, may effectively increase the length of the CP portion of the random access preamble 210. For example, the CP portion of the random access preamble 210 may become N times larger based on implementing the described repetition procedure. As such, the random access preamble 210 may support, allow for, or otherwise align with a cell size that is up to approximately N times larger and may support RTDs that are up to approximately N times larger as compared to a random access preamble that features symbol-by-symbol repetition. Further, the base station 105-a may experience such increase in cell coverage without restricting the length of the base sequence or an SCS used by the UE 115-a, which may provide for more flexible system design, less channel blocking, or lower oscillator errors, among other benefits.

Figure 3:
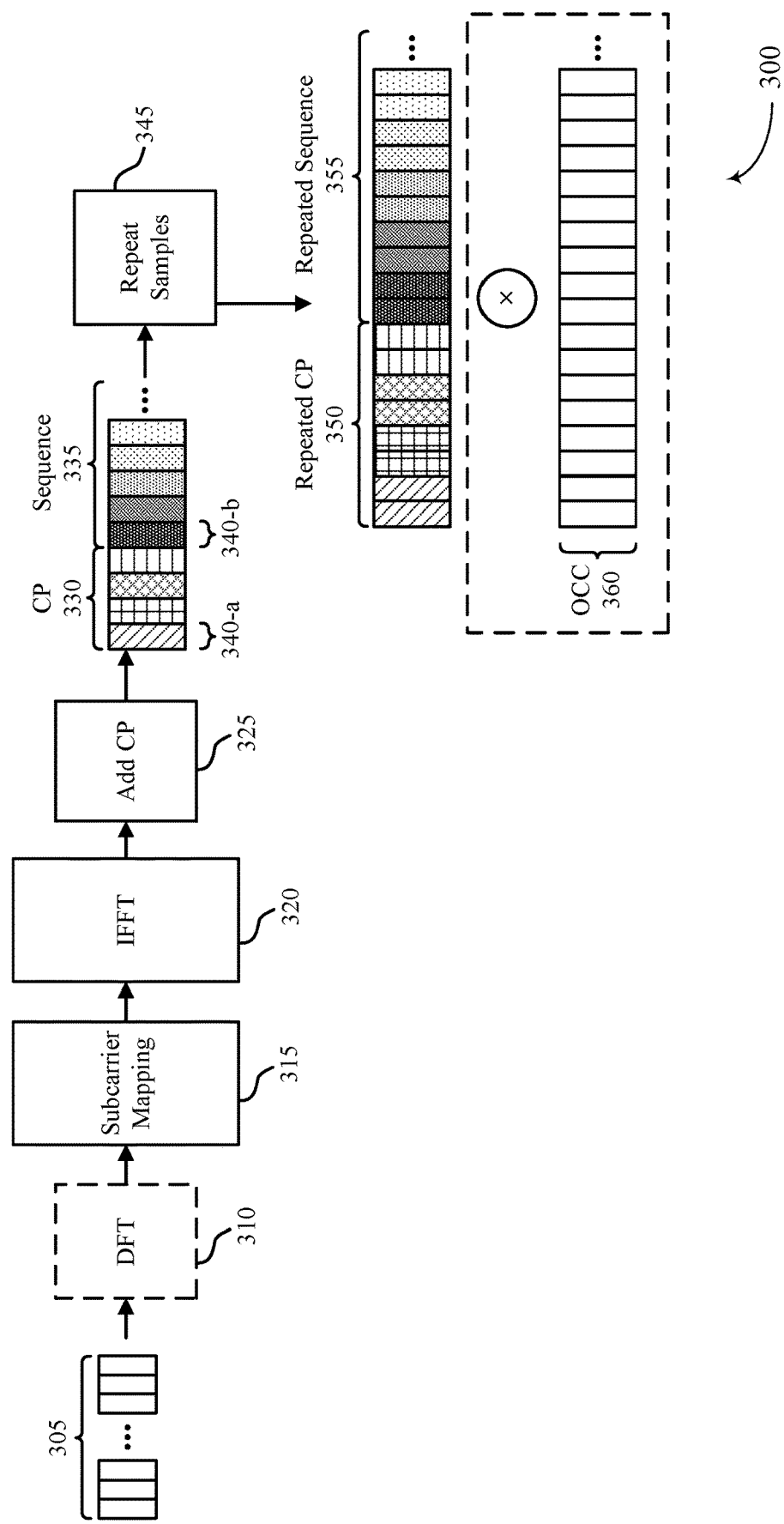
FIGS. 3 and 4 illustrate examples of preamble generation procedures that support per-sample repetition of a random access preamble in accordance with aspects of the present disclosure.

FIG. 3 illustrates an example of a preamble generation procedure 300 that supports per-sample repetition of a random access preamble in accordance with aspects of the present disclosure. The preamble generation procedure 300 may be implemented to realize aspects of the wireless communications system 100 or the wireless communications system 200. For example, a UE 115 may perform the operations shown by the preamble generation procedure 300 to generate a random access preamble that features repetition at the sample level (such that repetitions of a same sample are consecutive within the random access preamble) and the UE 115 may transmit the random access preamble to a base station 105, and such a UE 115 and a base station 105 may be examples of corresponding devices described herein, including with reference to FIGS. 1 and 2.

In some aspects, the UE 115 may perform the preamble generation procedure 300 in examples in which the UE 115 transmits the random access preamble via an OFDM-based waveform (such as a frequency domain OFDM waveform or a DFT-s-OFDM waveform). In such examples in which the UE 115 transmits the random access preamble via the OFDM-based waveform, for instance, the UE 115 may generate a first base sequence 305 (such as a Zadoff-Chu sequence) of length $L_{RA}$ and may map the first base sequence 305 to a quantity of subcarriers in the frequency domain. The UE 115 may generate the first base sequence 305 in various ways according to configuration, implementation, or UE-decision. For instance, in examples in which the first base sequence 305 is a Zadoff-Chu sequence, the UE 115 may leverage that a DFT of a Zadoff-Chu sequence is another (scaled) Zadoff-Chu sequence to support greater flexibility when generating or inserting the first base sequence 305 into transmission resources. For example, based on using a Zadoff-Chu sequence of length $L_{RA}$ as the first base sequence 305, the UE 115 may generate or otherwise insert the first base sequence 305 in the time domain or in the frequency domain.

If the UE 115 inserts the first base sequence 305 into the time domain (such that the UE 115 generates a time domain Zadoff-Chu sequence), the UE 115 may perform a DFT (or an FFT) on the first base sequence 305 at 310 to convert the first base sequence 305 into the frequency domain and may map the frequency domain first base sequence 305 to a quantity of subcarriers at 315. In such examples in which the UE 115 performs the DFT on the first base sequence 305, the output of the DFT may also be a Zadoff-Chu sequence of length $L_{RA}$, but in the frequency domain instead of the time domain. Alternatively, if the UE 115 inserts the first base sequence 305 into the frequency domain (such that the UE 115 generates a frequency domain Zadoff-Chu sequence), the UE 115 may skip the DFT at 310 and (directly) map the first base sequence 305 to a quantity of subcarriers at 315. In such examples in which the UE 115 inserts the first base sequence 305 into the frequency domain, the UE 115 may skip the DFT at 310 because the first base sequence 305 is already in the frequency domain. In some aspects, the quantity of subcarriers to which the UE 115 maps the first base sequence 305 may be based on (e.g., equal to) the length of the first base sequence 305 (e.g., if $L_{RA}=139$ the UE 115 may map the sequence to 139 subcarriers).

At 320, the UE 115 may perform an IFFT (or an IDFT) on the first base sequence 305 that is mapped to the quantity of subcarriers. In some aspects, the IFFT may be associated with a size (such as 4096) and, based on performing the IFFT, the UE 115 may obtain an output of the IFFT that includes a first quantity of time domain samples 340, which may be referred to as a second base sequence 335. In some cases, the first quantity of time domain samples 340 of the second base sequence 335 may be based on (e.g., equal to) the size of the IFFT. For example, if the IFFT has a size of 4096, the UE 115 may obtain the second base sequence 335 including 4096 time domain samples 340. In other words, the UE 115 may place the sequence of length $L_{RA}$ (which are mapped to the quantity of subcarriers) into 4096 time domain samples 340, or chips (e.g., chip samples, which may be based on a chip sampling rate).

The UE 115, based on generating the first quantity of time domain samples 340 of the second base sequence 335, may add a CP 330 to the beginning of the second base sequence 335. In some aspects, the CP 330 may have a length (e.g., a base length) of L, which may be configured at the UE 115 by the base station 105. The base length of the CP 330 may refer to a third quantity of samples included in the CP 330. In some examples, the UE 115 may add the CP 330 to the second base sequence 335 based on selecting the third quantity of time domain samples 340 from the end of the second base sequence 335 and adding the third quantity of time domain samples 340 to the beginning of the second base sequence 335.

At 345, the UE 115 may repeat each sample 340 of the first quantity of time domain samples 340 included in the second base sequence 335 to obtain a repeated sequence 355 that includes a second quantity of time domain samples 340. The UE 115 may also repeat each time domain sample 340 of the third quantity of samples 340 included in the CP 330 to obtain a repeated CP 350 that includes a fourth quantity of time domain samples 340. In some implementations, the UE 115 may perform the repeating at 345 on a sample-by-sample basis such that repetitions of a same time domain sample 340 are consecutive (in time) within both the repeated CP 350 and the repeated sequence 355. For example, if the UE 115 repeats each time domain sample 340 N=2 times, a time domain sample 340-a included in the CP 330 may be included twice consecutively in the repeated CP 350 and a time domain sample 340-b included in the second base sequence 335 may be included twice consecutively in the repeated sequence 355.

Similarly, if the UE 115 repeats each sample N=4 times, the sample 340-a would be included four times consecutively in the repeated CP 350 and the sample 340-b would be included four times consecutively in the repeated sequence 355. Generally, the second quantity of time domain samples 340 included in the repeated sequence 355 may be based on (e.g., equal to) a product of the length of the second base sequence 335 (which may be referred to as a base sequence) and the N repetitions. Similarly, the fourth quantity of time domain samples 340 included in the repeated CP 350 may be based on (e.g., equal to) a product of the base length L of the CP 330 and the N repetitions. Further, as illustrated in FIG. 3, an illustrative pattern of a time domain sample 340 may denote or indicate a sample from the second base sequence 335 and consecutive time domain samples 340 with a same illustrative pattern may show how a same time domain sample 340 is consecutively repeated.

Further, although shown in the context of FIG. 3 as repeating the time domain samples 340 of the CP 330 and the time domain samples 340 of the second base sequence 335 at 345 (e.g., after the adding of the CP 330 at 325), the UE 115 may alternatively repeat the time domain samples 340 of the second base sequence 335 prior to adding the CP 330 to the second base sequence 335. For example, the UE 115 may repeat each time domain sample 340 of the second base sequence 335 from the output of the IFFT performed at 320 to obtain the repeated sequence 355 prior to adding the CP 330 (such that the adding of the CP 330 at 325 may effectively occur after the repeating of the time domain samples 340 at 345). In such examples, the UE 115 may add the repeated CP 350 after obtaining the repeated sequence 355 and based on selecting the fourth quantity of time domain samples 340 (which may be equal to the product of the base length L of the CP 330 and the N repetitions) from the end of the repeated sequence 355 and adding the fourth quantity of time domain samples 340 to the beginning of the repeated sequence 355.

In some implementations, the UE 115 may optionally apply an OCC 360 to the repeated CP 350 and to the repeated sequence 355. For example, the base station 105 may configure one or more sets of UEs 115 (where a set of UEs 115 may include one or more UEs 115) with different OCCs 360 such that random access preambles from the UEs 115 of the one or more sets of UEs 115 may be multiplexed with each other (which may increase system capacity). In some examples, such as in examples in which the UEs 115 and the base station 105 support the use of a Walsh cover, the quantity of different sets of UEs 115 that the base station may configure for OCC-based multiplexing may be based on (e.g., equal to) the quantity of repetitions N. Additional details relating to such an OCC-based multiplexing of various random access preambles including CPs and sequences that are repeated on a per-sample basis are described herein, including with reference to FIG. 8.

Further, although shown as applying the OCC 360 to the repeated CP 350 and to the repeated sequence 355, the UE 115 may alternatively apply the OCC 360 to the repeated sequence 355 after repetition but prior to adding the repeated CP 350. In such examples in which the UE 115 applies the OCC 360 to the repeated sequence 355 prior to adding the repeated CP 350, the repeated CP 350 may nonetheless reflect the OCC 360 because the time domain samples 340 included in the repeated CP 350 are selected from the end of the repeated sequence 355 (which conveys the information associated with the applied OCC 360).

Figure 4:
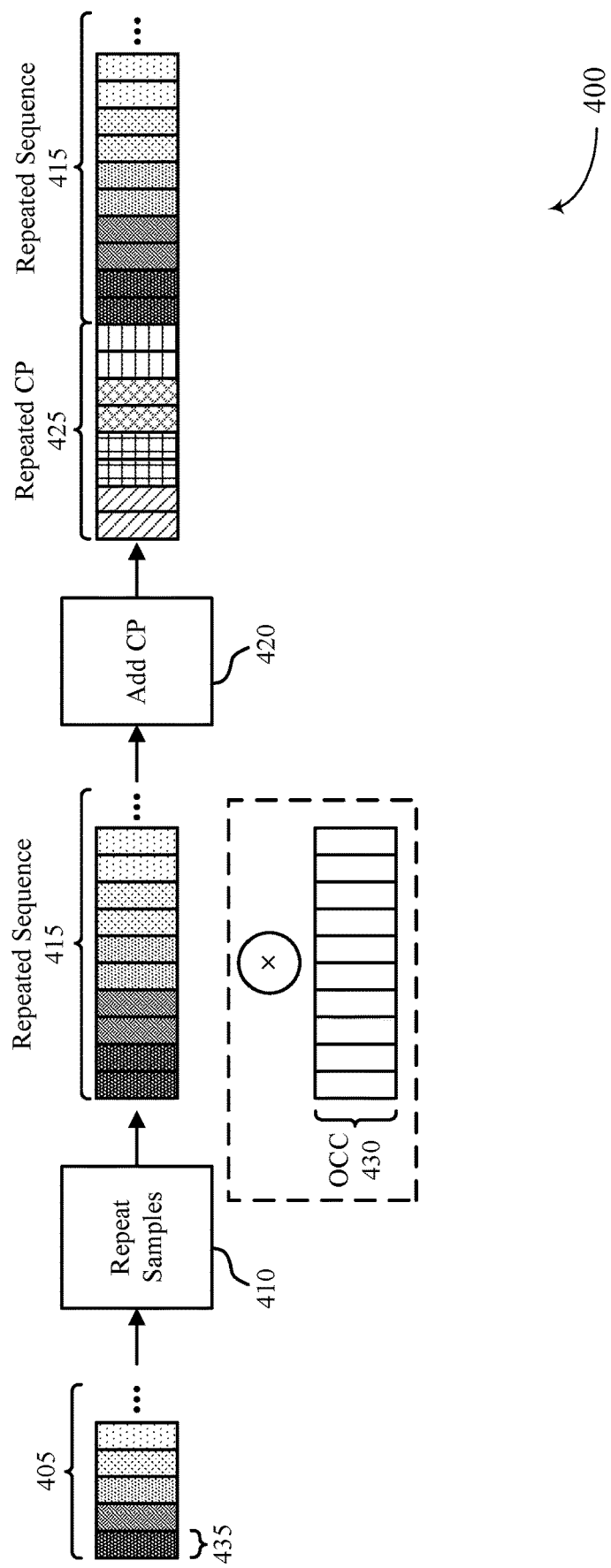

FIG. 4 illustrates an example of a preamble generation procedure 400 that supports per-sample repetition of a random access preamble in accordance with aspects of the present disclosure. The preamble generation procedure 400 may be implemented to realize aspects of the wireless communications system 100 or the wireless communications system 200. For example, a UE 115 may perform the operations shown by the preamble generation procedure 400 to generate a random access preamble that features repetition at the sample level (such that repetitions of a same sample are consecutive within the random access preamble) and the UE 115 may transmit the random access preamble to a base station 105, and such a UE 115 and a base station 105 may be examples of corresponding devices described herein, including with reference to FIGS. 1 and 2.

In some aspects, the UE 115 may perform the preamble generation procedure 400 in examples in which the UE 115 transmits the random access preamble via a single carrier waveform. In such examples in which the UE 115 transmits the random access preamble via the single carrier waveform, for instance, the UE 115 may generate a base sequence 405 (such as a Zadoff-Chu sequence) of length $L_{RA}$ and may map the base sequence 405 to a quantity of time domain resources. In some aspects, the UE 115 may map the base sequence 405 to a first quantity of time domain samples 435.

At 410, the UE 115 may, in some examples, repeat each time domain sample 435 of the first quantity of time domain samples 435 included in the base sequence 405 to obtain a repeated sequence 415 that includes a second quantity of time domain samples 435. In some implementations, the UE 115 may perform the repeating on a sample-by-sample basis such that repetitions of a same time domain sample 435 are consecutive (in time) within the repeated sequence 415. For example, if the UE 115 repeats each time domain sample 435 N=2 times, each time domain sample 435 included in the first quantity of samples of the base sequence 405 may be repeated twice consecutively within the repeated sequence 415. Similarly, if the UE 115 repeats each sample N=4 times, each time domain sample 435 included in the first quantity of samples of the base sequence 405 may be repeated four times consecutively in the repeated sequence 415.

At 420, the UE 115 may add a repeated CP 425 to the repeated sequence 415. In some examples, the UE 115 may add the repeated CP 425 to the repeated sequence 415 based on selecting a quantity of time domain samples 435 from the end of the repeated sequence 415 and adding the quantity of selected time domain samples 435 to the beginning of the repeated sequence 415. In such examples, the CP added to the repeated sequence 415 may effectively be understood as the repeated CP 425 because the time domain samples 435 included in the repeated sequence 415 from which the UE 115 selects the CP already include repetitions of each time domain sample 435 from the first quantity of time domain samples 435 included in the base sequence 405. In other words, the repeated CP 425 may include consecutive repetitions of a quantity of time domain samples 435 with similarity to the repeated sequence 415. In some implementations, the quantity of time domain samples 435 selected for the repeated CP 425 may be based on (e.g., equal to) a product of a configured base length L of the CP and the quantity of repetitions N. As illustrated in FIG. 4, an illustrative pattern of a time domain sample 435 may denote or indicate a sample from the base sequence 405 and consecutive time domain samples 435 with a same illustrative pattern may show how a same time domain sample 435 is consecutively repeated.

Further, although shown in the context of FIG. 4 as repeating the time domain samples 435 of the base sequence 405 at 410 (e.g., before adding a CP at 420), the UE 115 may alternatively repeat the time domain samples 435 of the base sequence 405 after adding the CP to the base sequence 405. In some implementations, for example, the UE 115 may add a CP to the base sequence 405 before repeating samples at 410. In such implementations, the UE 115 may add a CP to the base sequence 405 based on selecting a third quantity of samples from the end of the base sequence 405 and adding the selected third quantity of samples to the beginning of the base sequence 405. At 410, in such implementations in which the UE 115 adds a CP prior to the repeating of the samples, the UE 115 may accordingly repeat each time domain sample 435 of the first quantity of time domain samples 435 included in the base sequence 405 to obtain the second quantity of time domain samples 435 of the repeated sequence 415 and may additionally repeat each time domain sample 435 of the third quantity of time domain samples 435 included in the CP to obtain a fourth quantity of time domain samples 435 of a repeated CP 425 (such that the fourth quantity is equal to L×N).

In some implementations, the UE 115 may optionally apply an OCC 430 to the repeated sequence 415. For example, the base station 105 may configure one or more sets of UEs 115 (where a set of UEs 115 may include one or more UEs 115) with different OCCs 430 such that random access preambles from the UEs 115 of the one or more sets of UEs 115 may be multiplexed with each other (which may increase system capacity). In some examples, such as in examples in which the UEs 115 and the base station 105 support the use of a Walsh cover, the quantity of different sets of UEs 115 that the base station may configure for OCC-based multiplexing may be based on (e.g., equal to) the quantity of repetitions N. Additional details relating to such an OCC-based multiplexing of various random access preambles including CPs and sequences that are repeated on a per-sample basis are described herein, including with reference to FIG. 8.

Further, although shown as applying the OCC 430 to the repeated sequence 415, the UE 115 may alternatively apply the OCC 430 to the repeated CP 425 and the repeated sequence 415. For example, instead of applying the OCC 430 to the repeated sequence 415 prior to adding the repeated CP 425, the UE 115 may apply the OCC 430 to both of the repeated CP 425 and the repeated sequence 415 after adding the repeated CP 425.

Figure 5:
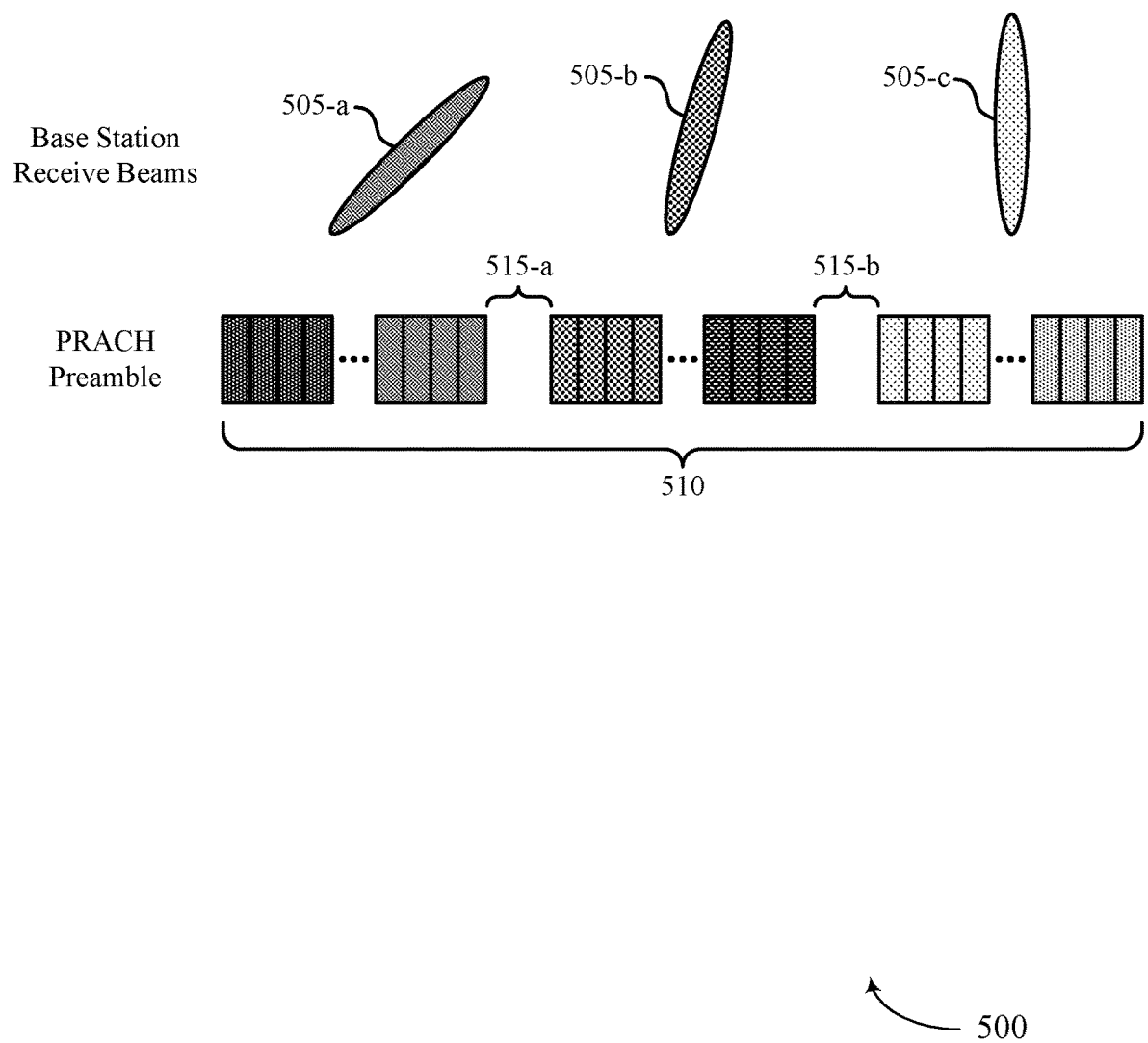
FIG. 5 illustrates an example of a beam refinement procedure that supports per-sample repetition of a random access preamble in accordance with aspects of the present disclosure.

FIG. 5 illustrates an example of a beam refinement procedure 500 that supports per-sample repetition of a random access preamble in accordance with aspects of the present disclosure. The beam refinement procedure 500 may be implemented to realize aspects of the wireless communications system 100 or the wireless communications system 200. For example, a base station 105 may attempt to receive a random access preamble 510 from a UE 115 using a quantity of different receive beams 505, and the UE 115 and the base station 105 may be examples of corresponding devices described herein, including with reference to FIGS. 1 and 2. In some examples, the UE 115 may generate the random access preamble 510 such that each time domain sample of the random access preamble is repeated in a consecutive manner (e.g., based on sample-by-sample repetition), as described in more detail herein, including with reference to FIGS. 2 through 4.

In some implementations, the UE 115 may insert one or more time gaps 515, such as a time gap 515-a and a time gap 515-b, between the repeated samples of the random access preamble 510. In such implementations, the base station 105 may use the one or more time gaps 515 to perform the beam refinement procedure 500. For example, the time gaps 515 may provide sufficient time between samples of the random access preamble 510 for the base station 105 to switch receive beams 505. In other words, the time gaps 515 may allow for any beam switching delays experienced at the base station 105 (e.g., such that the base station 105 may switch receive beams 505 without missing any samples of the random access preamble 510). As such, the base station 105 may refine a receive beam 505 used by the base station 105 using (e.g., based on receiving) the random access preamble 510 including the time gaps 515.

As shown in the beam refinement procedure 500, the base station 105 may use a receive beam 505-a to receive a first portion of the random access preamble and may switch from using the receive beam 505-a to using a receive beam 505-b during the time gap 515-a. Accordingly, the base station 105 use the receive beam 505-b to receive a second portion of the random access preamble 510 and may switch from using the receive beam 505-b to using a receive beam 505-c during the time gap 515-b. Accordingly, the base station 105 may use the receive beam 505-c to receive a third portion of the random access preamble 510.

In some aspects, the base station 105 may transmit a configuration of the one or more time gaps 515 to the UE 115 and the UE 115 may insert the one or more time gaps 515 between some samples of the random access preamble 510 in accordance with the configuration. The configuration may configure or otherwise indicate a time duration for each of the one or more time gaps 515, a location in the random access preamble 510 for each of the one or more time gaps 515, a periodicity for the one or more time gaps 515 within the random access preamble 510, or any combination thereof, among any other parameters or features associated with the one or more time gaps 515. In some examples, a time gap 515 may separate a set of repetitions of a first sample from a set of repetitions of a second sample. Additionally or alternatively, a time gap 515 may separate any two consecutive samples (regardless of whether they are repetitions of a same sample or repetitions of different samples).

Figure 6:
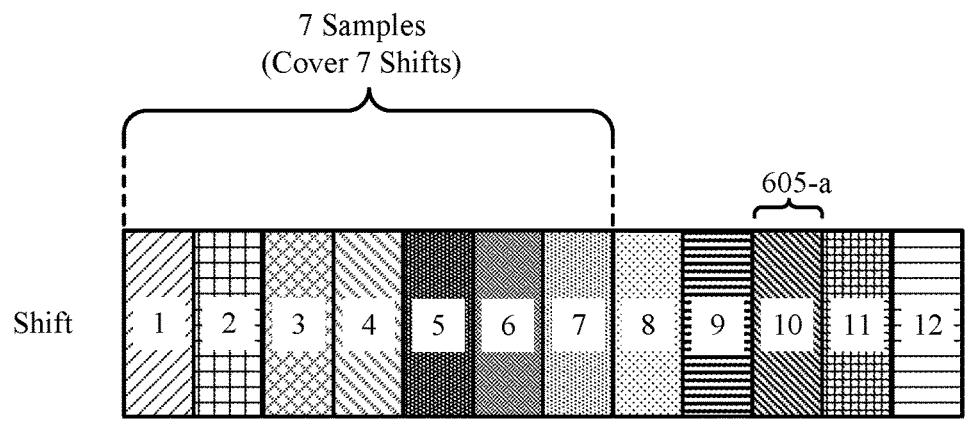
FIG. 6 illustrates example random access preambles based on per-sample repetition of a random access preamble in accordance with aspects of the present disclosure.
Figure 6:
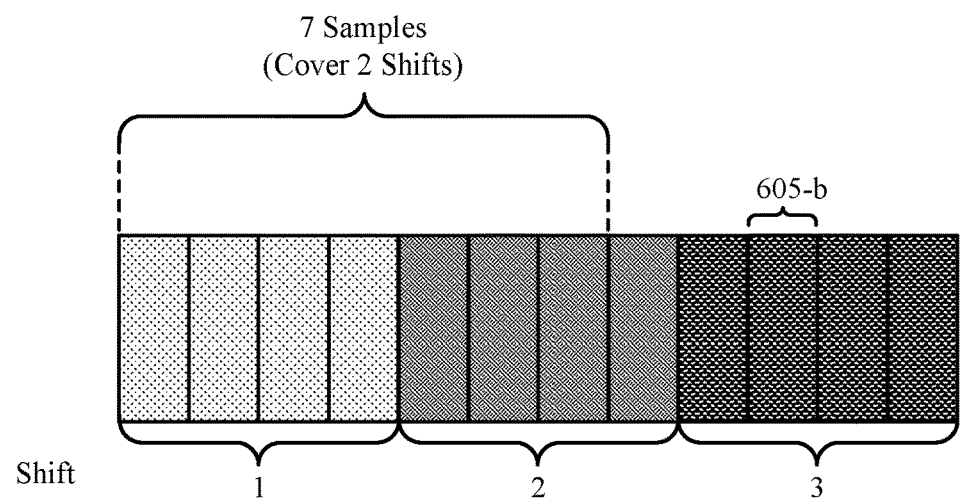

FIG. 6 illustrates examples random access preambles 600 and 601 based on per-sample repetition of a random access preamble in accordance with aspects of the present disclosure. The random access preamble 600 or the random access preamble 601 may be implemented to realize aspects of the wireless communications system 100 or the wireless communications system 200. For example, a UE 115 may generate a random access preamble 601 featuring sample-by-sample repetition (as described in more detail herein, including with reference to FIGS. 2 through 4) and may transmit the random access preamble 601 to a base station 105 based on applying a cyclic shift from a set of available cyclic shifts, and the UE 115 and the base station 105 may be examples of corresponding devices described herein, including with reference to FIGS. 1 and 2.

In some cases, a quantity of available or allowable cyclic shifts, which may be referred to or denoted as $N_{cs}$, may be based on a delay spread and a cell size (e.g., a cell size delay). For example, a length of a sequence (such as a Zadoff-Chu sequence) may be reduced to a subset of $N_{cs}$ that the UE 115 may be able to use based on a maximum or upper limit delay spread and a size of the cell served by the base station 105. Further, the quantity of available cyclic shifts from which the UE 115 selects a cyclic shift may be based on the manner of repetition for the random access preamble. For example, if the UE 115 generates a random access preamble 600 that features symbol-by-symbol repetition (such that samples 605-a of the random access preamble 600 are not consecutively repeated within the random access preamble 600), each sample 605-a may cover one cyclic shift. For example, seven samples 605-a of the random access preamble 601 may cover seven cyclic shifts. As a result of such a one-to-one ratio between samples 605-a of the random access preamble 600 and covered cyclic shifts, the quantity of available cyclic shifts may be calculated (exclusively) based on sequence length and a quantity of samples 605-a that account for delays.

For instance, if the UE 115 generates the random access preamble 600 based on a Zadoff-Chu sequence having a length of 139 and if the maximum delay spread and cell size is equivalent to (or otherwise corresponds to) a length of seven samples 605-a, a maximum or upper limit quantity of the available cyclic shifts $N_{cs}$ may be calculated as $$N_{cs} = \left\lfloor \frac{139}{7} \right\rfloor = 19$$

(assuming a sequence length of 139). As such, in such a deployment and if the UE 115 uses the random access preamble 600 that does not repeat on a per-sample basis, the UE 115 may select a cyclic shift from 19 available cyclic shifts.

In some implementations of the present disclosure, the UE 115 may generate the random access preamble 601 featuring sample-by-sample repetition such that repetitions of a same sample 605-b of the random access preamble 601 are consecutive within the random access preamble 601. In such examples, because of the N consecutive repetitions of a same sample 605-b in the random access preamble 601, the seven samples 605-b that account for the maximum delay spread and the cell size may cover fewer cyclic shifts than the seven samples 605-a of the random access preamble 600. For example, seven samples 605-b of the random access preamble 601 may cover two cyclic shifts in examples in which N=4 (as compared to the seven cyclic shifts covered by the seven samples 605-a of the random access preamble 600).

As such, the quantity of available cyclic shifts from which the UE 115 may select may be calculated as $$N_{cs} = \left\lfloor \frac{139 \times N}{7} \right\rfloor, \text{ or } N_{cs} = \left\lfloor \frac{139 \times 4}{7} \right\rfloor = 79$$

in examples in which N=4. Accordingly, the system including the UE 115 and the base station 105 may support greater multiplexing capacity as there is a greater quantity of available cyclic shifts from which UEs 115 may select for transmitting a random access preamble. As a result of such an increase in multiplexing capacity, the base station 105 may support greater system capacity, high data rates, and greater spectral efficiency.

Figure 7:
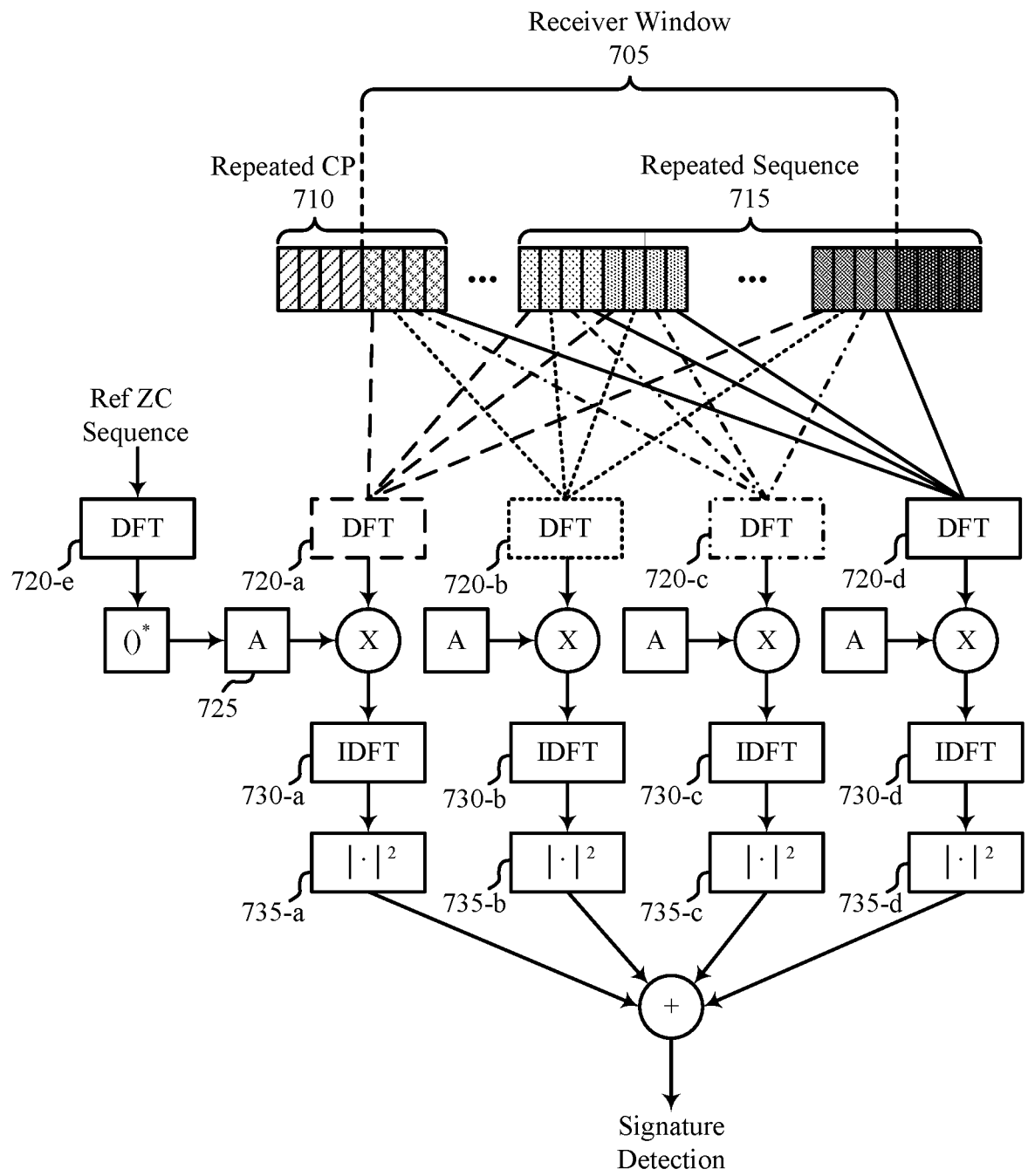
FIG. 7 illustrates an example of a non-coherent combining procedure that supports per-sample repetition of a random access preamble in accordance with aspects of the present disclosure.

FIG. 7 illustrates an example of a non-coherent combining procedure 700 that supports per-sample repetition of a random access preamble in accordance with aspects of the present disclosure. The non-coherent combining procedure 700 may be implemented to realize aspects of the wireless communications system 100 or the wireless communications system 200. For example, a UE 115 may transmit a random access preamble to a base station 105 (which may be examples of corresponding devices described herein, including with reference to FIGS. 1 and 2) including a repeated CP 710 and a repeated sequence 715 featuring per-sample repetition such that repetitions of a same sample are consecutive within both the repeated CP 710 and the repeated sequence 715. In some examples, the base station 105 may receive the random access preamble from the UE 115 and may attempt to detect the random access preamble based on performing the non-coherent combining procedure 700.

For example, the base station 105 may perform the non-coherent combining procedure 700 at a receiver or random access preamble detector of the base station 105 and may use the non-coherent combining procedure 700 to add an energy of a set of sequences together. In some examples, for instance, the base station 105 may receive at least a portion of the random access preamble including at least a portion of the repeated CP 710 and at least a portion of the repeated sequence 715 within a receiver window 705 and the base station 105 may generate a set of sequences based on selecting sets of non-consecutive samples from the random access preamble received within the receiver window 705. The base station 105 may select the sets of non-consecutive samples from the random access preamble (or at least from the portion of the random access preamble that the base station 105 receives during the receiver window 705) according to a sample interval and, in some examples, the sample interval may be based on (e.g., equal to) the quantity of repetitions N of each sample included in the random access preamble.

In other words, for example, the base station 105 may generate a set of sequences based on selecting every $N^{th}$ sample of the random access preamble received during the receiver window 705. Further, because each sample of the random access preamble is repeated N times, the base station 105 may similarly generate a total of N sequences based on iteratively selecting every $N^{th}$ sample of the random access preamble and offsetting by one sample for each iteration. For example, based on selecting every $N^{th}$ sample of the random access preamble, the base station 105 may generate a first sequence based on selecting a first instance of a first sample, a first instance of a second sample, a first instance of a third sample, and so on for the amount of samples received during the receiver window 705. Similarly, the base station 105 may generate a second sequence based on selecting a second instance of the first sample, a second instance of the second sample, a second instance of the third sample, and so on for the amount of samples received during the receiver window 705. The base station 105 may likewise generate an $N^{th}$ sequence based selecting an $N^{th}$ instance of the first sample, an $N^{th}$ instance of the second sample, an $N^{th}$ instance of the third sample, and so on. As illustrated in the non-coherent combining procedure 700, each sample of the random access preamble may be repeated four times consecutively and, as such, the base station 105 may generate four sequences. In some aspects, each of the sequences generated by the base station 105 may reflect a same base sequence from which the UE 115 generates the repeated CP 710 and the repeated sequence 715.

To detect the random access preamble, the base station 105 may use a non-coherent detection method in which the base station 105 takes a DFT 720 (or an FFT) of each of the generated sequences. For example, the base station 105 may take a DFT 720-a of the first sequence (including the first instances of each repeated sample), a DFT 720-b of the second sequence (including the second instances of each repeated sample), a DFT 720-c of the third sequence (including the third instances of each repeated sample), and a DFT 720-d of the fourth sequence (including the fourth instances of each repeated sample). The base station 105, based on taking the DFT 720 of each of the generated sequences, may correlate the output of the respective DFTs 720 with a reference sequence 725, which may be denoted as a reference sequence A. For example, the base station 105 may multiply the outputs of each of the DFTs 720 by the reference sequence 725. In some aspects, the base station 105 may obtain the reference sequence 725 based on taking a DFT 720-e of a reference or root Zadoff-Chu sequence. Further, the various DFTs 720 are shown as different branches for each of the generated sequences for illustrative purposes, and the base station 105 may take the DFTs 720 (or perform any other operation of the non-coherent combining procedure 700) in series or in parallel, or in a combination thereof, using any relevant hardware.

Accordingly, the base station 105 may obtain a DFT output with some correlation with the reference sequence 725 from each of the generated sequences and may take an IDFT 730 (or an IFFT) on each of the DFT outputs after correlation with the reference sequence 725. For example, the base station 105 may take an IDFT 730-a of the output of the DFT 720-a after correlation with the reference sequence 725, may take an IDFT 730-b of the output of the DFT 720-b after correlation with the reference signal 725, may take an IDFT 730-c of the output of the DFT 720-c after correlation with the reference signal 725, and may take an IDFT 730-d of the output of the DFT 720-d after correlation with the reference signal 725.

As part of the non-coherent combining procedure 700, the base station 105 may perform an energy calculation 735 for each of the outputs of the IDFTs 730. For example, the base station 105 may perform an energy calculation 735-a for the output of the IDFT 730-a, may perform an energy calculation 735-b for the output of the IDFT 730-b, may perform an energy calculation 735-c for the output of the IDFT 730-c, and may perform an energy calculation 735-d for the output of the IDFT 730-d. In some aspects, performing an energy calculation 735 for each branch of the non-coherent combining procedure 700 may include or be understood as calculating or determining an absolute value of each of the generated sequences. The base station 105, based on performing the energy calculations 735, may combine or add the calculated energies to obtain a combination or summation of the energies associated with each of the generated sequences. As such, the base station 105 may perform a signature detection procedure on the combination or summation of the energies associated with each of the generated sequences to attempt to detect the random access preamble (e.g., to identify the UE 115 that sent the random access preamble).

In some aspects, a delay or a placement of the receiver window 705 may result in a sequence being off by one (or more) sample (e.g., at the boundary of two sets of repeated samples) for one or more detection branches (such as for the detection branch of the $N^{th}$ repetition), which may, in turn, result in a detected peak that deviates from an actual peak by one (or more). For example, the receiver window 705 may include three repetitions of a same sample but may not include a fourth repetition of the that same sample. In some cases, this may increase a timing resolution. Accordingly, in some implementations, the UE 115 and the base station 105 may support a reduction of a timing resolution constraint by half or an increase in the length of the sequence from which the UE 115 generates the repeated sequence 715.

In examples in which the UE 115 and the base station 105 may support a reduction of the timing resolution constraint by half, for instance, the UE 115 and the base station 105 may allow for twice an originally targeted timing resolution (e.g., such that two times the original timing resolution constraint or target may be allowed). For example, if the UE 115 and the base station 105 originally targeted a timing resolution constraint of 1.87 ns, the UE 115 and the base station 105 may allow for a timing resolution up to 3.75 ns to compensate for cases in which a detected peak deviates from an actual peak. Further, although such a deviation is described here with reference to the non-coherent combining procedure 700, the UE 115 and the base station 105 may similarly support techniques for accounting for such deviation in examples in which the base station 105 employs a coherent combining procedure.

In some cases, the base station 105 may use the non-coherent combining procedure 700 for random access preambles that the UE 115 transmits according to different repetition techniques. For example, if the UE 115 transmits a random access preamble featuring symbol-by-symbol repetition, the base station 105 may use the non-coherent combining procedure 700 because coherency is assumed (e.g., only assumed) within a symbol (such that inter-symbol transmissions are assumed to be non-coherent). In some implementations of the present disclosure, the base station 105 may assume coherency because the base sequence from which the UE 115 generates the repeated sequence 715 is spread across multiple symbols and because of the sample-wise repetition of the repeated CP 710 and the repeated sequence 715. In such implementations, the base station 105 may additionally or alternatively attempt to detect the random access preamble transmitted by the UE 115 using a coherent combining procedure, as described in more detail with reference to FIG. 8. In other words, based on implementing the described techniques for supporting sample-wise repetition, the base station 105 may use either a non-coherent or a coherent combining procedure.

Figure 8:
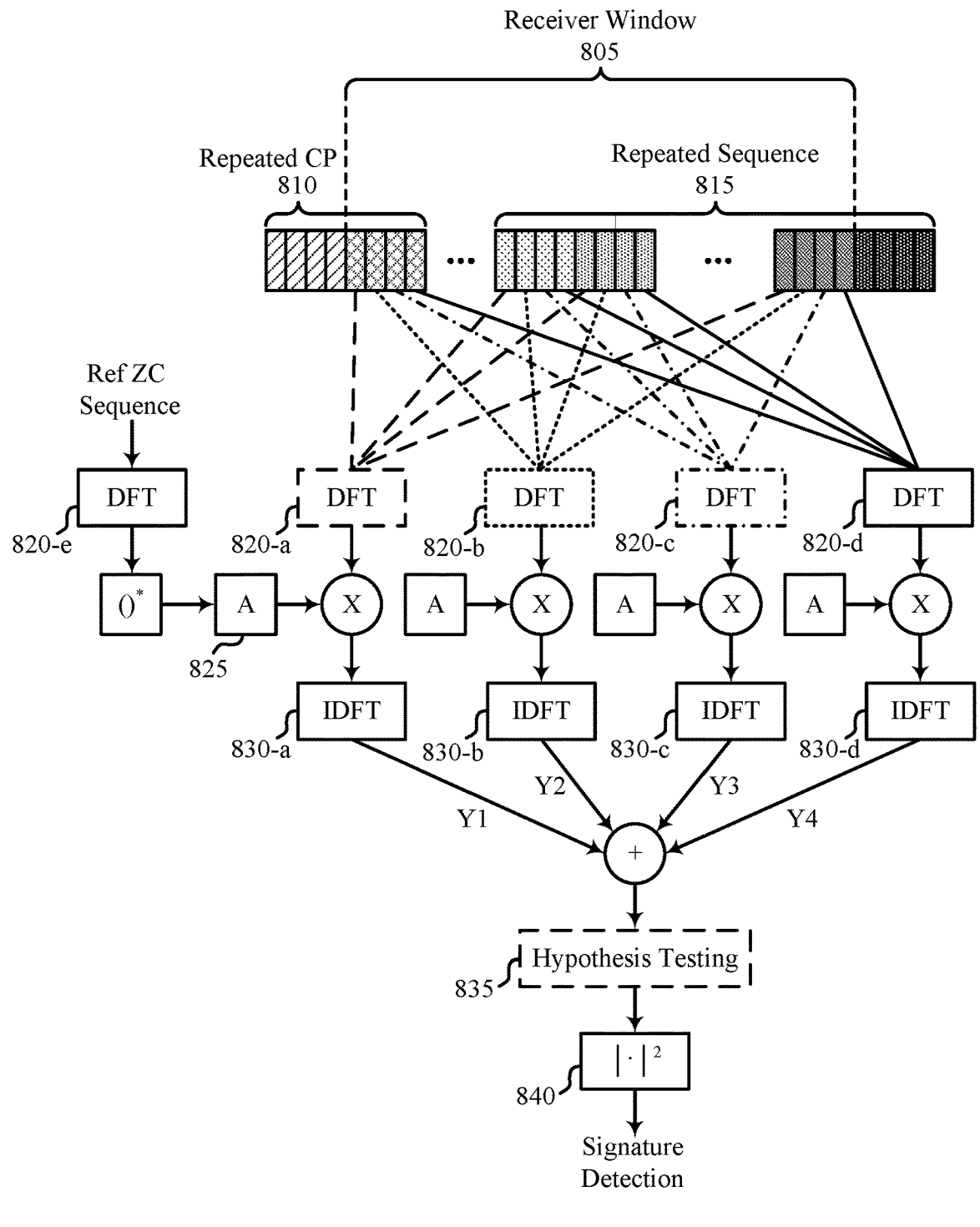
FIG. 8 illustrates an example of a coherent combining procedure that supports per-sample repetition of a random access preamble in accordance with aspects of the present disclosure.

FIG. 8 illustrates an example of a coherent combining procedure 800 that supports per-sample repetition of a random access preamble in accordance with aspects of the present disclosure. The coherent combining procedure 800 may be implemented to realize aspects of the wireless communications system 100 or the wireless communications system 200. For example, a UE 115 may transmit a random access preamble to a base station 105 (which may be examples of corresponding devices described herein, including with reference to FIGS. 1 and 2) including a repeated CP 810 and a repeated sequence 815 featuring per-sample repetition such that repetitions of a same sample are consecutive within both the repeated CP 810 and the repeated sequence 815. In some examples, the base station 105 may receive the random access preamble from the UE 115 and may attempt to detect the random access preamble based on performing the coherent combining procedure 800.

For example, the base station 105 may perform the coherent combining procedure 800 at a receiver or random access preamble detector of the base station 105 and may use the coherent combining procedure 800 to add a set of sequences together and calculate an energy of the combined set of sequences (e.g., a combination sequence). In some examples, for instance, the base station 105 may receive at least a portion of the random access preamble including at least a portion of the repeated CP 810 and at least a portion of the repeated sequence 815 within a receiver window 805 and the base station 105 may generate a set of sequences based on selecting sets of non-consecutive samples from the random access preamble received within the receiver window 805. The base station 105 may select the sets of non-consecutive samples from the random access preamble (or at least from the portion of the random access preamble that the base station 105 receives during the receiver window 805) according to a sample interval and, in some examples, the sample interval may be based on (e.g., equal to) the quantity of repetitions N of each sample included in the random access preamble.

In other words, for example, the base station 105 may generate a set of sequences based on selecting every $N^{th}$ sample of the random access preamble received during the receiver window 805. Further, because each sample of the random access preamble is repeated N times, the base station 105 may similarly generate a total of N sequences based on iteratively selecting every $N^{th}$ sample of the random access preamble and offsetting by one sample for each iteration. Additional details relating to such sequence generation at the base station 105 are described herein, including with reference to FIG. 7. As illustrated in the coherent combining procedure 800, each sample of the random access preamble may be repeated four times consecutively and, as such, the base station 105 may generate four sequences. In some aspects, each of the sequences generated by the base station 105 may reflect a same base sequence from which the UE 115 generates the repeated CP 810 and the repeated sequence 815.

To detect the random access preamble, the base station 105 may use a coherent detection method in which the base station 105 takes a DFT 820 (or an FFT) of each of the generated sequences. For example, the base station 105 may take a DFT 820-a of a first sequence (including first instances of each repeated sample), a DFT 820-b of a second sequence (including second instances of each repeated sample), a DFT 820-c of a third sequence (including third instances of each repeated sample), and a DFT 820-d of a fourth sequence (including fourth instances of each repeated sample). The base station 105, based on taking the DFT 820 of each of the generated sequences, may correlate the output of the respective DFTs 820 with a reference sequence 825, which may be denoted as a reference sequence A. For example, the base station 105 may multiply the outputs of each of the DFTs 820 by the reference sequence 825. In some aspects, the base station 105 may obtain the reference sequence 825 based on taking a DFT 820-e of a reference or root Zadoff-Chu sequence. Further, the various DFTs 820 are shown as different branches for each of the generated sequences for illustrative purposes, and the base station 105 may take the DFTs 820 (or perform any other operation of the coherent combining procedure 800) in series or in parallel, or in a combination thereof, using any relevant hardware.

Accordingly, the base station 105 may obtain a DFT output with some correlation with the reference sequence 825 from each of the generated sequences and may take an IDFT 830 (or an IFFT) on each of the DFT outputs after correlation with the reference sequence 825. For example, the base station 105 may take an IDFT 830-a of the output of the DFT 820-a after correlation with the reference sequence 825, may take an IDFT 830-b of the output of the DFT 820-b after correlation with the reference sequence 825, may take an IDFT 830-c of the output of the DFT 820-c after correlation with the reference sequence 825, and may take an IDFT 830-d of the output of the DFT 820-d after correlation with the reference sequence 825.

As part of the coherent combining procedure 800, the base station 105 may combine or add the outputs of the IFDTs 830 to obtain a combination or a summation (e.g., a coherent combination or summation) of the generated sequences, which may be referred to herein as a combination sequence. As such, the base station 105 may perform an energy calculation 840 of the combination sequence. The base station 105 may perform a signature detection procedure on or using the energy calculation 840 to attempt to detect the random access preamble (e.g., to identify the UE 115 that sent the random access preamble).

In some implementations, such as in implementations in which the UE 115 and the base station 105 support the application of OCCs to random access preambles, the base station 105 may use the coherent combining procedure 800, with some modification, to detect which OCC is used by the UE 115. In some examples, such as in examples in which the UEs 115 and the base station 105 support the use of a Walsh cover, a quantity of different sets of UEs 115 that the base station may configure for OCC-based multiplexing may be based on (e.g., equal to) the quantity of repetitions N. As such, for a random access preamble featuring sample-wise repletion with N=4, the base station 105 may allocated transmission resources to multiplex four different sets of UEs 115 (where a set of UEs 115 may include one or more UEs 115) using a Walsh cover.

In some aspects, different OCCs may be represented by different permutations of a set of "+1's" and "−1's," where each sample is multiplied by either a "+1" or a "−1." For example, to multiplex four UEs 115, a first UE 115 may apply a first OCC of {1, 1, 1, 1, 1, 1, 1, 1, ... }, a second UE 115 may apply a second OCC of {1, −1, 1, −1, 1, −1, 1, −1, ... }, a third UE 115 may apply a third OCC of {1, 1, −1, −1, 1, 1, −1, −1, ... }, and a fourth UE 115 may apply a fourth OCC of {1, −1, −1, 1, 1, −1, −1, 1, ... }, where each OCC value maps to (is multiplied on) one sample of a random access preamble.

To detect which OCC that a UE 115 uses, the base station 105 may perform hypothesis testing 835 to test one or more hypotheses on the combination sequence. As part of the hypothesis testing 835, the base station 105 may calculate or obtain multiple "summed" hypotheses (corresponding to the multiple possible OCCs that the UE 115 may use). The base station 105 may obtain or compose each hypothesis based on adding or subtracting the coherent detection branches using a same sign (positive or negative) as a corresponding OCC hypothesis and the base station 105 may determine that the OCC having the highest "summed" hypothesis is the detected OCC (e.g., the OCC that the UE 115 uses).

In the example in which the four UEs 115 apply the first OCC, the second OCC, the third OCC, or the fourth OCC, the base station 105 may calculate a first hypothesis for the first OCC as H1=Y1+Y2+Y3+Y4, may calculate a second hypothesis for the second OCC as H2=Y1−Y2+Y3−Y4, may calculate a third hypothesis for the third OCC as H3=Y1+Y2−Y3−Y4, and may calculate a fourth hypothesis for the fourth OCC as H4=Y1−Y2−Y3+Y4. As described herein, Y1 may refer to an output of the IDFT 830-a, Y2 may refer to an output of the IDFT 830-b, Y3 may refer to an output of the IDFT 830-c, and Y4 may refer to an output of the IDFT 830-d. Accordingly, the base station 105 may determine which of the four OCCs that the UE 115 uses to transmit the random access preamble based on which of H1, H2, H3, or H4 yields the highest or largest value. In some aspects, the base station 105 may pass information relating to which OCC is used by the UE 115 to the energy calculation 840 and the signature detection procedure (as the base station 105 may use such information to identify which UE 115 sent the random access preamble).

Figure 9:
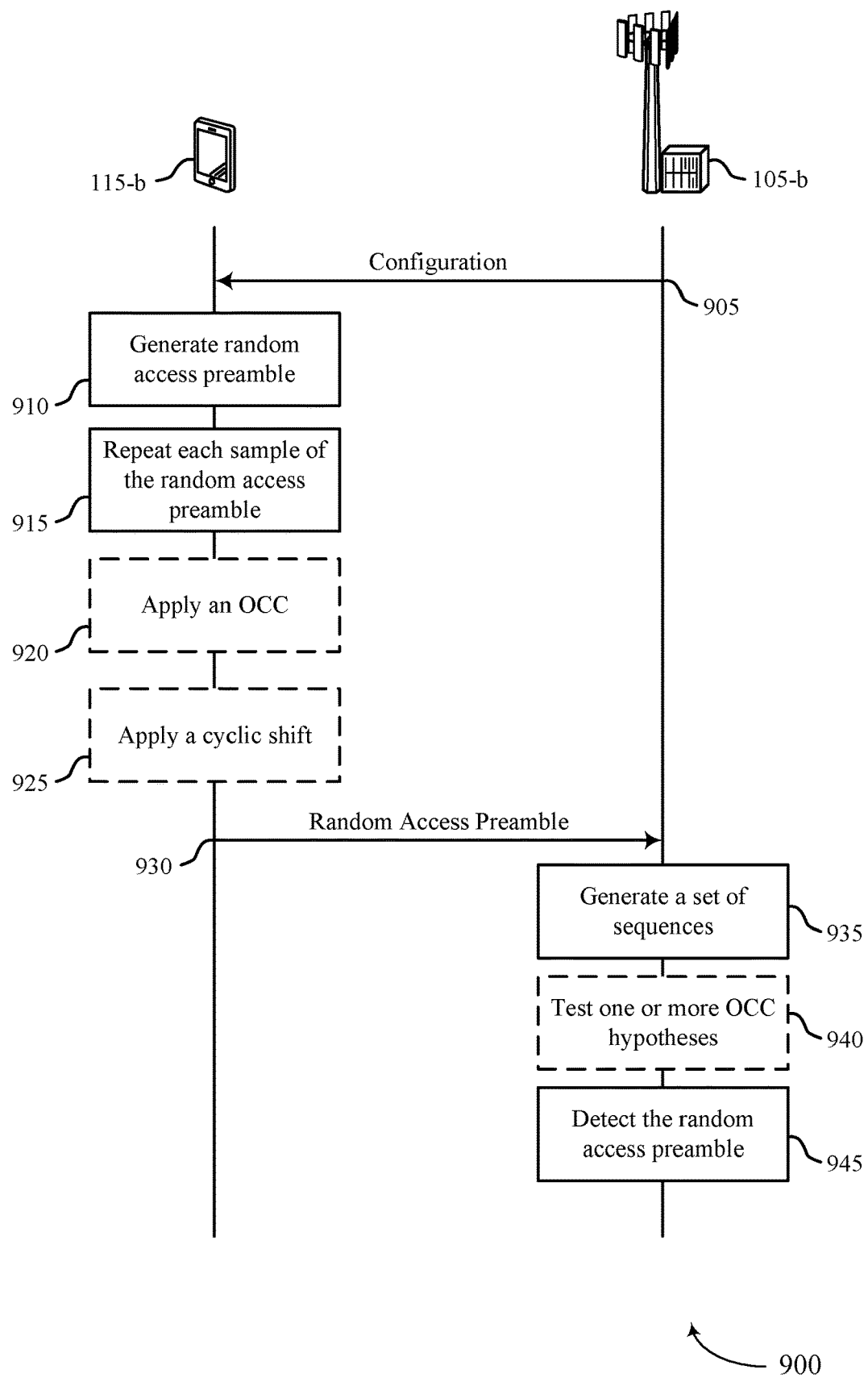
FIG. 9 illustrates an example of a process flow that supports per-sample repetition of a random access preamble in accordance with aspects of the present disclosure.

FIG. 9 illustrates an example of a process flow 900 that supports per-sample repetition of a random access preamble in accordance with aspects of the present disclosure. The process flow 900 may implement or be implemented to realize aspects of the wireless communications system 100 or the wireless communications system 200. For example, the process flow 900 may illustrate communication between a UE 115-b and a base station 105-b, which may be examples of corresponding devices described herein, including with reference to FIGS. 1 and 2. In some examples, the UE 115-b may generate a random access preamble, such as a random access preamble, featuring sample-wise repetition and may transmit the random access preamble to the base station 105-b.

In the following description of the process flow 900, the operations may be performed (e.g., reported or provided) in a different order than the order shown, or the operations performed by the UE 115-b and the base station 105-b may be performed in different orders or at different times. For example, specific operations may also be left out of the process flow 900, or other operations may be added to the process flow 900. Further, although some operations or signaling may be shown to occur at different times for discussion purposes, these operations may actually occur at the same time.

At 905, the UE 115-b may receive a configuration of one or more parameters associated with generating or transmitting the random access preamble. In some examples, for instance, the UE 115-b may receive a configuration of a guard period spanning a time duration that is to be added to an end of the random access preamble. Additionally or alternatively, the UE 115-b may receive a configuration of a guard band spanning a quantity of subcarriers that is to be added to either side (in frequency) of the random access preamble. Additionally or alternatively, the UE 115-b may receive a configuration of one or more time gaps for separating at least some samples of the random access preamble in the time domain.

Additionally or alternatively, the UE 115-b may receive a configuration of a quantity of cyclic shifts or a quantity of OCCs. Additionally or alternatively, the UE 115-b may receive a configuration of a quantity of samples of a base length of a sequence (from which the UE 115 may obtain a second, or repeated, sequence after repetition), a configuration of a quantity of times N that the UE 115-b may repeat each sample of the sequence to obtain the second, or repeated, sequence, or a configuration of a base length L of a CP. In some aspects, the UE 115-b may receive the configuration from the base station 105-b via system information, RRC signaling, or any other control signaling. In some examples, the configuration signaling from the base station 105-b may include an index or a reference point to a table that is configured at the UE 115-b and the UE 115-b may select a configuration for the random access preamble from the table based on the index or reference point.

At 910, the UE 115-b may generate, for the random access preamble, the sequence including a first quantity of samples in the time domain. In some examples, the UE 115-b may generate the sequence in accordance with the configured length of the sequence (based on the configuration received from the base station 105-b at 905). In some aspects, the sequence may include or be an example of a Zadoff-Chu sequence.

At 915, the UE 115-b may repeat each sample of the random access preamble. For example, the UE 115-b may perform repetition on the random access preamble per sample or on a sample-wise basis such that repetitions of a same sample are consecutive in time. The UE 115-b may repeat each sample after or before adding a CP to the sequence, as described in more detail herein, including with reference to FIGS. 3 and 4.

At 920, the UE 115-b may apply an OCC to the random access preamble to obtain an encoded random access preamble. In some examples, the UE 115-b may apply the OCC to a repeated CP and the second, or repeated, sequence. In some other examples, the UE 115-b may apply the OCC to the second, or repeated, sequence to obtain an encoded second sequence and may add a repeated CP based on selecting samples from the encoded second sequence. Additional details relating to such an application of an OCC for the random access preamble featuring sample-wise repetition are described herein, including with reference to FIGS. 3 and 4.

At 925, the UE 115-b may apply a cyclic shift to the second sequence. In some aspects, the UE 115-b may select the cyclic shift from a quantity of available cyclic shifts, the quantity of available cyclic shifts being based on the quantity of pre-sample repetitions N included in the second sequence. Additionally or alternatively, the UE 115-b may apply a quantity of cyclic shifts to the second sequence, where such a quantity of cyclic shifts are similarly based on the quantity of pre-sample repetitions N included in the second sequence. Additional details relating to such an available quantity of cyclic shifts are described herein, including with reference to FIG. 6.

At 930, the UE 115-b may transmit the random access preamble to the base station 105-b via signaling that is based on the second sequence. The UE 115-b may transmit the random access preamble in accordance with any relevant configurations associated with the random access preamble (such as configurations received from the base station 105-b at 905). In some examples, the base station 105-b may switch a receive beam of the base station 105-b during each of a quantity of time gaps that the UE 115-b inserts between some samples of the random access preamble. Additional details relating to the transmitting of the random access preamble are described herein, including with reference to FIGS. 2 and 5.

At 935, the base station 105-b may generate a set of sequences based on selecting sets of non-consecutive samples from the samples included in the random access preamble featuring sample-wise repetition according to a sample interval. In some examples, the sample interval may be based on (e.g., equal to) the quantity of times N that the UE 115-b repeats each sample within the random access preamble. Additional details relating to such generation of multiple sequences (which may be different versions of a same base sequence from which the UE 115-b generates the repeated random access preamble) are described herein, including with reference to FIGS. 7 and 8.

At 940, the base station 105-b may, in some implementations, test one or more hypotheses on a combination sequence (which the base station 105-b may obtain after generation of the set of sequences if using a coherent combining procedure) and each of the one or more hypotheses may correspond to a respective OCC. In some examples, the base station 105-*b* may detect an OCC of the random access preamble based on testing the one or more hypotheses. Additional details relating to such a testing of various OCC hypotheses are described herein, including with reference to FIG. 8.

At 945, the base station 105-*b* may detect the random access preamble based on a combination of two or more sequences included in the set of sequences generated at 935. The combination may include or be based on a coherent combining procedure or a non-coherent combining procedure and the base station 105-*b* may perform a signature detection procedure on the combination. Additional details relating to such a detection procedure are described herein, including with reference to FIGS. 7 and 8.

Figure 10:
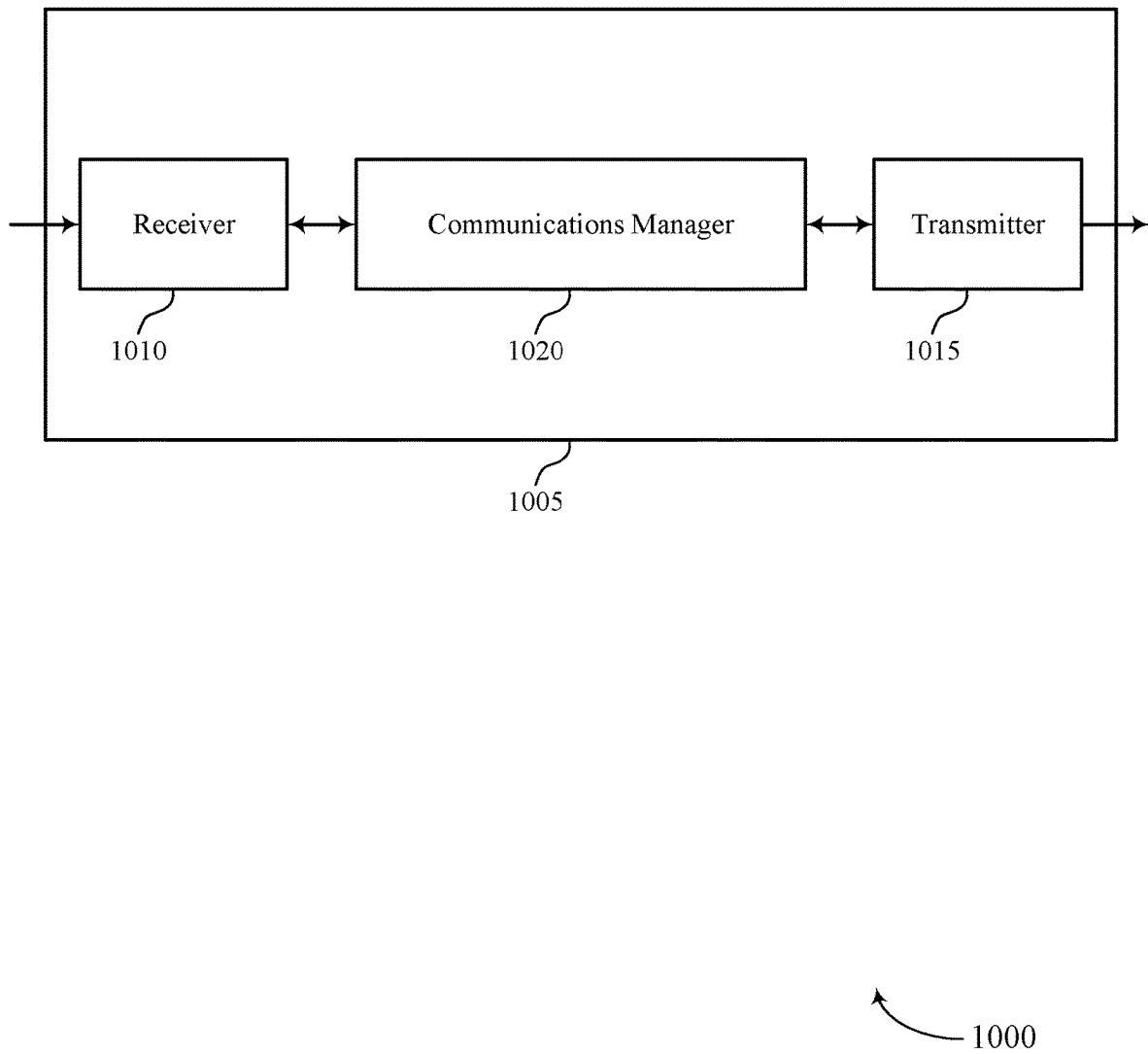
FIGS. 10 and 11 show block diagrams of devices that support per-sample repetition of a random access preamble in accordance with aspects of the present disclosure.

FIG. 10 shows a block diagram 1000 of a device 1005 that supports per-sample repetition of a random access preamble in accordance with aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to per-sample repetition of a random access preamble). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to per-sample repetition of a random access preamble). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of per-sample repetition of a random access preamble as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. For example, the communications manager 1020 may be configured as or otherwise support a means for generating, for a random access preamble, a sequence including a first quantity of samples in a time domain. The communications manager 1020 may be configured as or otherwise support a means for repeating each sample included in the first quantity of samples to obtain, for the random access preamble, a second sequence including a second quantity of samples in the time domain that is greater than the first quantity of samples, where repetitions of a same sample are consecutive within the second sequence. The communications manager 1020 may be configured as or otherwise support a means for transmitting the random access preamble to a base station via signaling that is based on the second sequence.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources, greater multiplexing capability, larger cell size, and lower operational complexity.

Figure 11:
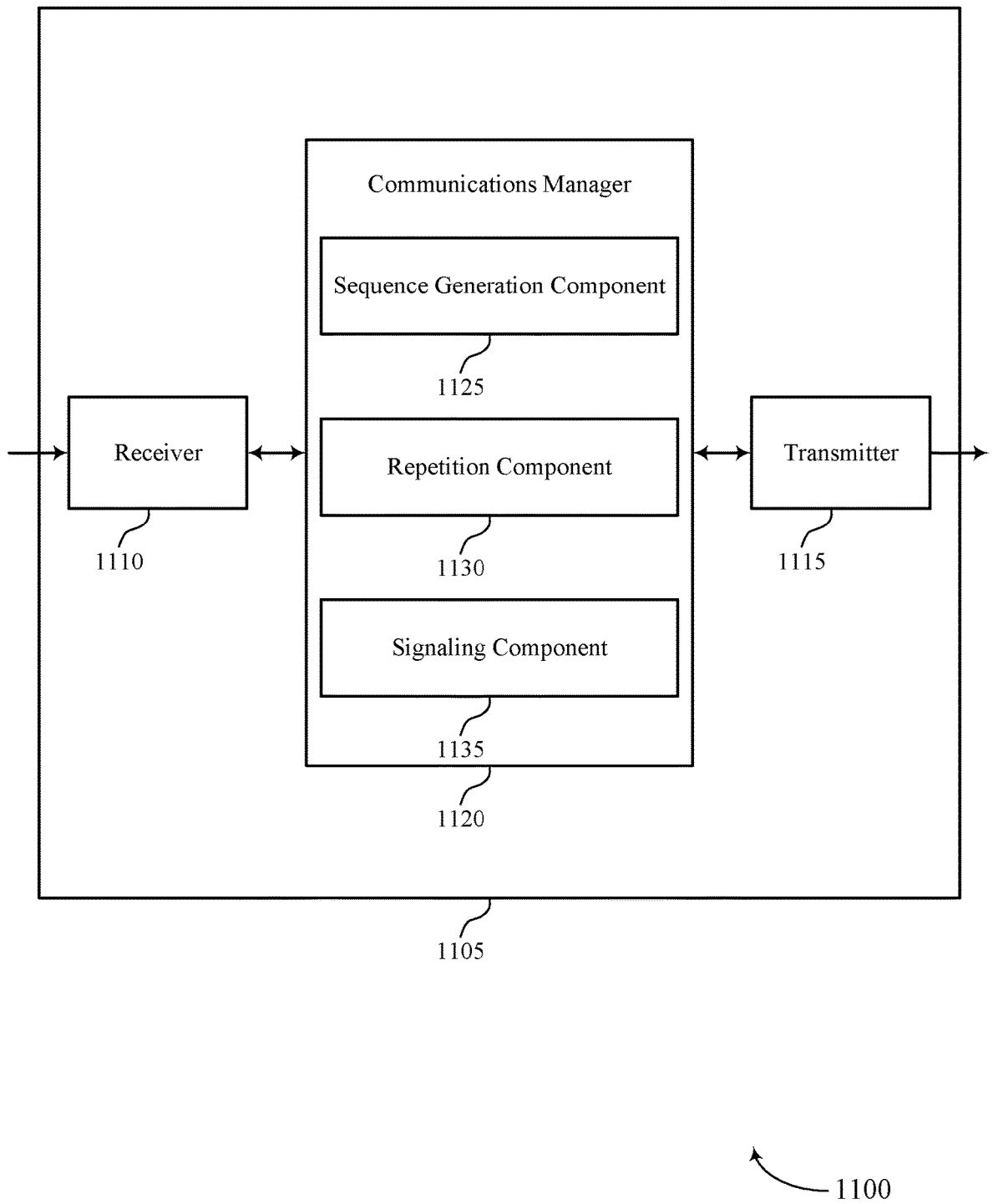

FIG. 11 shows a block diagram 1100 of a device 1105 that supports per-sample repetition of a random access preamble in accordance with aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to per-sample repetition of a random access preamble). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to per-sample repetition of a random access preamble). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of per-sample repetition of a random access preamble as described herein. For example, the communications manager 1120 may include a sequence generation component 1125, a repetition component 1130, a signaling component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a UE in accordance with examples as disclosed herein. The sequence generation component 1125 may be configured as or otherwise support a means for generating, for a random access preamble, a sequence including a first quantity of samples in a time domain. The repetition component 1130 may be configured as or otherwise support a means for repeating each sample included in the first quantity of samples to obtain, for the random access preamble, a second sequence including a second quantity of samples in the time domain that is greater than the first quantity of samples, where repetitions of a same sample are consecutive within the second sequence. The signaling component 1135 may be configured as or otherwise support a means for transmitting the random access preamble to a base station via signaling that is based on the second sequence.

Figure 12:
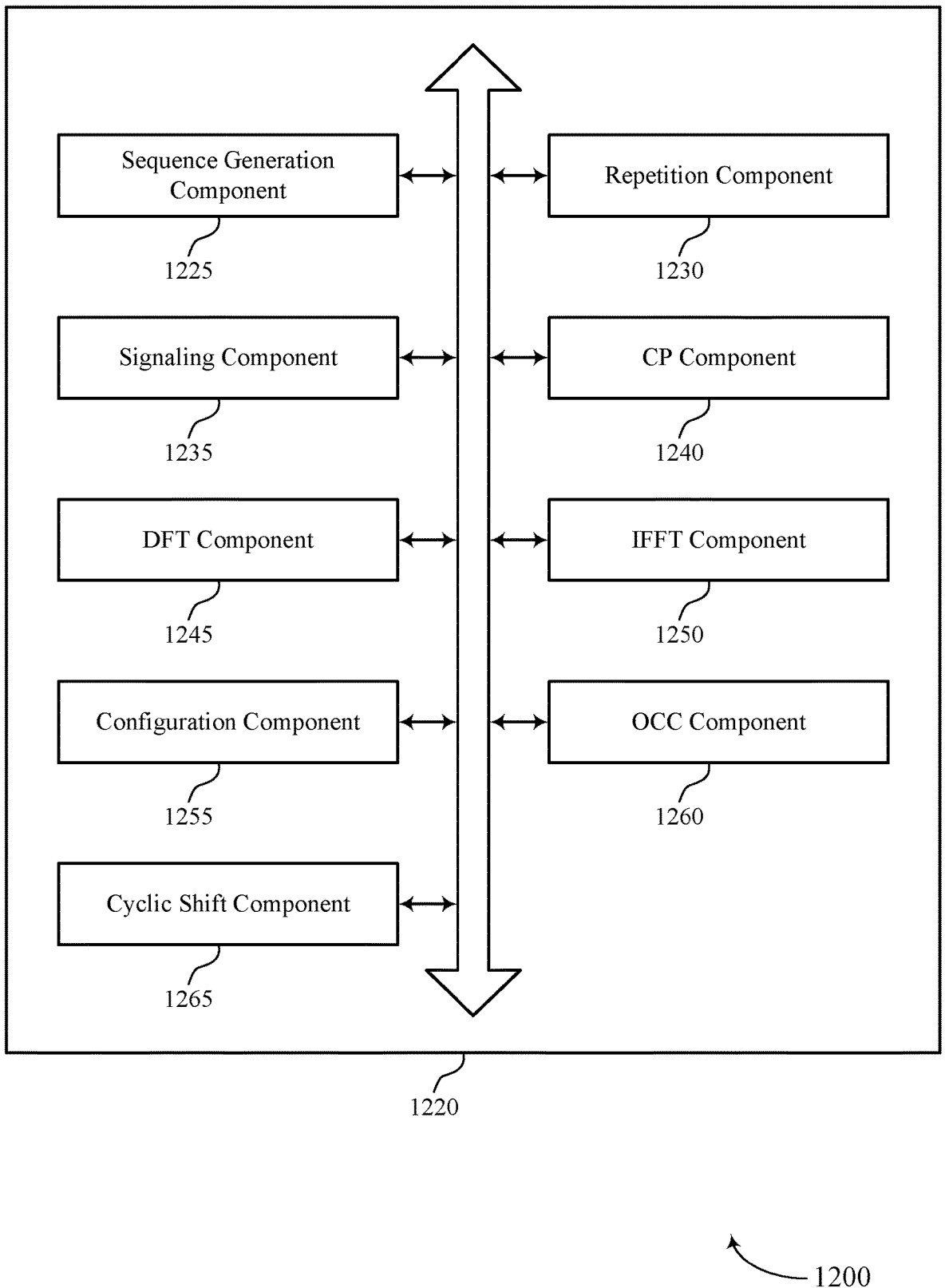
FIG. 12 shows a block diagram of a communications manager that supports per-sample repetition of a random access preamble in accordance with aspects of the present disclosure.

FIG. 12 shows a block diagram 1200 of a communications manager 1220 that supports per-sample repetition of a random access preamble in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of per-sample repetition of a random access preamble as described herein. For example, the communications manager 1220 may include a sequence generation component 1225, a repetition component 1230, a signaling component 1235, a CP component 1240, a DFT component 1245, an IFFT component 1250, a configuration component 1255, a OCC component 1260, a cyclic shift component 1265, or any combination thereof. Each of these components may communicate, directly or indirectly, with one another (e.g., via one or more buses).

The communications manager 1220 may support wireless communication at a UE in accordance with examples as disclosed herein. The sequence generation component 1225 may be configured as or otherwise support a means for generating, for a random access preamble, a sequence including a first quantity of samples in a time domain. The repetition component 1230 may be configured as or otherwise support a means for repeating each sample included in the first quantity of samples to obtain, for the random access preamble, a second sequence including a second quantity of samples in the time domain that is greater than the first quantity of samples, where repetitions of a same sample are consecutive within the second sequence. The signaling component 1235 may be configured as or otherwise support a means for transmitting the random access preamble to a base station via signaling that is based on the second sequence.

In some examples, the CP component 1240 may be configured as or otherwise support a means for adding, prior to the repeating of each sample included in the first quantity of samples, a CP to the sequence, where the CP includes a third quantity of samples in the time domain. In some examples, the repetition component 1230 may be configured as or otherwise support a means for repeating each sample included in the third quantity of samples to obtain, for the random access preamble, a second CP including a fourth quantity of samples in the time domain that is greater than the third quantity of samples, where repetitions of a same sample are consecutive within the second CP.

In some examples, the CP component 1240 may be configured as or otherwise support a means for selecting, after the repeating of each sample included in the first quantity of samples, a third quantity of samples from the second sequence to obtain, for the random access preamble, a CP including the third quantity of samples. In some examples, the CP component 1240 may be configured as or otherwise support a means for adding the CP to the second sequence.

In some examples, the third quantity of samples selected from the second sequence is based on a product of a quantity of times that each sample included in the first quantity of samples is repeated and a base length of the CP.

In some examples, the transmitting of the random access preamble to the base station includes transmitting the random access preamble via an orthogonal frequency-division multiplexing waveform, and the DFT component 1245 may be configured as or otherwise support a means for performing a DFT on the sequence including the first quantity of samples to obtain an output of the DFT. In some examples, the transmitting of the random access preamble to the base station includes transmitting the random access preamble via an orthogonal frequency-division multiplexing waveform, and the IFFT component 1250 may be configured as or otherwise support a means for performing an IFFT on the output of the DFT to obtain an output of the IFFT. In some examples, to the repeating of each sample include in the first quantity of samples, the repetition component 1230 may be configured as or otherwise support a means for repeating each sample included in the output of the IFFT.

In some examples, the first quantity of samples in the time domain includes a series of time domain samples of a single carrier signal. In some examples, the signaling via which the random access preamble is transmitted includes a single carrier waveform that is based on the single carrier signal.

In some examples, the configuration component 1255 may be configured as or otherwise support a means for receiving, from the base station, a configuration of a guard period spanning a time duration. In some examples, the signaling component 1235 may be configured as or otherwise support a means for adding the guard period to an end of the second sequence, where the signaling via which the random access preamble is transmitted is based on the adding of the guard period to the end of the second sequence.

In some examples, the configuration component 1255 may be configured as or otherwise support a means for receiving, from the base station, a configuration of a guard band spanning a quantity of subcarriers, where the quantity of subcarriers is based on a quantity of times that each sample included in the first quantity of samples is repeated. In some examples, the signaling component 1235 may be configured as or otherwise support a means for refraining from transmitting within the guard band during the transmitting of the random access preamble, where the transmitting of the random access preamble is based on the refraining from transmitting within the guard band.

In some examples, the configuration component 1255 may be configured as or otherwise support a means for receiving a configuration of one or more time gaps for separating at least some samples included in the second quantity of samples in the time domain. In some examples, the signaling component 1235 may be configured as or otherwise support a means for adding the one or more time gaps between the at least some samples included in the second quantity of samples, where the signaling via which the random access preamble is transmitted is based on the one or more time gaps.

In some examples, the OCC component 1260 may be configured as or otherwise support a means for applying an OCC to the second sequence and a CP for the random access preamble, where the transmitting of the random access preamble is based on the applying of the OCC to the second sequence and the CP.

In some examples, the OCC component 1260 may be configured as or otherwise support a means for applying an OCC to the second sequence to obtain an encoded second sequence. In some examples, the CP component 1240 may be configured as or otherwise support a means for adding a CP for the random access preamble to the encoded second sequence, where the transmitting of the random access preamble is based on the encoded second sequence and the CP.

In some examples, the cyclic shift component 1265 may be configured as or otherwise support a means for applying a quantity of cyclic shifts to the second sequence including the second quantity of samples, the quantity of cyclic shifts based on a quantity of times that each sample included in the first quantity of samples is repeated to obtain the second sequence, where the transmitting of the random access preamble is based on the applying of the quantity of cyclic shifts to the second sequence.

In some examples, the configuration component 1255 may be configured as or otherwise support a means for receiving, from the base station, a configuration of the first quantity of samples of the sequence, a configuration of a quantity of times that each sample included in the first quantity of samples is repeated to obtain the second sequence, a configuration of a base length of a CP for the random access preamble, or any combination thereof.

Figure 13:
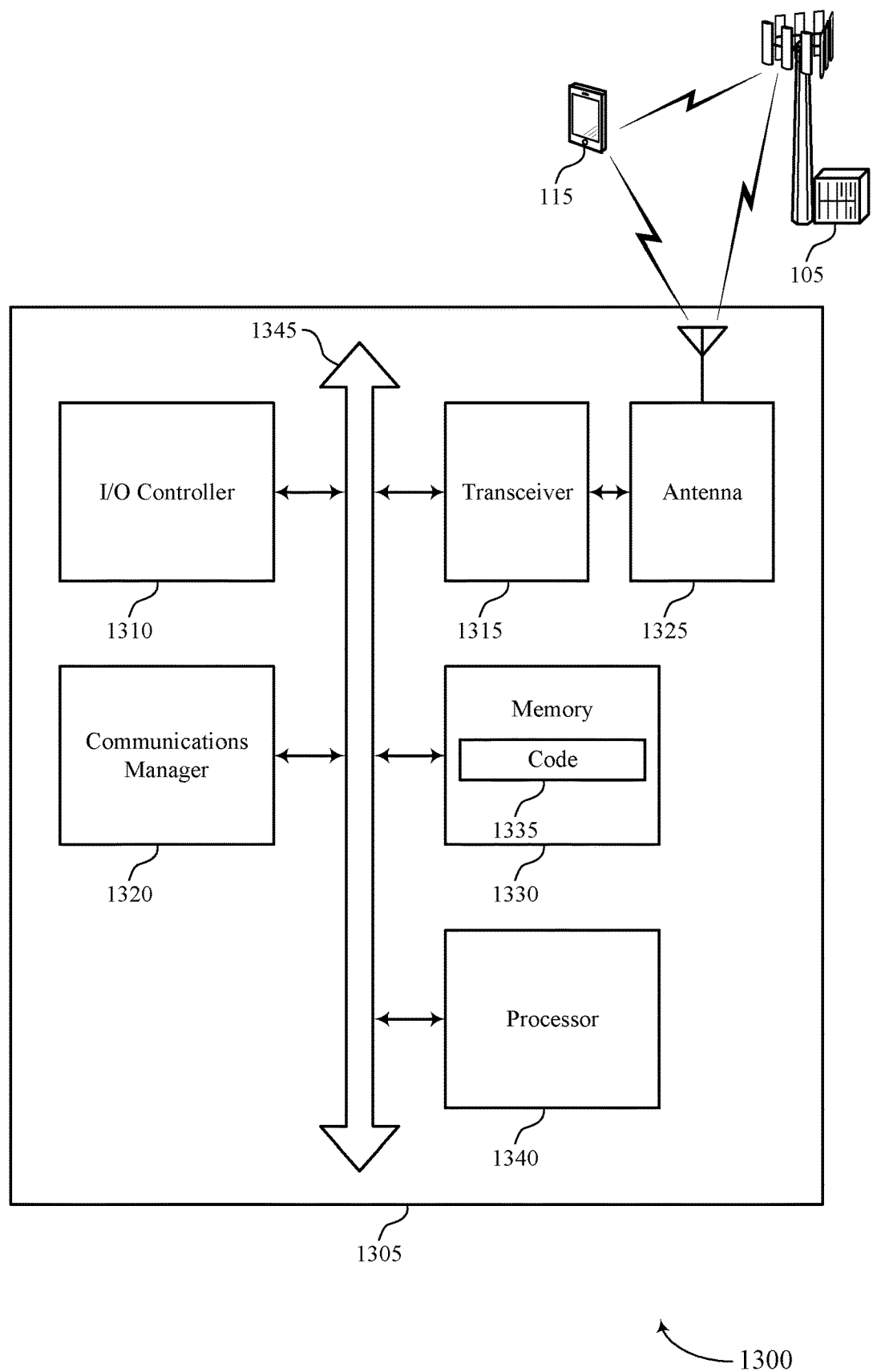
FIG. 13 shows a diagram of a system including a device that supports per-sample repetition of a random access preamble in accordance with aspects of the present disclosure.

FIG. 13 shows a diagram of a system 1300 including a device 1305 that supports per-sample repetition of a random access preamble in accordance with aspects of the present disclosure. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting per-sample repetition of a random access preamble). For example, the device 1305 or a component of the device 1305 may include a processor 1340 and memory 1330 coupled to the processor 1340, the processor 1340 and memory 1330 configured to perform various functions described herein.

The communications manager 1320 may support wireless communication at a UE in accordance with examples as disclosed herein. For example, the communications manager 1320 may be configured as or otherwise support a means for generating, for a random access preamble, a sequence including a first quantity of samples in a time domain. The communications manager 1320 may be configured as or otherwise support a means for repeating each sample included in the first quantity of samples to obtain, for the random access preamble, a second sequence including a second quantity of samples in the time domain that is greater than the first quantity of samples, where repetitions of a same sample are consecutive within the second sequence. The communications manager 1320 may be configured as or otherwise support a means for transmitting the random access preamble to a base station via signaling that is based on the second sequence.

By including or configuring the communications manager 1320 in accordance with examples as described herein, the device 1305 may support techniques for improved communication reliability, improved user experience related to reduced processing, reduced power consumption, more efficient utilization of communication resources, improved coordination between devices, longer battery life, improved utilization of processing capability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of per-sample repetition of a random access preamble as described herein, or the processor 1340 and the memory 1330 may be otherwise configured to perform or support such operations.

Figure 14:
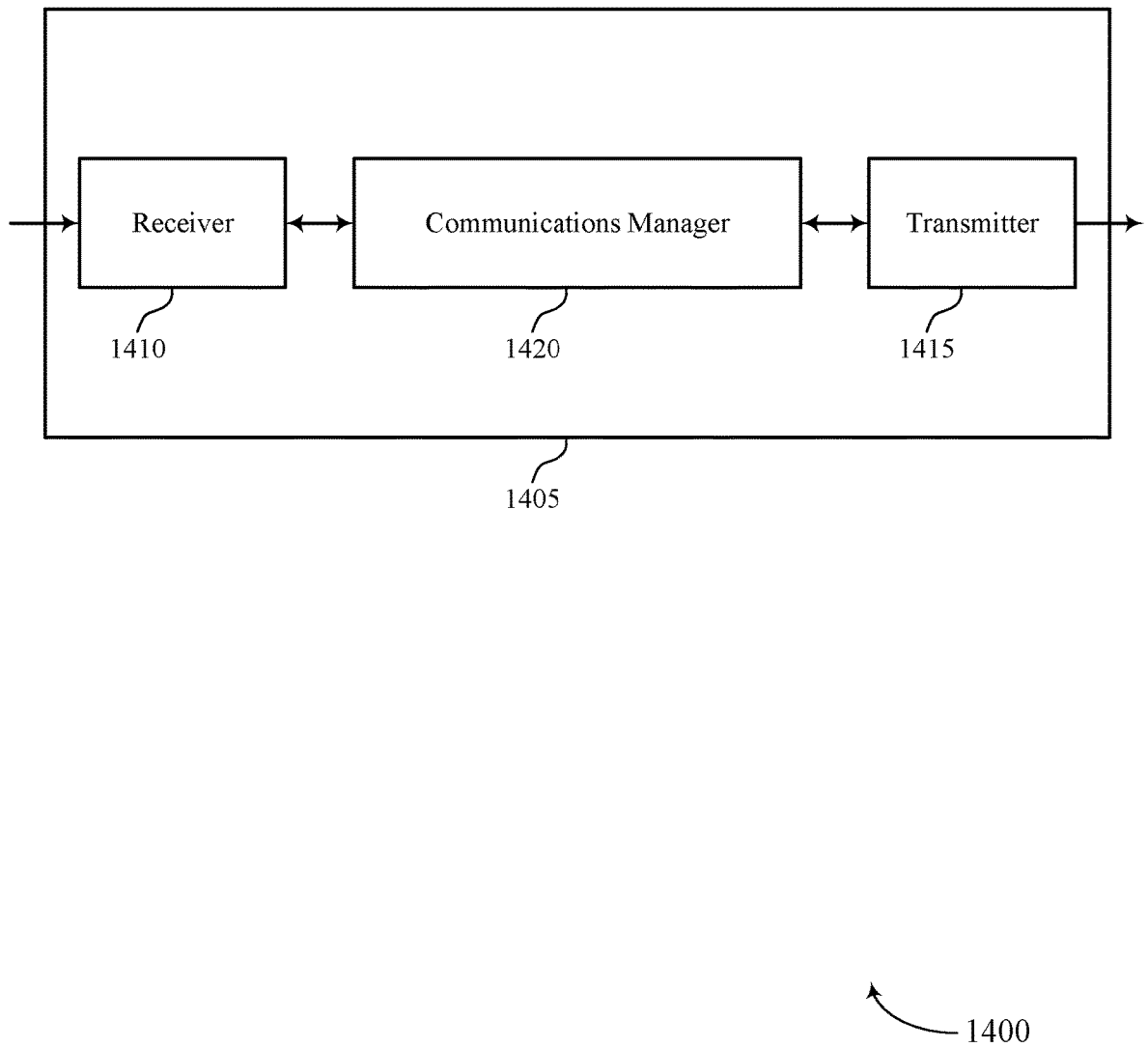
FIGS. 14 and 15 show block diagrams of devices that support per-sample repetition of a random access preamble in accordance with aspects of the present disclosure.

FIG. 14 shows a block diagram 1400 of a device 1405 that supports per-sample repetition of a random access preamble in accordance with aspects of the present disclosure. The device 1405 may be an example of aspects of a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to per-sample repetition of a random access preamble). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to per-sample repetition of a random access preamble). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of per-sample repetition of a random access preamble as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a base station in accordance with examples as disclosed herein. For example, the communications manager 1420 may be configured as or otherwise support a means for receiving a random access preamble from a UE via signaling that is based on a sequence that includes a second quantity of samples in a time domain, where each sample included in a first quantity of samples in the time domain is repeated within the sequence, and where repetitions of a same sample are consecutive within the sequence. The communications manager 1420 may be configured as or otherwise support a means for generating a set of sequences based on selecting sets of non-consecutive samples from the second quantity of samples in the sequence according to a sample interval, the sample interval equal to a quantity of times that each sample included in the first quantity of samples is repeated within the sequence. The communications manager 1420 may be configured as or otherwise support a means for detecting the random access preamble based on a combination of two or more sequences included in the set of sequences.

By including or configuring the communications manager 1420 in accordance with examples as described herein, the device 1405 (e.g., a processor controlling or otherwise coupled to the receiver 1410, the transmitter 1415, the communications manager 1420, or a combination thereof) may support techniques for more efficient utilization of communication resources, larger cell size, and lower operational complexity.

Figure 15:
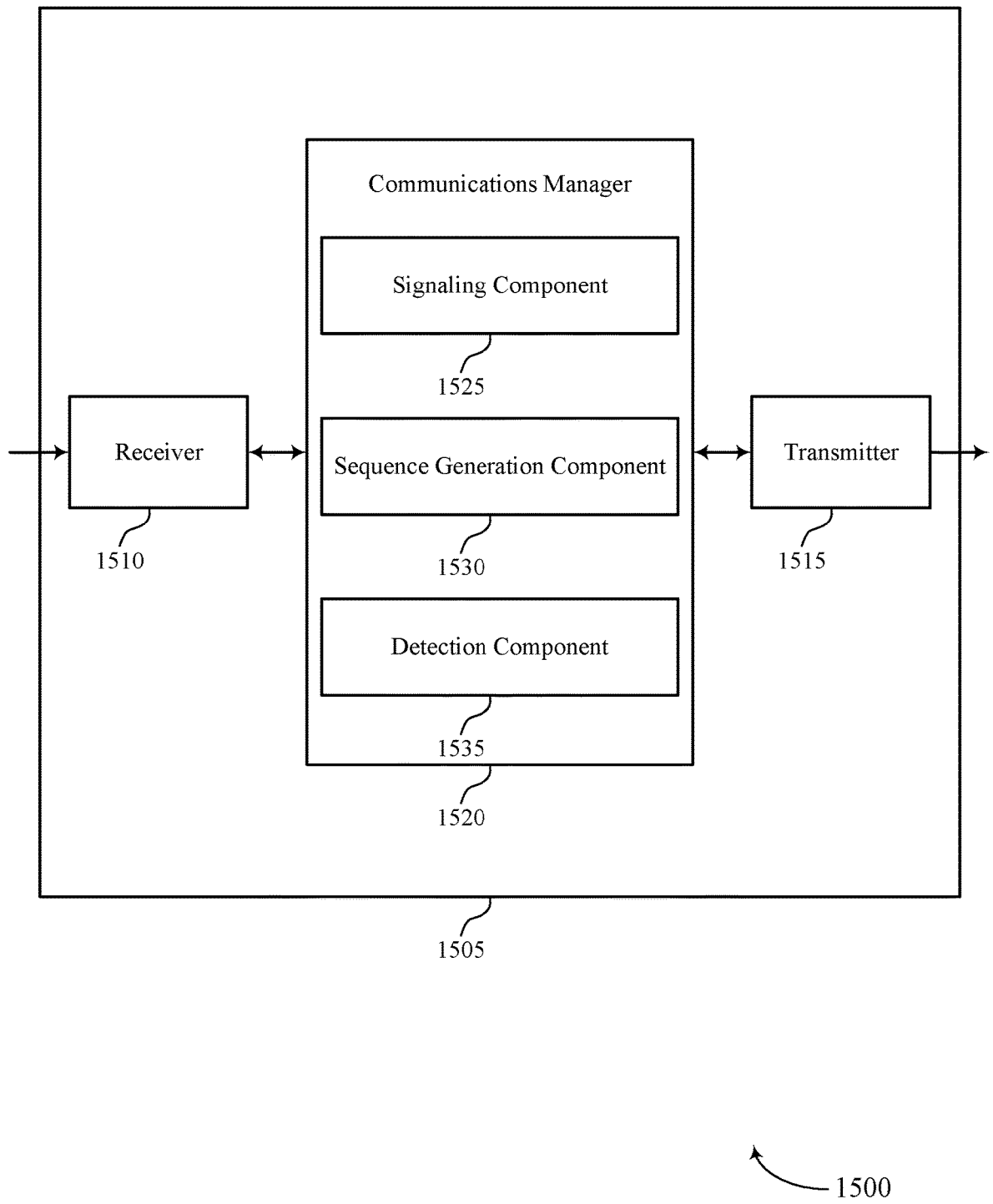

FIG. 15 shows a block diagram 1500 of a device 1505 that supports per-sample repetition of a random access preamble in accordance with aspects of the present disclosure. The device 1505 may be an example of aspects of a device 1405 or a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to per-sample repetition of a random access preamble). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to per-sample repetition of a random access preamble). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of per-sample repetition of a random access preamble as described herein. For example, the communications manager 1520 may include a signaling component 1525, a sequence generation component 1530, a detection component 1535, or any combination thereof. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a base station in accordance with examples as disclosed herein. The signaling component 1525 may be configured as or otherwise support a means for receiving a random access preamble from a UE via signaling that is based on a sequence that includes a second quantity of samples in a time domain, where each sample included in a first quantity of samples in the time domain is repeated within the sequence, and where repetitions of a same sample are consecutive within the sequence. The sequence generation component 1530 may be configured as or otherwise support a means for generating a set of sequences based on selecting sets of non-consecutive samples from the second quantity of samples in the sequence according to a sample interval, the sample interval equal to a quantity of times that each sample included in the first quantity of samples is repeated within the sequence. The detection component 1535 may be configured as or otherwise support a means for detecting the random access preamble based on a combination of two or more sequences included in the set of sequences.

Figure 16:
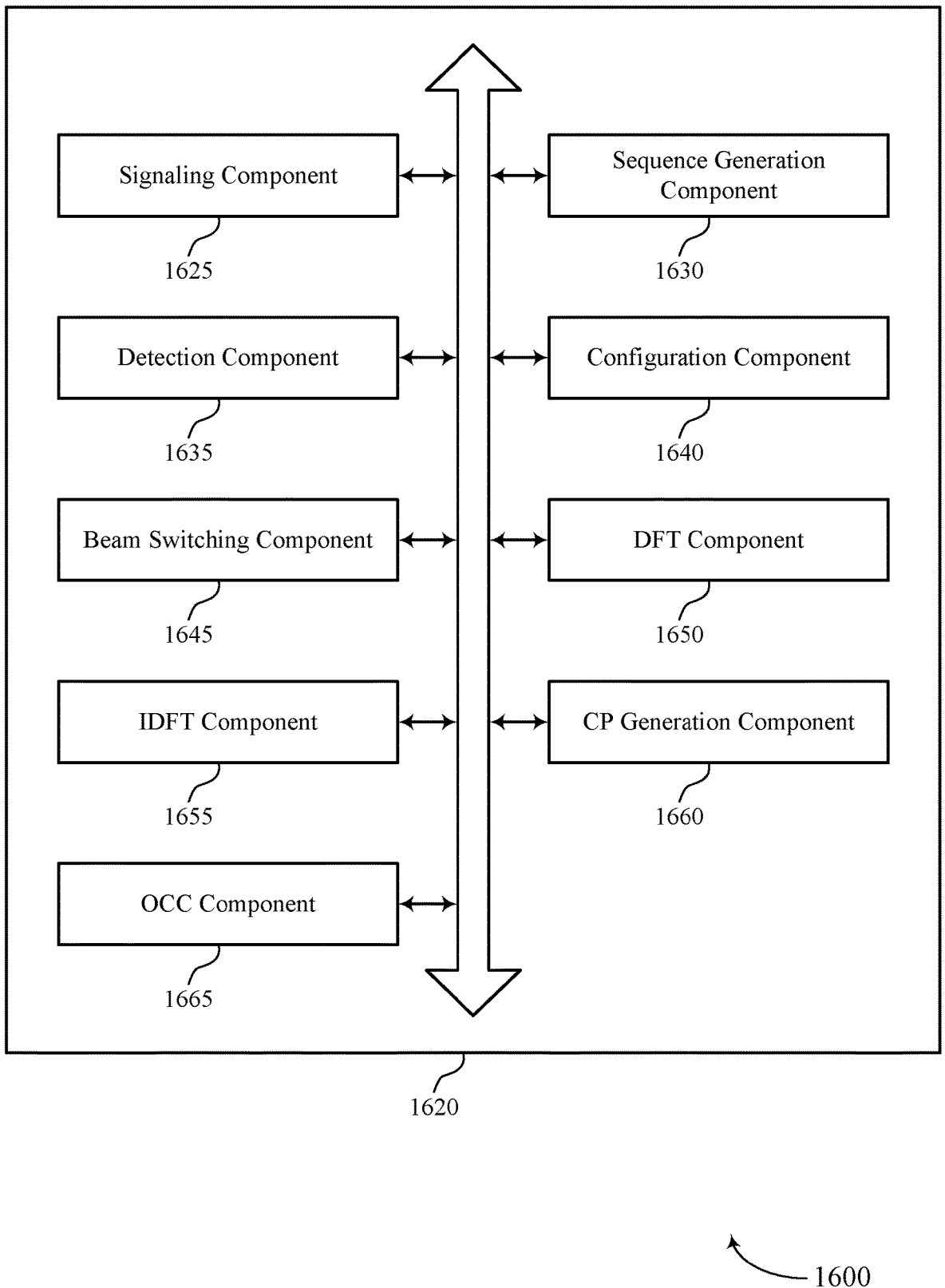
FIG. 16 shows a block diagram of a communications manager that supports per-sample repetition of a random access preamble in accordance with aspects of the present disclosure.

FIG. 16 shows a block diagram 1600 of a communications manager 1620 that supports per-sample repetition of a random access preamble in accordance with aspects of the present disclosure. The communications manager 1620 may be an example of aspects of a communications manager 1420, a communications manager 1520, or both, as described herein. The communications manager 1620, or various components thereof, may be an example of means for performing various aspects of per-sample repetition of a random access preamble as described herein. For example, the communications manager 1620 may include a signaling component 1625, a sequence generation component 1630, a detection component 1635, a configuration component 1640, a beam switching component 1645, a DFT component 1650, an IDFT component 1655, a CP generation component 1660, a OCC component 1665, or any combination thereof. Each of these components may communicate, directly or indirectly, with one another (e.g., via one or more buses).

The communications manager 1620 may support wireless communication at a base station in accordance with examples as disclosed herein. The signaling component 1625 may be configured as or otherwise support a means for receiving a random access preamble from a UE via signaling that is based on a sequence that includes a second quantity of samples in a time domain, where each sample included in a first quantity of samples in the time domain is repeated within the sequence, and where repetitions of a same sample are consecutive within the sequence. The sequence generation component 1630 may be configured as or otherwise support a means for generating a set of sequences based on selecting sets of non-consecutive samples from the second quantity of samples in the sequence according to a sample interval, the sample interval equal to a quantity of times that each sample included in the first quantity of samples is repeated within the sequence. The detection component 1635 may be configured as or otherwise support a means for detecting the random access preamble based on a combination of two or more sequences included in the set of sequences.

In some examples, each sequence of the set of sequences includes the first quantity of samples in the time domain.

In some examples, to support receiving of the random access preamble, the signaling component 1625 may be configured as or otherwise support a means for receiving a CP sequence that includes a fourth quantity of samples in the time domain, where each sample included in a third quantity of samples in the time domain is repeated the quantity of times within the CP sequence, and where repetitions of a same sample are consecutive within the CP sequence.

In some examples, the CP generation component 1660 may be configured as or otherwise support a means for generating a set of CPs based on selecting sets of non-consecutive samples from the fourth quantity of samples in the CP sequence according to the sample interval, where the detecting of the random access preamble is based on a combination of two or more CPs included in the set of CPs.

In some examples, the configuration component 1640 may be configured as or otherwise support a means for transmitting, to the UE, a configuration of a guard period spanning a time duration, where the receiving of the random access preamble is based on the guard period.

In some examples, the configuration component 1640 may be configured as or otherwise support a means for transmitting, to the UE, a configuration of a guard band spanning a quantity of subcarriers, the quantity of subcarriers based on the quantity of times that each sample included in the first quantity of samples is repeated within the sequence, where the receiving of the random access preamble is based on the guard band.

In some examples, the configuration component 1640 may be configured as or otherwise support a means for transmitting, to the UE, a configuration of one or more time gaps for separating at least some samples included in the second quantity of samples in the time domain. In some examples, the beam switching component 1645 may be configured as or otherwise support a means for switching a receive beam of the base station during each of the one or more time gaps, where the receiving of the random access preamble is based on the switching of the receive beam of the base station during each of the one or more time gaps.

In some examples, to support generating of the set of sequences, the DFT component 1650 may be configured as or otherwise support a means for performing a DFT on each of the sets of non-consecutive samples that are selected from the second quantity of samples to obtain a set of outputs of the DFT. In some examples, to support generating of the set of sequences, the IDFT component 1655 may be configured as or otherwise support a means for performing an IDFT on each of the set of outputs of the DFT to obtain the set of sequences.

In some examples, to support detecting of the random access preamble based on the combination of the two or more sequences included in the set of sequences, the detection component 1635 may be configured as or otherwise support a means for combining sets of corresponding samples included in the two or more sequences to obtain a combination sequence. In some examples, to support detecting of the random access preamble based on the combination of the two or more sequences included in the set of sequences, the detection component 1635 may be configured as or otherwise support a means for performing a signature detection procedure on the combination sequence to detect the random access preamble.

In some examples, the combining of the sets of corresponding samples includes coherent combining, and the OCC component 1665 may be configured as or otherwise support a means for testing one or more hypotheses on the combination sequence, each of the one or more hypotheses corresponding to a respective OCC. In some examples, the combining of the sets of corresponding samples includes coherent combining, and the OCC component 1665 may be configured as or otherwise support a means for detecting an OCC of the random access preamble based on the testing of the one or more hypotheses.

In some examples, the configuration component 1640 may be configured as or otherwise support a means for transmitting, to the UE, a configuration of a quantity of cyclic shifts to apply to the sequence that includes the second quantity of samples, the quantity of cyclic shifts based on the quantity of times that each sample included in the first quantity of samples is repeated within the sequence, where the receiving of the random access preamble is based on the quantity of cyclic shifts.

In some examples, the configuration component 1640 may be configured as or otherwise support a means for transmitting, to the UE, a configuration of the first quantity of samples, a configuration of the quantity of times that each sample included in the first quantity of samples is repeated within the sequence, a configuration of a base length of a CP for the random access preamble, or any combination thereof. In some examples, the combination of the two or more sequences included in the set of sequences is based on coherent combining or non-coherent combining.

Figure 17:
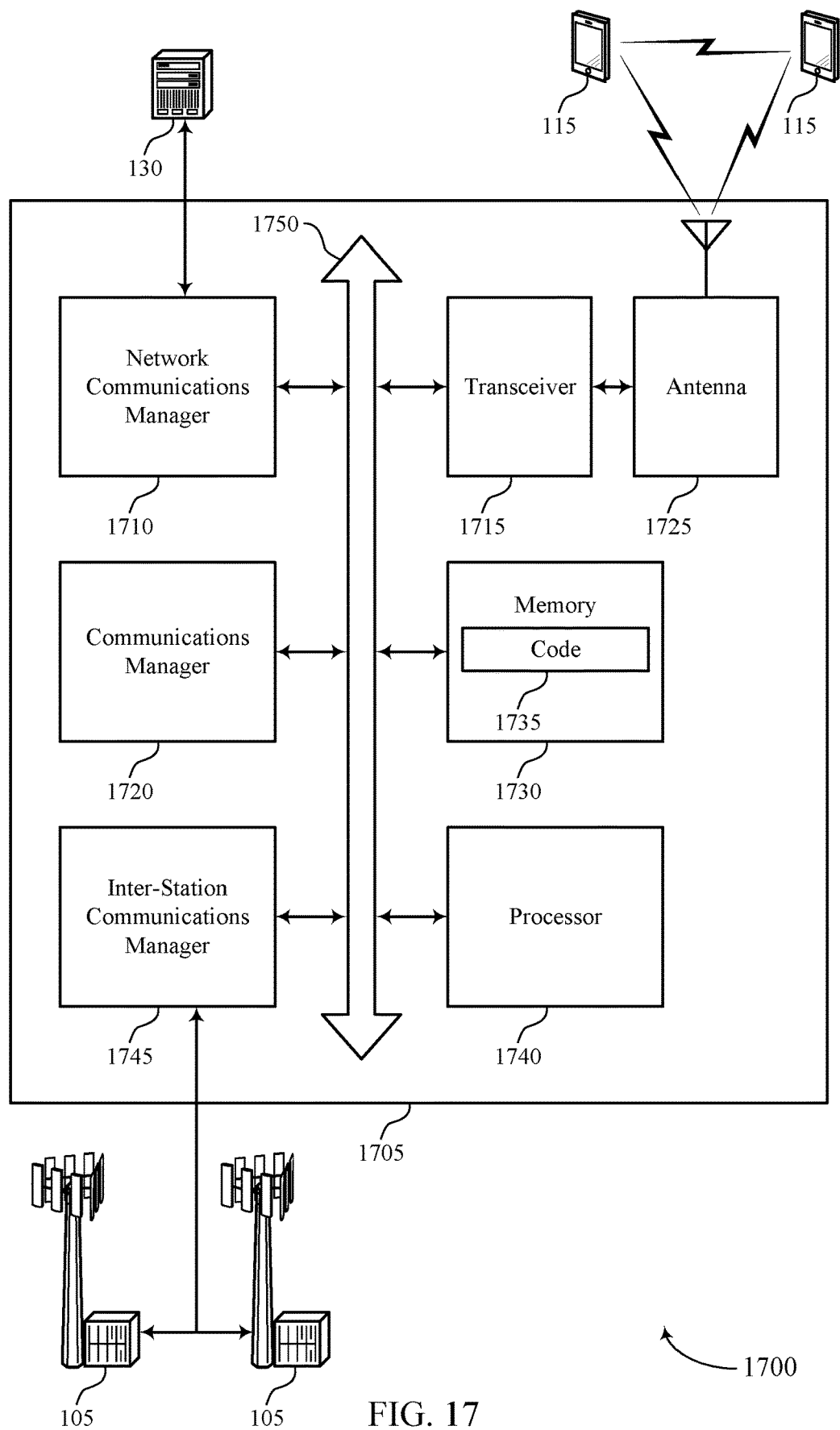
FIG. 17 shows a diagram of a system including a device that supports per-sample repetition of a random access preamble in accordance with aspects of the present disclosure.

FIG. 17 shows a diagram of a system 1700 including a device 1705 that supports per-sample repetition of a random access preamble in accordance with aspects of the present disclosure. The device 1705 may be an example of or include the components of a device 1405, a device 1505, or a base station 105 as described herein. The device 1705 may communicate wirelessly with one or more base stations 105, UEs 115, or any combination thereof. The device 1705 may include components for bi-directional voice and data communications including components for transmitting and receiving communications, such as a communications manager 1720, a network communications manager 1710, a transceiver 1715, an antenna 1725, a memory 1730, code 1735, a processor 1740, and an inter-station communications manager 1745. These components may be in electronic communication or otherwise coupled (e.g., operatively, communicatively, functionally, electronically, electrically) via one or more buses (e.g., a bus 1750).

The network communications manager 1710 may manage communications with a core network 130 (e.g., via one or more wired backhaul links). For example, the network communications manager 1710 may manage the transfer of data communications for client devices, such as one or more UEs 115.

In some cases, the device 1705 may include a single antenna 1725. However, in some other cases the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include RAM and ROM. The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a BIOS which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting per-sample repetition of a random access preamble). For example, the device 1705 or a component of the device 1705 may include a processor 1740 and memory 1730 coupled to the processor 1740, the processor 1740 and memory 1730 configured to perform various functions described herein.

The inter-station communications manager 1745 may manage communications with other base stations 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communications network technology to provide communication between base stations 105.

The communications manager 1720 may support wireless communication at a base station in accordance with examples as disclosed herein. For example, the communications manager 1720 may be configured as or otherwise support a means for receiving a random access preamble from a UE via signaling that is based on a sequence that includes a second quantity of samples in a time domain, where each sample included in a first quantity of samples in the time domain is repeated within the sequence, and where repetitions of a same sample are consecutive within the sequence. The communications manager 1720 may be configured as or otherwise support a means for generating a set of sequences based on selecting sets of non-consecutive samples from the second quantity of samples in the sequence according to a sample interval, the sample interval equal to a quantity of times that each sample included in the first quantity of samples is repeated within the sequence. The communications manager 1720 may be configured as or otherwise support a means for detecting the random access preamble based on a combination of two or more sequences included in the set of sequences.

By including or configuring the communications manager 1720 in accordance with examples as described herein, the device 1705 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of per-sample repetition of a random access preamble as described herein, or the processor 1740 and the memory 1730 may be otherwise configured to perform or support such operations.

Figure 18:
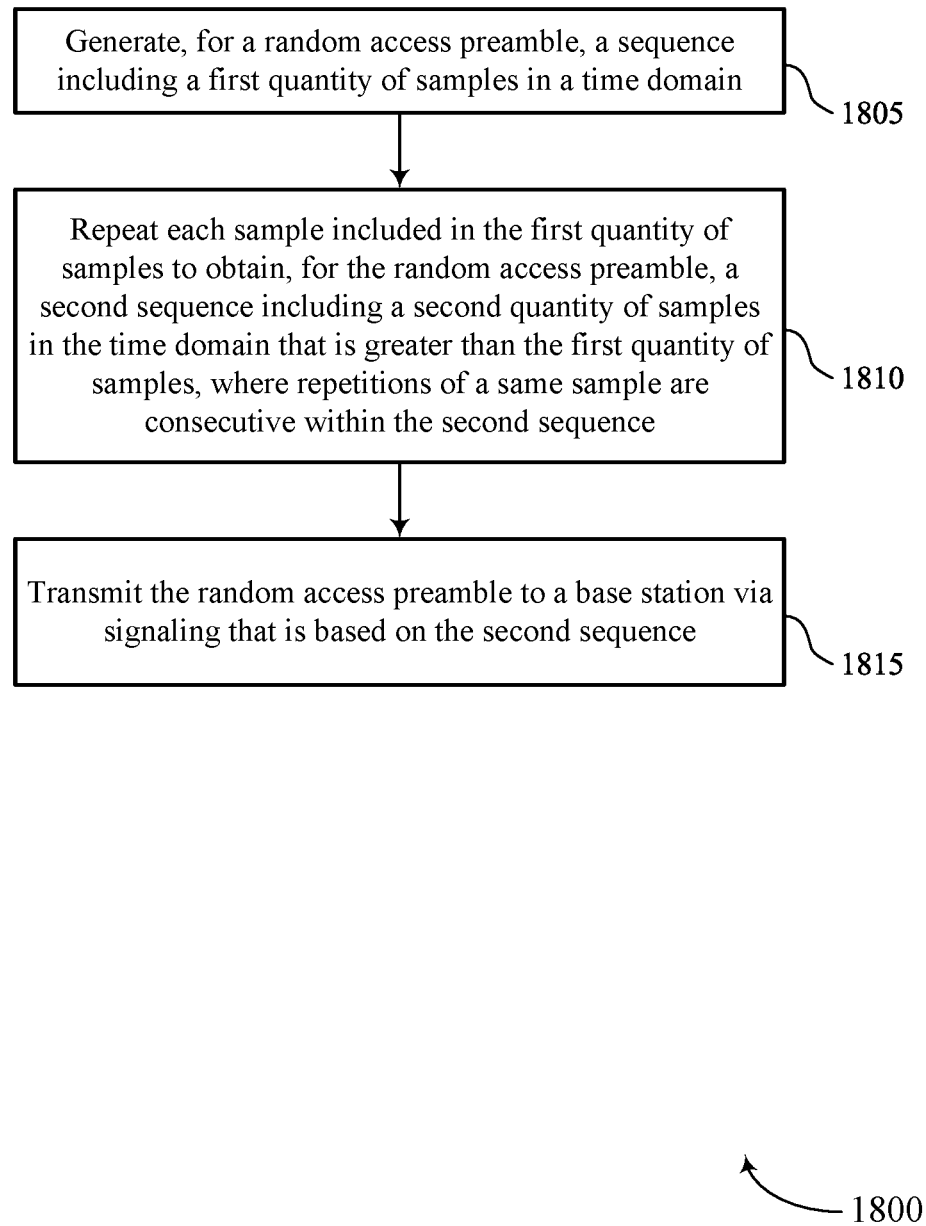
FIGS. 18 through 22 show flowcharts illustrating methods that support per-sample repetition of a random access preamble in accordance with aspects of the present disclosure.

FIG. 18 shows a flowchart illustrating a method 1800 that supports per-sample repetition of a random access preamble in accordance with aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1805, the method may include generating, for a random access preamble, a sequence including a first quantity of samples in a time domain. The operations of 1805 may be performed in accordance with examples as disclosed herein. In some examples, aspects of the operations of 1805 may be performed by a sequence generation component 1225 as described with reference to FIG. 12.

At 1810, the method may include repeating each sample included in the first quantity of samples to obtain, for the random access preamble, a second sequence including a second quantity of samples in the time domain that is greater than the first quantity of samples, where repetitions of a same sample are consecutive within the second sequence. The operations of 1810 may be performed in accordance with examples as disclosed herein. In some examples, aspects of the operations of 1810 may be performed by a repetition component 1230 as described with reference to FIG. 12.

At 1815, the method may include transmitting the random access preamble to a base station via signaling that is based on the second sequence. The operations of 1815 may be performed in accordance with examples as disclosed herein. In some examples, aspects of the operations of 1815 may be performed by a signaling component 1235 as described with reference to FIG. 12.

Figure 19:
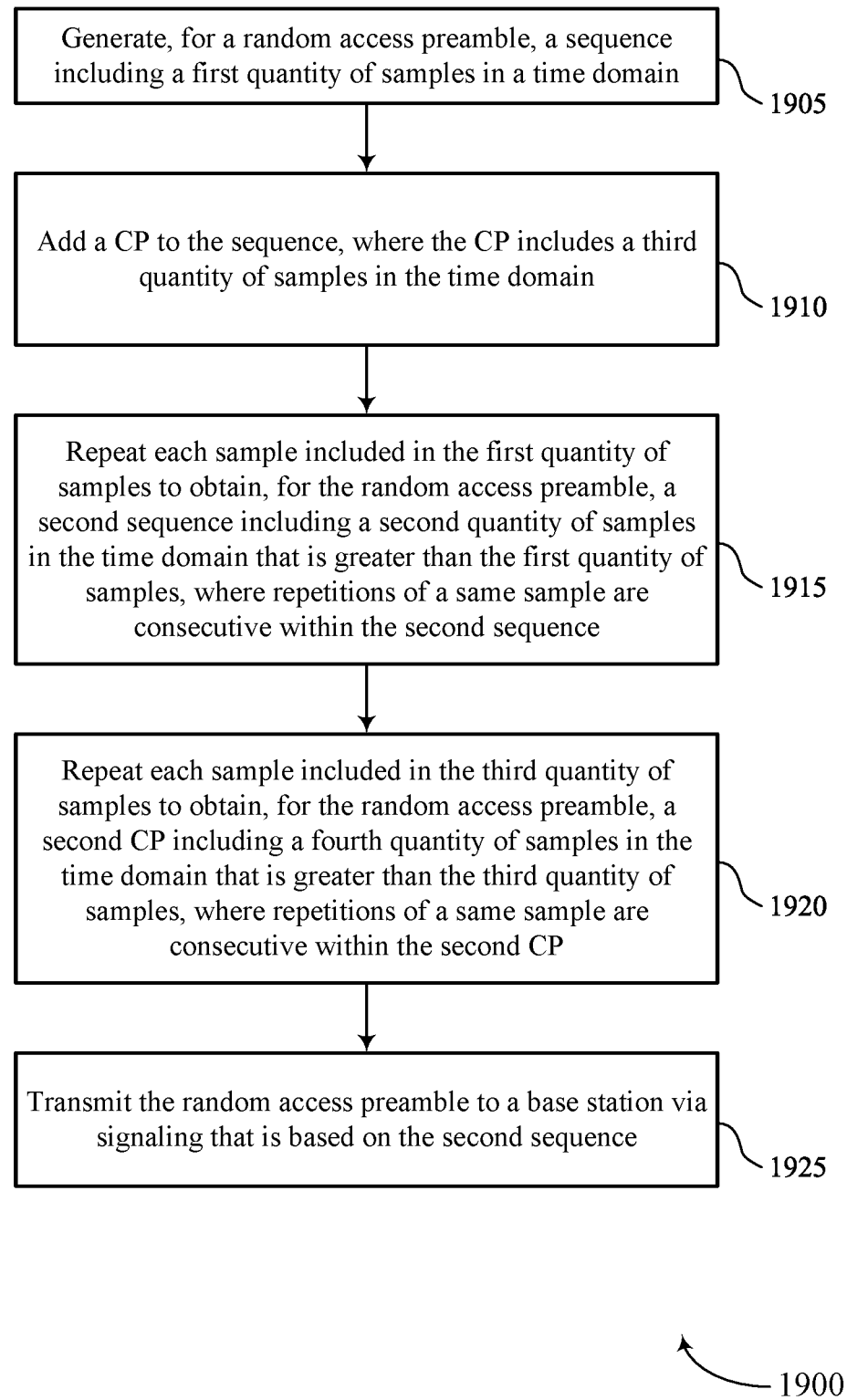

FIG. 19 shows a flowchart illustrating a method 1900 that supports per-sample repetition of a random access preamble in accordance with aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1905, the method may include generating, for a random access preamble, a sequence including a first quantity of samples in a time domain. The operations of 1905 may be performed in accordance with examples as disclosed herein. In some examples, aspects of the operations of 1905 may be performed by a sequence generation component 1225 as described with reference to FIG. 12.

At 1910, the method may include adding (e.g., prior to a repeating of each sample included in the first quantity of samples) a CP to the sequence, where the CP includes a third quantity of samples in the time domain. The operations of 1910 may be performed in accordance with examples as disclosed herein. In some examples, aspects of the operations of 1910 may be performed by a CP component 1240 as described with reference to FIG. 12.

At 1915, the method may include repeating each sample included in the first quantity of samples to obtain, for the random access preamble, a second sequence including a second quantity of samples in the time domain that is greater than the first quantity of samples, where repetitions of a same sample are consecutive within the second sequence. The operations of 1915 may be performed in accordance with examples as disclosed herein. In some examples, aspects of the operations of 1915 may be performed by a repetition component 1230 as described with reference to FIG. 12.

At 1920, the method may include repeating (e.g., before, after, or concurrent with the repeating at 1910) each sample included in the third quantity of samples to obtain, for the random access preamble, a second CP including a fourth quantity of samples in the time domain that is greater than the third quantity of samples, where repetitions of a same sample are consecutive within the second CP. The operations of 1920 may be performed in accordance with examples as disclosed herein. In some examples, aspects of the operations of 1920 may be performed by a repetition component 1230 as described with reference to FIG. 12.

At 1925, the method may include transmitting the random access preamble to a base station via signaling that is based on the second sequence. The operations of 1925 may be performed in accordance with examples as disclosed herein. In some examples, aspects of the operations of 1925 may be performed by a signaling component 1235 as described with reference to FIG. 12.

Figure 20:
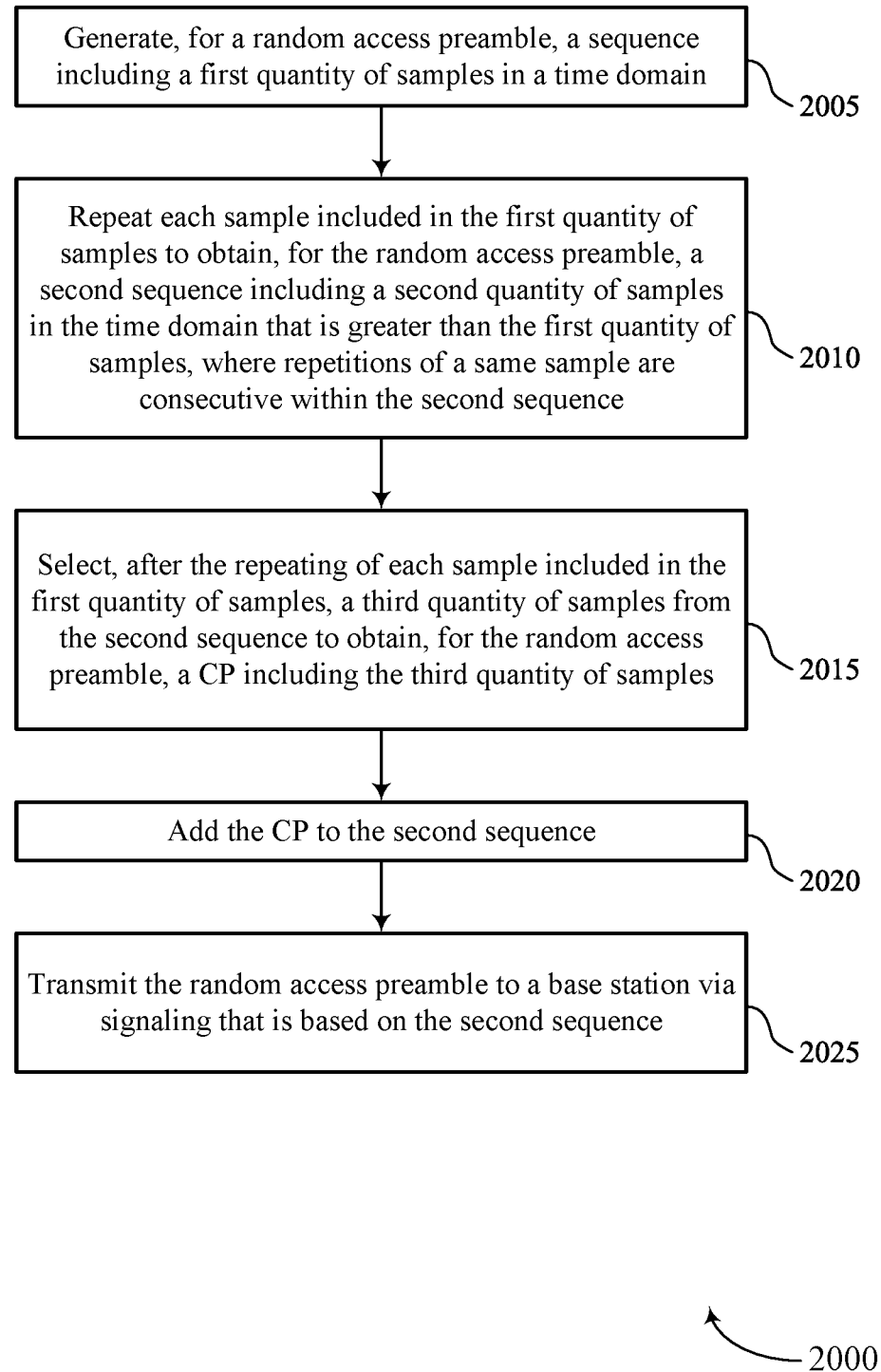

FIG. 20 shows a flowchart illustrating a method 2000 that supports per-sample repetition of a random access preamble in accordance with aspects of the present disclosure. The operations of the method 2000 may be implemented by a UE or its components as described herein. For example, the operations of the method 2000 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2005, the method may include generating, for a random access preamble, a sequence including a first quantity of samples in a time domain. The operations of 2005 may be performed in accordance with examples as disclosed herein. In some examples, aspects of the operations of 2005 may be performed by a sequence generation component 1225 as described with reference to FIG. 12.

At 2010, the method may include repeating each sample included in the first quantity of samples to obtain, for the random access preamble, a second sequence including a second quantity of samples in the time domain that is greater than the first quantity of samples, where repetitions of a same sample are consecutive within the second sequence. The operations of 2010 may be performed in accordance with examples as disclosed herein. In some examples, aspects of the operations of 2010 may be performed by a repetition component 1230 as described with reference to FIG. 12.

At 2015, the method may include selecting, after the repeating of each sample included in the first quantity of samples, a third quantity of samples from the second sequence to obtain, for the random access preamble, a CP including the third quantity of samples. The operations of 2015 may be performed in accordance with examples as disclosed herein. In some examples, aspects of the operations of 2015 may be performed by a CP component 1240 as described with reference to FIG. 12.

At 2020, the method may include adding the CP to the second sequence. The operations of 2020 may be performed in accordance with examples as disclosed herein. In some examples, aspects of the operations of 2020 may be performed by a CP component 1240 as described with reference to FIG. 12.

At 2025, the method may include transmitting the random access preamble to a base station via signaling that is based on the second sequence. The operations of 2025 may be performed in accordance with examples as disclosed herein. In some examples, aspects of the operations of 2025 may be performed by a signaling component 1235 as described with reference to FIG. 12.

Figure 21:
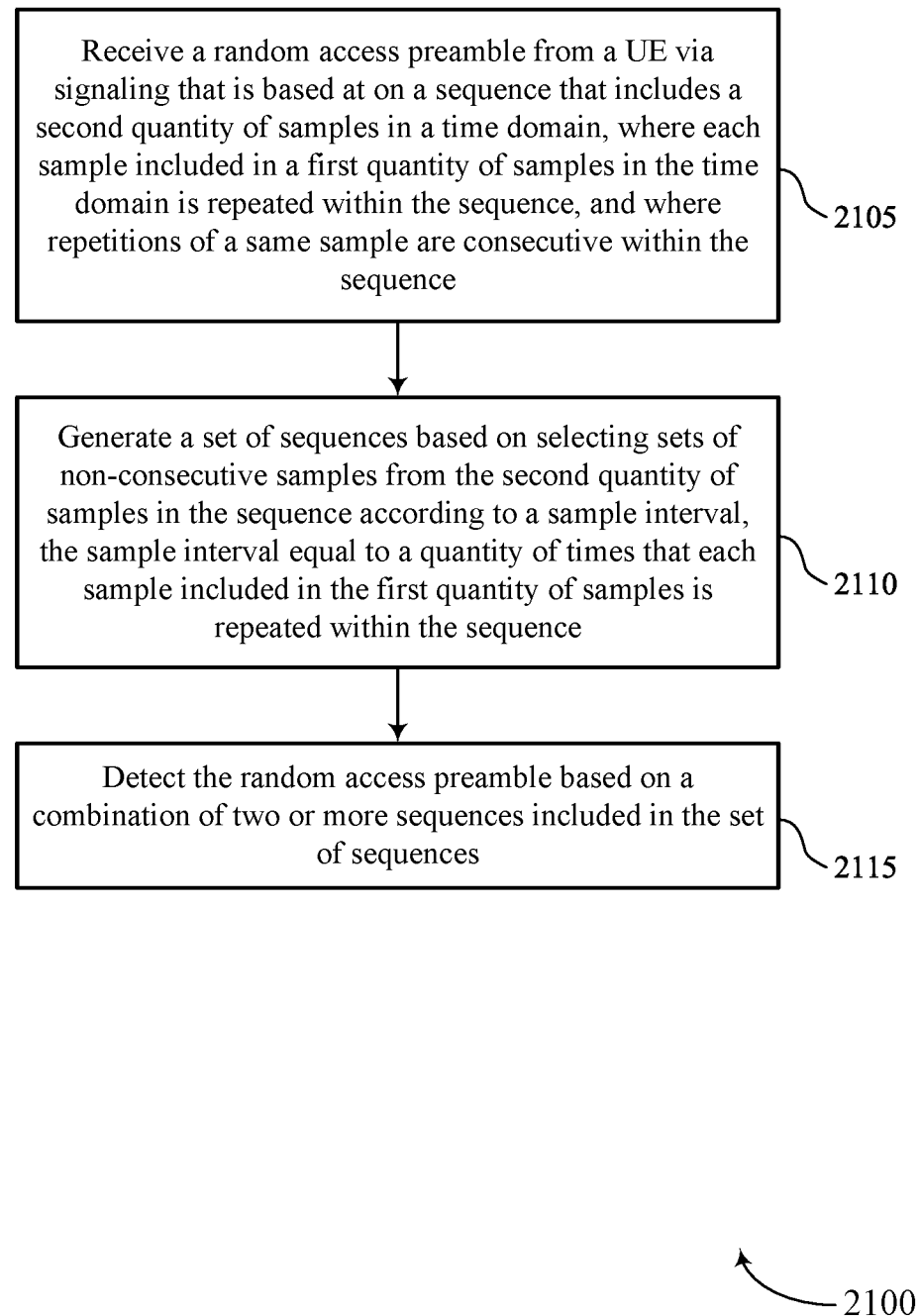

FIG. 21 shows a flowchart illustrating a method 2100 that supports per-sample repetition of a random access preamble in accordance with aspects of the present disclosure. The operations of the method 2100 may be implemented by a base station or its components as described herein. For example, the operations of the method 2100 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2105, the method may include receiving a random access preamble from a UE via signaling that is based on a sequence that includes a second quantity of samples in a time domain, where each sample included in a first quantity of samples in the time domain is repeated within the sequence, and where repetitions of a same sample are consecutive within the sequence. The operations of 2105 may be performed in accordance with examples as disclosed herein. In some examples, aspects of the operations of 2105 may be performed by a signaling component 1625 as described with reference to FIG. 16.

At 2110, the method may include generating a set of sequences based on selecting sets of non-consecutive samples from the second quantity of samples in the sequence according to a sample interval, the sample interval equal to a quantity of times that each sample included in the first quantity of samples is repeated within the sequence. The operations of 2110 may be performed in accordance with examples as disclosed herein. In some examples, aspects of the operations of 2110 may be performed by a sequence generation component 1630 as described with reference to FIG. 16.

At 2115, the method may include detecting the random access preamble based on a combination of two or more sequences included in the set of sequences. The operations of 2115 may be performed in accordance with examples as disclosed herein. In some examples, aspects of the operations of 2115 may be performed by a detection component 1635 as described with reference to FIG. 16.

Figure 22:
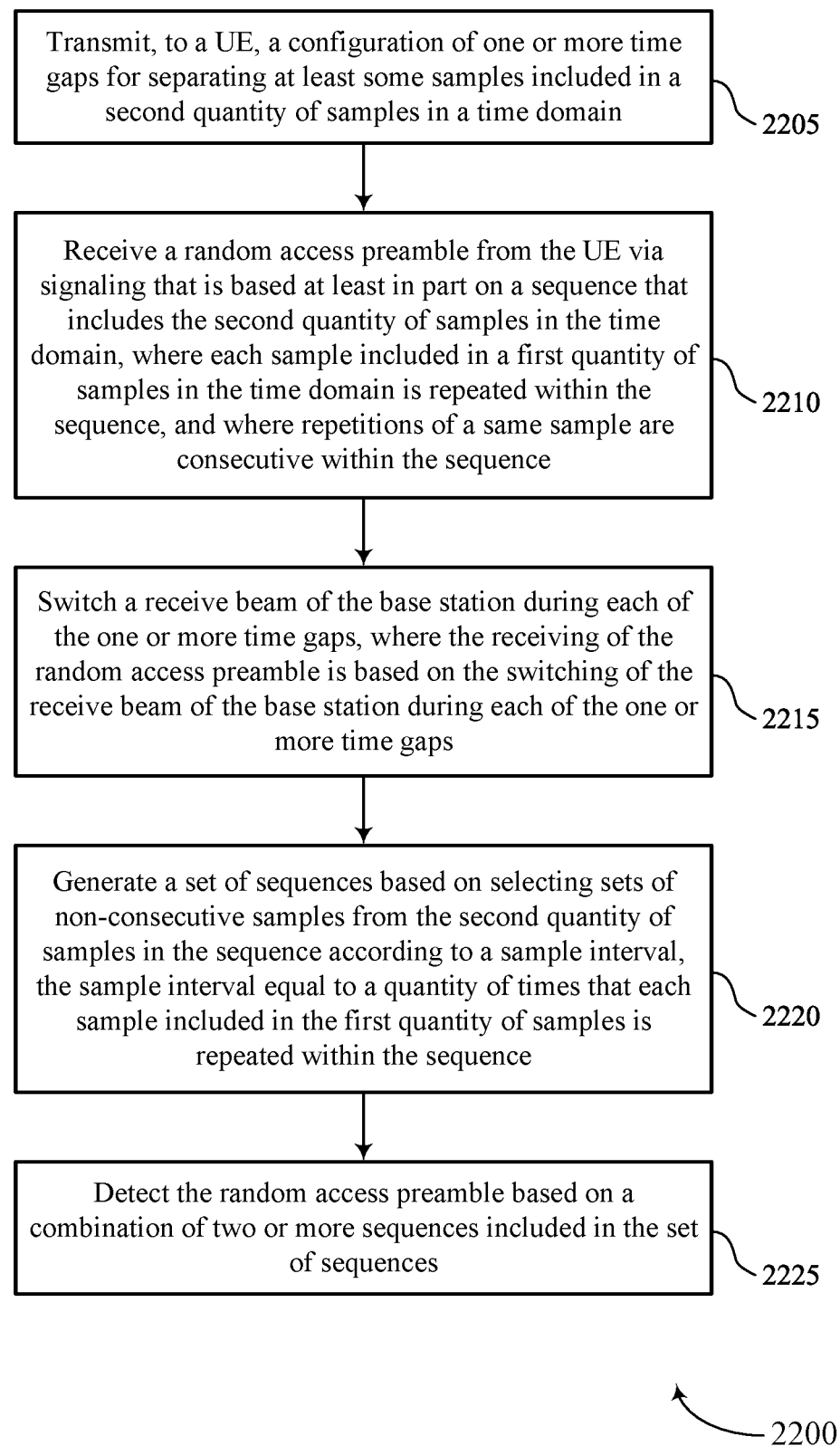

FIG. 22 shows a flowchart illustrating a method 2200 that supports per-sample repetition of a random access preamble in accordance with aspects of the present disclosure. The operations of the method 2200 may be implemented by a base station or its components as described herein. For example, the operations of the method 2200 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2205, the method may include transmitting, to a UE, a configuration of one or more time gaps for separating at least some samples included in a second quantity of samples in a time domain. The operations of 2205 may be performed in accordance with examples as disclosed herein. In some examples, aspects of the operations of 2205 may be performed by a configuration component 1640 as described with reference to FIG. 16.

At 2210, the method may include receiving a random access preamble from the UE via signaling that is based on a sequence that includes the second quantity of samples in the time domain, where each sample included in a first quantity of samples in the time domain is repeated within the sequence, and where repetitions of a same sample are consecutive within the sequence. The operations of 2210 may be performed in accordance with examples as disclosed herein. In some examples, aspects of the operations of 2210 may be performed by a signaling component 1625 as described with reference to FIG. 16.

At 2215, the method may include switching a receive beam of the base station during each of the one or more time gaps, where the receiving of the random access preamble is based on the switching of the receive beam of the base station during each of the one or more time gaps. The operations of 2215 may be performed in accordance with examples as disclosed herein. In some examples, aspects of the operations of 2215 may be performed by a beam switching component 1645 as described with reference to FIG. 16.

At 2220, the method may include generating a set of sequences based on selecting sets of non-consecutive samples from the second quantity of samples in the sequence according to a sample interval, the sample interval equal to a quantity of times that each sample included in the first quantity of samples is repeated within the sequence. The operations of 2220 may be performed in accordance with examples as disclosed herein. In some examples, aspects of the operations of 2220 may be performed by a sequence generation component 1630 as described with reference to FIG. 16.

At 2225, the method may include detecting the random access preamble based on a combination of two or more sequences included in the set of sequences. The operations of 2225 may be performed in accordance with examples as disclosed herein. In some examples, aspects of the operations of 2225 may be performed by a detection component 1635 as described with reference to FIG. 16.

The following provides an overview of aspects of the present disclosure:

Aspect 1: A method for wireless communication at a UE, comprising: generating, for a random access preamble, a sequence comprising a first quantity of samples in a time domain; repeating each sample included in the first quantity of samples to obtain, for the random access preamble, a second sequence comprising a second quantity of samples in the time domain that is greater than the first quantity of samples, wherein repetitions of a same sample are consecutive within the second sequence; and transmitting the random access preamble to a base station via signaling that is based at least in part on the second sequence.

Aspect 2: The method of aspect 1, further comprising: adding, prior to the repeating of each sample included in the first quantity of samples, a CP to the sequence, wherein the CP comprises a third quantity of samples in the time domain; and repeating each sample included in the third quantity of samples to obtain, for the random access preamble, a second CP comprising a fourth quantity of samples in the time domain that is greater than the third quantity of samples, wherein repetitions of a same sample are consecutive within the second CP.

Aspect 3: The method of aspect 1, further comprising: selecting, after the repeating of each sample included in the first quantity of samples, a third quantity of samples from the second sequence to obtain, for the random access preamble, a CP comprising the third quantity of samples; and adding the CP to the second sequence.

Aspect 4: The method of aspect 3, wherein the third quantity of samples selected from the second sequence is based at least in part on a product of a quantity of times that each sample included in the first quantity of samples is repeated and a base length of the CP.

Aspect 5: The method of any of aspects 1 through 4, wherein the transmitting of the random access preamble to the base station comprises transmitting the random access preamble via an OFDM waveform, the method further comprising: performing a DFT on the sequence comprising the first quantity of samples to obtain an output of the DFT; and performing an IFFT on the output of the DFT to obtain an output of the IFFT, wherein the repeating of each sample included in the first quantity of samples comprises: repeating each sample included in the output of the IFFT.

Aspect 6: The method of any of aspects 1 through 4, wherein the first quantity of samples in the time domain comprises a series of time domain samples of a single carrier signal; and the signaling via which the random access preamble is transmitted comprises a single carrier waveform that is based at least in part on the single carrier signal.

Aspect 7: The method of any of aspects 1 through 6, further comprising: receiving, from the base station, a configuration of a guard period spanning a time duration; and adding the guard period to an end of the second sequence, wherein the signaling via which the random access preamble is transmitted is based at least in part on the adding of the guard period to the end of the second sequence.

Aspect 8: The method of any of aspects 1 through 7, further comprising: receiving, from the base station, a configuration of a guard band spanning a quantity of subcarriers, wherein the quantity of subcarriers is based at least in part on a quantity of times that each sample included in the first quantity of samples is repeated; and refraining from transmitting within the guard band during the transmitting of the random access preamble, wherein the transmitting of the random access preamble is based at least in part on the refraining from transmitting within the guard band.

Aspect 9: The method of any of aspects 1 through 8, further comprising: receiving a configuration of one or more time gaps for separating at least some samples included in the second quantity of samples in the time domain; and adding the one or more time gaps between the at least some samples included in the second quantity of samples, wherein the signaling via which the random access preamble is transmitted is based at least in part on the one or more time gaps.

Aspect 10: The method of any of aspects 1 through 9, further comprising: applying an OCC to the second sequence and a CP for the random access preamble, wherein the transmitting of the random access preamble is based at least in part on the applying of the OCC to the second sequence and the CP.

Aspect 11: The method of any of aspects 1 through 9, further comprising: applying an OCC to the second sequence to obtain an encoded second sequence; and adding a CP for the random access preamble to the encoded second sequence, wherein the transmitting of the random access preamble is based at least in part on the encoded second sequence and the CP.

Aspect 12: The method of any of aspects 1 through 11, further comprising: applying a quantity of cyclic shifts to the second sequence comprising the second quantity of samples, the quantity of cyclic shifts based at least in part on a quantity of times that each sample included in the first quantity of samples is repeated to obtain the second sequence, wherein the transmitting of the random access preamble is based at least in part on the applying of the quantity of cyclic shifts to the second sequence.

Aspect 13: The method of any of aspects 1 through 12, further comprising: receiving, from the base station, a configuration of the first quantity of samples of the sequence, a configuration of a quantity of times that each sample included in the first quantity of samples is repeated to obtain the second sequence, a configuration of a base length of a CP for the random access preamble, or any combination thereof.

Aspect 14: A method for wireless communication at a base station, comprising: receiving a random access preamble from a UE via signaling that is based at least in part on a sequence that comprises a second quantity of samples in a time domain, wherein each sample included in a first quantity of samples in the time domain is repeated within the sequence, and wherein repetitions of a same sample are consecutive within the sequence; generating a set of sequences based at least in part on selecting sets of non-consecutive samples from the second quantity of samples in the sequence according to a sample interval, the sample interval equal to a quantity of times that each sample included in the first quantity of samples is repeated within the sequence; and detecting the random access preamble based at least in part on a combination of two or more sequences included in the set of sequences.

Aspect 15: The method of aspect 14, wherein each sequence of the set of sequences comprises the first quantity of samples in the time domain.

Aspect 16: The method of any of aspects 14 through 15, wherein the receiving of the random access preamble further comprises: receiving a CP sequence that comprises a fourth quantity of samples in the time domain, wherein each sample included in a third quantity of samples in the time domain is repeated the quantity of times within the CP sequence, and wherein repetitions of a same sample are consecutive within the CP sequence.

Aspect 17: The method of aspect 16, further comprising: generating a set of CPs based at least in part on selecting sets of non-consecutive samples from the fourth quantity of samples in the CP sequence according to the sample interval, wherein the detecting of the random access preamble is based at least in part on a combination of two or more CPs included in the set of CPs.

Aspect 18: The method of any of aspects 14 through 17, further comprising: transmitting, to the UE, a configuration of a guard period spanning a time duration, wherein the receiving of the random access preamble is based at least in part on the guard period.

Aspect 19: The method of any of aspects 14 through 18, further comprising: transmitting, to the UE, a configuration of a guard band spanning a quantity of subcarriers, the quantity of subcarriers based at least in part on the quantity of times that each sample included in the first quantity of samples is repeated within the sequence, wherein the receiving of the random access preamble is based at least in part on the guard band.

Aspect 20: The method of any of aspects 14 through 19, further comprising: transmitting, to the UE, a configuration of one or more time gaps for separating at least some samples included in the second quantity of samples in the time domain; and switching a receive beam of the base station during each of the one or more time gaps, wherein the receiving of the random access preamble is based at least in part on the switching of the receive beam of the base station during each of the one or more time gaps.

Aspect 21: The method of any of aspects 14 through 20, wherein the generating of the set of sequences comprises: performing a DFT on each of the sets of non-consecutive samples that are selected from the second quantity of samples to obtain a set of outputs of the DFT; and performing an IDFT on each of the set of outputs of the DFT to obtain the set of sequences.

Aspect 22: The method of any of aspects 14 through 21, wherein the detecting of the random access preamble based at least in part on the combination of the two or more sequences included in the set of sequences comprises: combining sets of corresponding samples included in the two or more sequences to obtain a combination sequence; and performing a signature detection procedure on the combination sequence to detect the random access preamble.

Aspect 23: The method of aspect 22, wherein the combining of the sets of corresponding samples comprises coherent combining, the method further comprising: testing one or more hypotheses on the combination sequence, each of the one or more hypotheses corresponding to a respective OCC; and detecting an OCC of the random access preamble based at least in part on the testing of the one or more hypotheses.

Aspect 24: The method of any of aspects 14 through 23, further comprising: transmitting, to the UE, a configuration of a quantity of cyclic shifts to apply to the sequence that comprises the second quantity of samples, the quantity of cyclic shifts based at least in part on the quantity of times that each sample included in the first quantity of samples is repeated within the sequence, wherein the receiving of the random access preamble is based at least in part on the quantity of cyclic shifts.

Aspect 25: The method of any of aspects 14 through 24, further comprising: transmitting, to the UE, a configuration of the first quantity of samples, a configuration of the quantity of times that each sample included in the first quantity of samples is repeated within the sequence, a configuration of a base length of a CP for the random access preamble, or any combination thereof.

Aspect 26: The method of any of aspects 14 through 25, wherein the combination of the two or more sequences included in the set of sequences is based at least in part on coherent combining or non-coherent combining.

Aspect 27: An apparatus for wireless communication at a UE, comprising a processor; memory coupled with the processor; and instructions stored in the memory and executable by the processor to cause the apparatus to perform a method of any of aspects 1 through 13.

Aspect 28: An apparatus for wireless communication at a UE, comprising at least one means for performing a method of any of aspects 1 through 13.

Aspect 29: A non-transitory computer-readable medium storing code for wireless communication at a UE, the code comprising instructions executable by a processor to perform a method of any of aspects 1 through 13.

Aspect 30: An apparatus for wireless communication at a base station, comprising a processor; memory coupled with the processor; and instructions stored in the memory and executable by the processor to cause the apparatus to perform a method of any of aspects 14 through 26.

Aspect 31: An apparatus for wireless communication at a base station, comprising at least one means for performing a method of any of aspects 14 through 26.

Aspect 32: A non-transitory computer-readable medium storing code for wireless communication at a base station, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
generating, for a random access preamble, a first sequence comprising a first quantity of time domain samples;
repeating each time domain sample included in the first quantity of time domain samples to obtain, for the random access preamble, a second sequence comprising a second quantity of time domain samples that is greater than the first quantity of time domain samples, the second quantity of time domain samples including repetitions of the first quantity of time domain samples, and repetitions of a same time domain sample of the first quantity of time domain samples being consecutive within the second sequence; and
transmitting the random access preamble to a network device via signaling that is associated at least in part with the second sequence.

2. The method of claim 1, further comprising:
adding, prior to the repeating of each time domain sample included in the first quantity of time domain samples, a cyclic prefix to the first sequence, the cyclic prefix comprising a third quantity of time domain samples; and
repeating each time domain sample included in the third quantity of time domain samples to obtain, for the random access preamble, a second cyclic prefix comprising a fourth quantity of time domain samples that is greater than the third quantity of time domain samples, repetitions of a same time domain sample being consecutive within the second cyclic prefix.

3. The method of claim 1, further comprising:
selecting, after the repeating of each time domain sample included in the first quantity of time domain samples, a third quantity of time domain samples from the second sequence to obtain, for the random access preamble, a cyclic prefix comprising the third quantity of time domain samples; and
adding the cyclic prefix to the second sequence.

4. The method of claim 3, wherein the third quantity of time domain samples selected from the second sequence is associated at least in part with a product of a quantity of times that each time domain sample included in the first quantity of time domain samples is repeated and a base length of the cyclic prefix.

5. The method of claim 1, wherein the transmitting of the random access preamble to the network device comprises transmitting the random access preamble via an orthogonal frequency-division multiplexing waveform, the method further comprising:
performing a discrete Fourier transform on the first sequence comprising the first quantity of time domain samples to obtain an output of the discrete Fourier transform; and
performing an inverse fast Fourier transform on the output of the discrete Fourier transform to obtain an output of the inverse fast Fourier transform, wherein the repeating of each time domain sample included in the first quantity of time domain samples comprises:
repeating each time domain sample included in the output of the inverse fast Fourier transform.

6. The method of claim 1, wherein:
the first quantity of time domain samples comprises a series of time domain samples of a single carrier signal; and
the signaling via which the random access preamble is transmitted comprises a single carrier waveform that is associated at least in part with the single carrier signal.

7. The method of claim 1, further comprising:
receiving, from the network device, a configuration of a guard period spanning a time duration; and
adding the guard period to an end of the second sequence, the signaling via which the random access preamble is transmitted being associated at least in part with the adding of the guard period to the end of the second sequence.

8. The method of claim 1, further comprising:
receiving, from the network device, a configuration of a guard band spanning a quantity of subcarriers, the quantity of subcarriers being associated at least in part with a quantity of times that each time domain sample included in the first quantity of time domain samples is repeated, and the quantity of subcarriers being added in a frequency domain on either side of the signaling via which the random access preamble is transmitted.

9. The method of claim 1, further comprising:
receiving a configuration of one or more time gaps for separating at least some time domain samples included in the second quantity of time domain samples; and
adding the one or more time gaps between the at least some time domain samples included in the second quantity of time domain samples, the signaling via which the random access preamble is transmitted being associated at least in part with the one or more time gaps.

10. The method of claim 1, further comprising:
applying an orthogonal cover code to the second sequence and a cyclic prefix for the random access preamble, the transmitting of the random access preamble being associated at least in part with the applying of the orthogonal cover code to the second sequence and the cyclic prefix.

11. The method of claim 1, further comprising:
applying an orthogonal cover code to the second sequence to obtain an encoded second sequence; and
adding a cyclic prefix for the random access preamble to the encoded second sequence, the transmitting of the random access preamble being associated at least in part with the encoded second sequence and the cyclic prefix.

12. The method of claim 1, further comprising:
applying a quantity of cyclic shifts to the second sequence comprising the second quantity of time domain samples, the quantity of cyclic shifts associated at least in part with a quantity of times that each time domain sample included in the first quantity of time domain samples is repeated to obtain the second sequence, the transmitting of the random access preamble being associated at least in part with the applying of the quantity of cyclic shifts to the second sequence.

13. The method of claim 1, further comprising:
receiving, from the network device, a configuration of the first quantity of time domain samples of the first sequence, a configuration of a quantity of times that each time domain sample included in the first quantity of time domain samples is repeated to obtain the second sequence, a configuration of a base length of a cyclic prefix for the random access preamble, or any combination thereof.

14. A method for wireless communication at a network device, comprising:
receiving a random access preamble from a user equipment (UE) via signaling that is associated at least in part with a sequence that comprises a second quantity of samples in a time domain, each sample included in a first quantity of samples in the time domain being repeated within the sequence, and repetitions of a same sample being consecutive within the sequence;
generating a set of sequences associated at least in part with selecting sets of non-consecutive samples from the second quantity of samples in the sequence according to a sample interval, the sample interval equal to a quantity of times that each sample included in the first quantity of samples is repeated within the sequence; and
detecting the random access preamble associated at least in part with a combination of two or more sequences included in the set of sequences.

15. The method of claim 14, wherein each sequence of the set of sequences comprises the first quantity of samples in the time domain.

16. The method of claim 14, wherein the receiving of the random access preamble further comprises:
receiving a cyclic prefix sequence that comprises a fourth quantity of samples in the time domain, each sample included in a third quantity of samples in the time domain being repeated the quantity of times within the cyclic prefix sequence, and repetitions of a same sample being consecutive within the cyclic prefix sequence.

17. The method of claim 16, further comprising:
generating a set of cyclic prefixes associated at least in part with selecting sets of non-consecutive samples from the fourth quantity of samples in the cyclic prefix sequence according to the sample interval, the detecting of the random access preamble being associated at least in part with a combination of two or more cyclic prefixes included in the set of cyclic prefixes.

18. The method of claim 14, further comprising:
transmitting, to the UE, a configuration of a guard period spanning a time duration, the receiving of the random access preamble being associated at least in part with the guard period.

19. The method of claim 14, further comprising:
transmitting, to the UE, a configuration of a guard band spanning a quantity of subcarriers, the quantity of subcarriers associated at least in part with the quantity of times that each sample included in the first quantity of samples is repeated within the sequence, the receiving of the random access preamble being associated at least in part with the guard band.

20. The method of claim 14, further comprising:
transmitting, to the UE, a configuration of one or more time gaps for separating at least some samples included in the second quantity of samples in the time domain; and
switching a receive beam of the network device during each of the one or more time gaps, the receiving of the random access preamble being associated at least in part with the switching of the receive beam of the network device during each of the one or more time gaps.

21. The method of claim 14, wherein the generating of the set of sequences comprises:
performing a discrete Fourier transform on each of the sets of non-consecutive samples that are selected from the second quantity of samples to obtain a set of outputs of the discrete Fourier transform; and
performing an inverse discrete Fourier transform on each of the set of outputs of the discrete Fourier transform to obtain the set of sequences.

22. The method of claim 14, wherein the detecting of the random access preamble associated at least in part with the combination of the two or more sequences included in the set of sequences comprises:
combining sets of corresponding samples included in the two or more sequences to obtain a combination sequence; and
performing a signature detection procedure on the combination sequence to detect the random access preamble.

23. The method of claim 22, wherein the combining of the sets of corresponding samples comprises coherent combining, the method further comprising:
testing one or more hypotheses on the combination sequence, each of the one or more hypotheses corresponding to a respective orthogonal cover code; and
detecting an orthogonal cover code of the random access preamble associated at least in part with the testing of the one or more hypotheses.

24. The method of claim 14, further comprising:
transmitting, to the UE, a configuration of a quantity of cyclic shifts to apply to the sequence that comprises the second quantity of samples, the quantity of cyclic shifts associated at least in part with the quantity of times that each sample included in the first quantity of samples is repeated within the sequence, the receiving of the random access preamble being associated at least in part with the quantity of cyclic shifts.

25. The method of claim 14, further comprising:
transmitting, to the UE, a configuration of the first quantity of samples, a configuration of the quantity of times that each sample included in the first quantity of samples is repeated within the sequence, a configuration of a base length of a cyclic prefix for the random access preamble, or any combination thereof.

26. The method of claim 14, wherein the combination of the two or more sequences included in the set of sequences is associated at least in part with coherent combining or non-coherent combining.

27. An apparatus for wireless communication at a user equipment (UE), comprising:
  a processor;
  memory coupled with the processor; and
  instructions stored in the memory and executable by the processor to cause the apparatus to:
    generate, for a random access preamble, a first sequence comprising a first quantity of time domain samples;
    repeat each time domain sample included in the first quantity of time domain samples to obtain, for the random access preamble, a second sequence comprising a second quantity of time domain samples that is greater than the first quantity of time domain samples, the second quantity of time domain samples including repetitions of the first quantity of time domain samples, and repetitions of a same time domain sample of the first quantity of time domain samples being consecutive within the second sequence; and
    transmit the random access preamble to a network device via signaling that is associated at least in part with the second sequence.

28. The apparatus of claim 27, wherein the instructions are further executable by the processor to cause the apparatus to:
  add, prior to the repeating of each time domain sample included in the first quantity of time domain samples, a cyclic prefix to the first sequence, the cyclic prefix comprising a third quantity of time domain samples; and
  repeat each time domain sample included in the third quantity of time domain samples to obtain, for the random access preamble, a second cyclic prefix comprising a fourth quantity of time domain samples that is greater than the third quantity of time domain samples, repetitions of a same time domain sample being consecutive within the second cyclic prefix.

29. The apparatus of claim 27, wherein the instructions are further executable by the processor to cause the apparatus to:
  select, after the repeating of each time domain sample included in the first quantity of time domain samples, a third quantity of time domain samples from the second sequence to obtain, for the random access preamble, a cyclic prefix comprising the third quantity of time domain samples; and
  add the cyclic prefix to the second sequence.

30. An apparatus for wireless communication at a network device, comprising:
  a processor;
  memory coupled with the processor; and
  instructions stored in the memory and executable by the processor to cause the apparatus to:
    receive a random access preamble from a user equipment (UE) via signaling that is associated at least in part with a sequence that comprises a second quantity of samples in a time domain, each sample included in a first quantity of samples in the time domain being repeated within the sequence, and repetitions of a same sample being consecutive within the sequence;
    generate a set of sequences associated at least in part with selecting sets of non-consecutive samples from the second quantity of samples in the sequence according to a sample interval, the sample interval equal to a quantity of times that each sample included in the first quantity of samples is repeated within the sequence; and
    detect the random access preamble associated at least in part with a combination of two or more sequences included in the set of sequences.

\* \* \* \* \*